United States Patent
Yu et al.

(10) Patent No.: US 11,871,412 B2
(45) Date of Patent: Jan. 9, 2024

(54) DATA TRANSMISSION METHOD, APPARATUS, AND SYSTEM

(71) Applicant: HUAWEI TECHNOLOGIES CO., LTD., Shenzhen (CN)

(72) Inventors: Jian Yu, Shenzhen (CN); Ming Gan, Shenzhen (CN); Min Yan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 252 days.

(21) Appl. No.: 17/020,747

(22) Filed: Sep. 14, 2020

(65) Prior Publication Data

US 2020/0413396 A1 Dec. 31, 2020

Related U.S. Application Data

(63) Continuation of application No. PCT/CN2019/072426, filed on Jan. 18, 2019.

(30) Foreign Application Priority Data

Mar. 14, 2018 (CN) .......................... 201810209268.4

(51) Int. Cl.
*H04W 72/20* (2023.01)
(52) U.S. Cl.
CPC .................................. *H04W 72/20* (2023.01)
(58) Field of Classification Search
USPC .... 370/229, 230, 230.1, 236, 252, 328, 329, 370/330, 334, 343, 349, 389, 390, 432, (Continued)

(56) References Cited

U.S. PATENT DOCUMENTS 9,209,872 B2 * 12/2015 Stacey .................. H04W 8/186
9,793,964 B1 * 10/2017 Lomayev ............. H04B 7/0634
(Continued)

FOREIGN PATENT DOCUMENTS

CN 107113078 A 8/2017
CN 107210987 A 9/2017
(Continued)

OTHER PUBLICATIONS

IEEE Std 802.11-2016(Revision of IEEE Std 802.11-2012), Part 11: Wireless LAN Medium Access Control (MAC) and Physical Layer (PHY) Specifications, IEEE Computer Society, Sponsored by the LAN/MAN Standards Committee, total 3534 pages.

(Continued)

*Primary Examiner* — Nguyen H Ngo
(74) *Attorney, Agent, or Firm* — Rimon PC

(57) ABSTRACT

A data transmission method includes: generating a first data packet, where a signaling field in the first data packet includes bandwidth information and space-time stream information, the bandwidth information is used to indicate first bandwidth, and the space-time stream information is used to indicate k first space-time stream quantities corresponding to k receive ends, where k≥1; and sending the first data packet to the k receive ends, where a maximum value of the first bandwidth is greater than 160 MHz, and/or the k first space-time stream quantities meet a preset condition, where the preset condition includes: when k=1, a maximum value of the first space-time stream quantity indicated by the space-time stream information is greater than 8, and when k>1, a maximum value of a sum of the k first space-time stream quantities is greater than 8.

20 Claims, 11 Drawing Sheets

(58) Field of Classification Search
USPC ........ 370/433, 436, 464, 468, 474, 477, 480
See application file for complete search history.

(56) References Cited

U.S. PATENT DOCUMENTS

| | | | |
|---|---|---|---|
| 10,182,361 B1* | 1/2019 | Moon | H04W 24/08 |
| 2011/0261742 A1* | 10/2011 | Wentink | H04L 1/1854 |
| | | | 370/312 |
| 2012/0002634 A1 | 1/2012 | Seok | |
| 2016/0330000 A1 | 11/2016 | Lee et al. | |
| 2017/0041929 A1 | 2/2017 | Noh et al. | |
| 2018/0191453 A1* | 7/2018 | Zhao | H04L 5/0053 |
| 2018/0242264 A1* | 8/2018 | Pelletier | H04W 52/325 |
| 2019/0044781 A1* | 2/2019 | Lomayev | H04L 27/2672 |
| 2019/0110261 A1* | 4/2019 | Chen | H04L 27/2605 |
| 2020/0067646 A1* | 2/2020 | Lomayev | H04L 25/0242 |

FOREIGN PATENT DOCUMENTS

| | | | |
|---|---|---|---|
| KR | 20120060821 A | 6/2012 | |
| KR | 20160096031 A | 8/2016 | |
| KR | 20170028893 A | 3/2017 | |
| KR | 20170034439 A | 3/2017 | |
| KR | 20170062484 A | 6/2017 | |
| KR | 20170103861 A | 9/2017 | |
| WO | 2013028844 A1 | 2/2013 | |
| WO | 2017011534 A1 | 1/2017 | |

OTHER PUBLICATIONS

IEEE Std 802.11ac-2013, IEEE Computer Society, Part 11:Wire}ess LAN M ed i u m Access Control(MAC) and Physical Layer(PHY) Specifications, Amendment 4:Enhancements for Very High Throughput for Operation in Bands below 6 GHz, dated 2013, total 425 pages.

IEEE P802.11ax /D2.0, Part 11: Wireless LAN Medium Access Control (MAC) and Physical Layer (PHY) Specifications Amendment 6: Enhancements for High Efficiency WLAN, Oct. 2017. total 596 pages.

IEEE P802.11ay /D0.35, Draft Standard for Information Technology Telecommunications and Information Exchange Between Systems—Local and Metropolitan Area Networks—Specific Requirements—Part 11 : Wireless LAN Medium Access Control (MAC) and Physical Layer 14 (PHY) Specifications Amendment 7: Enhanced throughput for operation in license-exempt bands above 45 GHz. May 2017, total 256 pages.

* cited by examiner

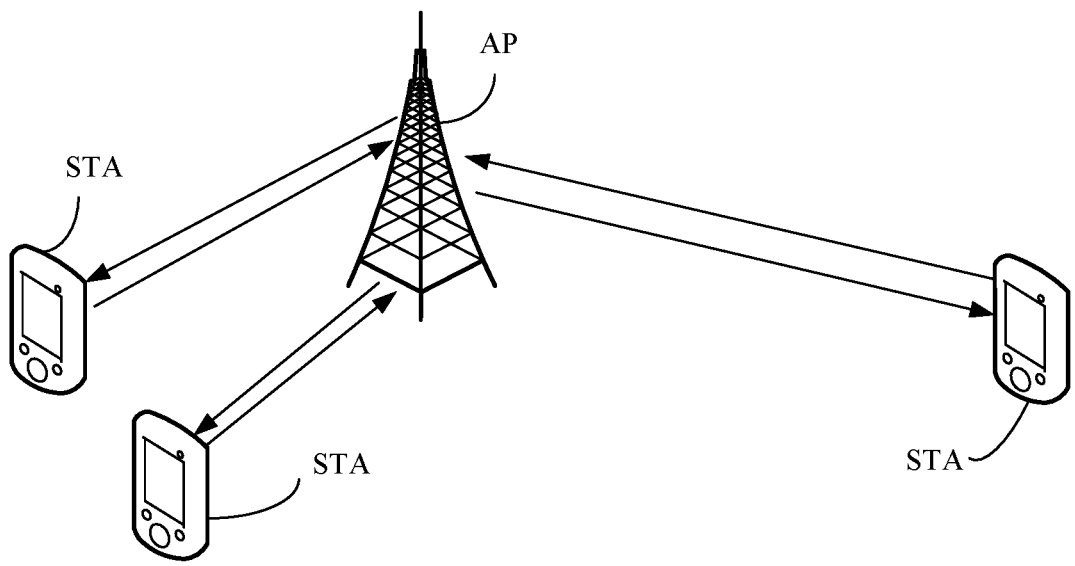

FIG. 1

```
┌─────────────────────────────────────────────────────────────┐
│ A transmit end generates a first data packet, where a       │
│ signaling field in the first data packet includes bandwidth │      201
│ information and space-time stream information, the bandwidth│
│ information is used to indicate first bandwidth, the        │
│ space-time stream information is used to indicate k first   │
│ space-time stream quantities corresponding to k receive     │
│ ends, where k≥1, a maximum value of the first bandwidth is  │
│ greater than 160 MHz, and/or the k first space-time stream  │
│ quantities meet a preset condition                          │
└─────────────────────────────────────────────────────────────┘
                              │
                              ▼                                      202
┌─────────────────────────────────────────────────────────────┐
│    The transmit end sends the first data packet to the k    │
│                       receive ends                          │
└─────────────────────────────────────────────────────────────┘
                              │
                              ▼                                      203
┌─────────────────────────────────────────────────────────────┐
│ Each receive end demodulates data that is in the first data │
│     packet and that needs to be sent to the receive end     │
└─────────────────────────────────────────────────────────────┘
```

FIG. 2

DATA TRANSMISSION METHOD, APPARATUS, AND SYSTEM

CROSS-REFERENCE TO RELATED APPLICATIONS

This application is a continuation of International Application No. PCT/CN2019/072426, filed on Jan. 18, 2019, which claims priority to Chinese Patent Application No. 201810209268.4 filed on Mar. 14, 2018, and the disclosures of the aforementioned applications are hereby incorporated by reference in their entireties.

TECHNICAL FIELD

This application relates to the field of communications technologies, and in particular, to a data transmission method, apparatus, and system.

BACKGROUND

With the development of communications technologies, the communications technologies have been widely used, for example, an access point (AP) and a station (STA) that use the communications technology can transmit data to each other.

For example, when a transmit end (the AP or the STA) needs to send data, the transmit end may encapsulate to-be-transmitted data and a preamble including a signaling field to obtain a data packet, and then send the data packet. The signaling field includes bandwidth information and space-time stream information. The bandwidth information is used to indicate bandwidth of a target transmission resource used to transmit the data packet, and the space-time stream information is used to indicate a first space-time stream quantity corresponding to each receive end. The first space-time stream quantity corresponding to each receive end is a quantity of space-time streams used by the transmit end to send the data packet to the receive end. In a related technology, maximum bandwidth indicated by the bandwidth information is 160 MHz, and a maximum value of a sum of all space-time stream quantities indicated by the space-time stream information is 8.

In the related technology, both bandwidth and a space-time stream quantity that are indicated by a signaling field are relatively small. Therefore, bandwidth used by an AP or a STA to send a data packet is relatively small, a quantity of space-time streams used to send the data packet is relatively small, and a data transmission rate is relatively low.

SUMMARY

This application provides a data transmission method, apparatus, and system, to resolve a problem of a relatively low data transmission rate. Technical solutions are as follows:

According to a first aspect, a data transmission method is provided, where the method is used on a transmit end, and the method includes: generating a first data packet, where a signaling field in the first data packet includes bandwidth information and space-time stream information, the bandwidth information is used to indicate first bandwidth, and the space-time stream information is used to indicate k first space-time stream quantities corresponding to k receive ends, where k≥1; and sending the first data packet to the k receive ends, where a maximum value of the first bandwidth is greater than 160 MHz, and/or the k first space-time stream quantities meet a preset condition, where the preset condition includes: when k=1, a maximum value of the first space-time stream quantity indicated by the space-time stream information is greater than 8, and when k>1, a maximum value of a sum of the k first space-time stream quantities is greater than 8.

Because the bandwidth information in the signaling field in the first data packet generated by the transmit end is used to indicate the first bandwidth, the space-time stream information is used to indicate the k first space-time stream quantities, the maximum value of the first bandwidth is greater than 160 MHz, and the k first space-time stream quantities meet the preset condition, at least one of the two conditions is valid. When the k first space-time stream quantities meet the preset condition, a maximum value of an accumulated value of the k first space-time stream quantities is greater than 8. Therefore, the first data packet can indicate a target data transmission resource with relatively high bandwidth, and/or the first data packet can indicate a relatively large quantity of space-time streams, and a data transmission rate is relatively high.

Optionally, the first data packet carries first to-be-transmitted data, the first bandwidth is bandwidth of a target transmission resource used to transmit the first data packet, and a first space-time stream quantity corresponding to each receive end is a quantity of space-time streams used to send the first data packet to the receive end.

Optionally, the target transmission resource includes m first transmission resources successively arranged in frequency domain, and n second transmission resources successively arranged in the frequency domain, where the second transmission resource includes a 26-subcarrier resource unit RU located at a center in the frequency domain in an 80 MHz band, m≥1, and n≥1. The signaling field further includes indication information, and the indication information includes first allocation information of each first transmission resource in the target transmission resource and second allocation information of each second transmission resource in the target transmission resource. The first allocation information of each first transmission resource is used to indicate at least one first RU obtained by dividing the first transmission resource, and a receive end to which each first RU is allocated. The second allocation information of each second transmission resource is used to indicate whether the second transmission resource is allocated to any one of the k receive ends, and indicate a receive end to which the second transmission resource is allocated when the second transmission resource is allocated to any receive end.

Optionally, the indication information is divided into a plurality of types of sub-information, and in a process of transmitting the first data packet, the plurality of types of sub-information are transmitted on different channels.

Optionally, the first bandwidth is 320 MHz, the target transmission resource includes sixteen first transmission resources and four second transmission resources, the sixteen first transmission resources form two sets, and the two sets include a first set including a first transmission resource whose ranking is an odd number in the sixteen first transmission resources, and a second set including a first transmission resource whose ranking is an even number in the sixteen first transmission resources. The first set corresponds to a second transmission resource whose ranking is an odd number in the four second transmission resources, and the second set corresponds to a second transmission resource whose ranking is an even number in the four second transmission resources. The indication information includes two types of sub-information, the two types of sub-information are in a one-to-one correspondence with the two sets, and each type of sub-information includes first allocation information of each first transmission resource in a set corresponding to the type of sub-information and second allocation information of each second transmission resource corresponding to the set corresponding to the type of sub-information.

Optionally, the first bandwidth is 320 MHz, the target transmission resource includes sixteen first transmission resources and four second transmission resources, the sixteen first transmission resources form four sets, and the four sets include a first set including a first transmission resource whose ranking is 1+4i, a second set including a first transmission resource whose ranking is 2+4i in the sixteen first transmission resources, a third set including a first transmission resource whose ranking is 3+4i in the sixteen first transmission resources, and a fourth set including a first transmission resource whose ranking is 4+4i in the sixteen first transmission resources, where i≥0. The indication information includes four types of sub-information, the four types of sub-information are in a one-to-one correspondence with the four sets, the four sets are in a one-to-one correspondence with the four second transmission resources, and each type of sub-information includes first allocation information of each first transmission resource in a set corresponding to the type of sub-information and second allocation information of each second transmission resource corresponding to the set corresponding to the type of sub-information.

Optionally, the first bandwidth is 320 MHz, the target transmission resource includes sixteen first transmission resources and four second transmission resources, the sixteen first transmission resources form eight sets, and the eight sets include a first set including a first transmission resource whose ranking is 1+8i in the sixteen first transmission resources, a second set including a first transmission resource whose ranking is 2+8i in the sixteen first transmission resources, a third set including a first transmission resource whose ranking is 3+8i in the sixteen first transmission resources, a fourth set including a first transmission resource whose ranking is 4+8i in the sixteen first transmission resources, a fifth set including a first transmission resource whose ranking is 5+8i in the sixteen first transmission resources, a sixth set including a first transmission resource whose ranking is 6+8i in the sixteen first transmission resources, a seventh set including a first transmission resource whose ranking is 7+8i in the sixteen first transmission resources, and an eighth set including a first transmission resource whose ranking is 8+8i in the sixteen first transmission resources, where i≥0. The indication information includes eight types of sub-information, the eight types of sub-information are in a one-to-one correspondence with the eight sets, the eight sets are classified into four groups of sets, each group of sets includes two sets, the four groups of sets are in a one-to-one correspondence with the four second transmission resources, and each type of sub-information includes first allocation information of each first transmission resource in a set corresponding to the type of sub-information and second allocation information of each second transmission resource corresponding to a group of sets to which the set corresponding to the type of sub-information belongs.

Optionally, the first bandwidth is 240 MHz, the target transmission resource includes twelve first transmission resources and three second transmission resources, the twelve first transmission resources form three sets, and the three sets include a first set including a first transmission resource whose ranking is 1+3i in the twelve first transmission resources, a second set including a first transmission resource whose ranking is 2+3i in the twelve first transmission resources, and a third set including a first transmission resource whose ranking is 3+3i in the twelve first transmission resources, where i≥0. The indication information includes three types of sub-information, the three types of sub-information are in a one-to-one correspondence with the three sets, the three sets are in a one-to-one correspondence with the three second transmission resources, and each type of sub-information includes first allocation information of each first transmission resource in a set corresponding to the type of sub-information and second allocation information of each second transmission resource corresponding to the set corresponding to the type of sub-information.

Optionally, the first bandwidth is 240 MHz, the target transmission resource includes twelve first transmission resources and three second transmission resources, the twelve first transmission resources form two sets, and the two sets include a first set including a first transmission resource whose ranking is an odd number in the twelve first transmission resources, and a second set including a first transmission resource whose ranking is an even number in the twelve first transmission resources. The indication information includes two types of sub-information, the two types of sub-information are in a one-to-one correspondence with the two sets, the signaling field further includes additional information, three pieces of second allocation information of the three second transmission resources and the additional information form two groups of combined information, each group of combined information includes two pieces of information in the additional information and the three pieces of second allocation information, and the two groups of combined information are in a one-to-one correspondence with the two sets. The additional information is the same as second allocation information of any one of the three second transmission resources, or the additional information is reserved information. Each type of sub-information includes first allocation information of each first transmission resource in a set corresponding to the type of sub-information and a group of combined information corresponding to the set corresponding to the type of sub-information.

Optionally, the first bandwidth is 240 MHz, the target transmission resource includes twelve first transmission resources and three second transmission resources, the twelve first transmission resources form two sets, and the two sets include a first set including a first transmission resource whose ranking is an odd number in the twelve first transmission resources, and a second set including a first transmission resource whose ranking is an even number in the twelve first transmission resources. The indication information includes two types of sub-information, and the two types of sub-information are in a one-to-one correspondence with the two sets. Three pieces of second allocation information of the three second transmission resources form a total of two groups of second allocation information, one group of second allocation information includes two pieces of second allocation information, the other group of second allocation information includes one piece of second allocation information, and the two groups of second allocation information are in a one-to-one correspondence with the two sets. Each type of sub-information includes first allocation information of each first transmission resource in a set corresponding to the type of sub-information and a group of combined information corresponding to the set corresponding to the type of sub-information.

Optionally, the bandwidth information is further used to indicate a punctured channel and an unpunctured channel that are in a channel on which the target transmission resource is located, and a channel on which at least one piece of sub-information in each type of sub-information is transmitted is not punctured.

Optionally, the signaling field further includes third allocation information of the target transmission resource, the third allocation information is used to indicate at least one third transmission resource obtained by dividing the target transmission resource and a physical layer service data unit PSDU transmitted on each third transmission resource, and each third transmission resource is an integer multiple of an 80 MHz band. In other words, the third allocation information can indicate the PSDU transmitted on each third transmission resource in the target transmission resource, so that the transmit end can more flexibly send data by using the target transmission resource. In particular, for single-point-to-single-point communication, the transmit end may divide the target transmission resource into several third transmission resources, and send PSDUs of different services by using different third transmission resources. In addition, because each third transmission resource is an integer multiple of the 80 MHz band, the third allocation information is relatively simple, so that signaling overheads can be reduced, and the third allocation information is applicable to the single-point-to-single-point communication.

Optionally, the first data packet is a trigger frame used to schedule the k receive ends to transmit k second data packets to the transmit end, the first bandwidth is bandwidth of a target transmission resource used to transmit the k second data packets, and a first space-time stream quantity corresponding to each receive end is a quantity of space-time streams used by the receive end to transmit the second data packet to the transmit end.

Optionally, the signaling field further includes fourth allocation information of the target transmission resource, and the fourth allocation information of the target transmission resource is used to indicate at least one second RU obtained by dividing the target transmission resource, and a receive end to which each second RU is allocated.

According to a second aspect, a data transmission apparatus is provided, where the apparatus is used on a transmit end, and the apparatus includes: a generation module, configured to generate a first data packet, where a signaling field in the first data packet includes bandwidth information and space-time stream information, the bandwidth information is used to indicate first bandwidth, and the space-time stream information is used to indicate k first space-time stream quantities corresponding to k receive ends, where k≥1; and a sending module, configured to send the first data packet to the k receive ends, where a maximum value of the first bandwidth is greater than 160 MHz, and/or the k first space-time stream quantities meet a preset condition, where the preset condition includes: when k=1, a maximum value of the first space-time stream quantity indicated by the space-time stream information is greater than 8, and when k>1, a maximum value of a sum of the k first space-time stream quantities is greater than 8.

Optionally, the first data packet carries first to-be-transmitted data, the first bandwidth is bandwidth of a target transmission resource used to transmit the first data packet, and a first space-time stream quantity corresponding to each receive end is a quantity of space-time streams used to send the first data packet to the receive end.

Optionally, the target transmission resource includes m first transmission resources successively arranged in frequency domain, and n second transmission resources successively arranged in the frequency domain, where the second transmission resource includes a 26-subcarrier resource unit RU located at a center in the frequency domain in an 80 MHz band, m≥1, and n≥1. The signaling field further includes indication information, and the indication information includes first allocation information of each first transmission resource in the target transmission resource and second allocation information of each second transmission resource in the target transmission resource. The first allocation information of each first transmission resource is used to indicate at least one first RU obtained by dividing the first transmission resource, and a receive end to which each first RU is allocated. The second allocation information of each second transmission resource is used to indicate whether the second transmission resource is allocated to any one of the k receive ends, and indicate a receive end to which the second transmission resource is allocated when the second transmission resource is allocated to any receive end.

Optionally, the indication information is divided into a plurality of types of sub-information, and in a process of transmitting the first data packet, the plurality of types of sub-information are transmitted on different channels.

Optionally, the first bandwidth is 320 MHz, the target transmission resource includes sixteen first transmission resources and four second transmission resources, the sixteen first transmission resources form two sets, and the two sets include a first set including a first transmission resource whose ranking is an odd number in the sixteen first transmission resources, and a second set including a first transmission resource whose ranking is an even number in the sixteen first transmission resources. The first set corresponds to a second transmission resource whose ranking is an odd number in the four second transmission resources, and the second set corresponds to a second transmission resource whose ranking is an even number in the four second transmission resources. The indication information includes two types of sub-information, the two types of sub-information are in a one-to-one correspondence with the two sets, and each type of sub-information includes first allocation information of each first transmission resource in a set corresponding to the type of sub-information and second allocation information of each second transmission resource corresponding to the set corresponding to the type of sub-information.

Optionally, the first bandwidth is 320 MHz, the target transmission resource includes sixteen first transmission resources and four second transmission resources, the sixteen first transmission resources form four sets, and the four sets include a first set including a first transmission resource whose ranking is 1+4i, a second set including a first transmission resource whose ranking is 2+4i in the sixteen first transmission resources, a third set including a first transmission resource whose ranking is 3+4i in the sixteen first transmission resources, and a fourth set including a first transmission resource whose ranking is 4+4i in the sixteen first transmission resources, where i≥0. The indication information includes four types of sub-information, the four types of sub-information are in a one-to-one correspondence with the four sets, the four sets are in a one-to-one correspondence with the four second transmission resources, and each type of sub-information includes first allocation information of each first transmission resource in a set corresponding to the type of sub-information and second allocation information of each second transmission resource corresponding to the set corresponding to the type of sub-information.

Optionally, the first bandwidth is 320 MHz, the target transmission resource includes sixteen first transmission resources and four second transmission resources, the sixteen first transmission resources form eight sets, and the eight sets include a first set including a first transmission resource whose ranking is 1+8i in the sixteen first transmission resources, a second set including a first transmission resource whose ranking is 2+8i in the sixteen first transmission resources, a third set including a first transmission resource whose ranking is 3+8i in the sixteen first transmission resources, a fourth set including a first transmission resource whose ranking is 4+8i in the sixteen first transmission resources, a fifth set including a first transmission resource whose ranking is 5+8i in the sixteen first transmission resources, a sixth set including a first transmission resource whose ranking is 6+8i in the sixteen first transmission resources, a seventh set including a first transmission resource whose ranking is 7+8i in the sixteen first transmission resources, and an eighth set including a first transmission resource whose ranking is 8+8i in the sixteen first transmission resources, where i≥0. The indication information includes eight types of sub-information, the eight types of sub-information are in a one-to-one correspondence with the eight sets, the eight sets are classified into four groups of sets, each group of sets includes two sets, the four groups of sets are in a one-to-one correspondence with the four second transmission resources, and each type of sub-information includes first allocation information of each first transmission resource in a set corresponding to the type of sub-information and second allocation information of each second transmission resource corresponding to a group of sets to which the set corresponding to the type of sub-information belongs.

Optionally, the first bandwidth is 240 MHz, the target transmission resource includes twelve first transmission resources and three second transmission resources, the twelve first transmission resources form three sets, and the three sets include a first set including a first transmission resource whose ranking is 1+3i in the twelve first transmission resources, a second set including a first transmission resource whose ranking is 2+3i in the twelve first transmission resources, and a third set including a first transmission resource whose ranking is 3+3i in the twelve first transmission resources, where i≥0. The indication information includes three types of sub-information, the three types of sub-information are in a one-to-one correspondence with the three sets, the three sets are in a one-to-one correspondence with the three second transmission resources, and each type of sub-information includes first allocation information of each first transmission resource in a set corresponding to the type of sub-information and second allocation information of each second transmission resource corresponding to the set corresponding to the type of sub-information.

Optionally, the first bandwidth is 240 MHz, the target transmission resource includes twelve first transmission resources and three second transmission resources, the twelve first transmission resources form two sets, and the two sets include a first set including a first transmission resource whose ranking is an odd number in the twelve first transmission resources, and a second set including a first transmission resource whose ranking is an even number in the twelve first transmission resources. The indication information includes two types of sub-information, the two types of sub-information are in a one-to-one correspondence with the two sets, the signaling field further includes additional information, three pieces of second allocation information of the three second transmission resources and the additional information form two groups of combined information, each group of combined information includes two pieces of information in the additional information and the three pieces of second allocation information, and the two groups of combined information are in a one-to-one correspondence with the two sets. The additional information is the same as second allocation information of any one of the three second transmission resources, or the additional information is reserved information. Each type of sub-information includes first allocation information of each first transmission resource in a set corresponding to the type of sub-information and a group of combined information corresponding to the set corresponding to the type of sub-information.

Optionally, the first bandwidth is 240 MHz, the target transmission resource includes twelve first transmission resources and three second transmission resources, the twelve first transmission resources form two sets, and the two sets include a first set including a first transmission resource whose ranking is an odd number in the twelve first transmission resources, and a second set including a first transmission resource whose ranking is an even number in the twelve first transmission resources. The indication information includes two types of sub-information, and the two types of sub-information are in a one-to-one correspondence with the two sets. Three pieces of second allocation information of the three second transmission resources form a total of two groups of second allocation information, one group of second allocation information includes two pieces of second allocation information, the other group of second allocation information includes one piece of second allocation information, the two groups of second allocation information are in a one-to-one correspondence with the two sets, and each type of sub-information includes first allocation information of each first transmission resource in a set corresponding to the type of sub-information and a group of combined information corresponding to the set corresponding to the type of sub-information.

Optionally, the bandwidth information is further used to indicate a punctured channel and an unpunctured channel that are in a channel on which the target transmission resource is located, and a channel on which at least one piece of sub-information in each type of sub-information is transmitted is not punctured.

Optionally, the signaling field further includes third allocation information of the target transmission resource, the third allocation information is used to indicate at least one third transmission resource obtained by dividing the target transmission resource and a physical layer service data unit PSDU transmitted on each third transmission resource, and each third transmission resource is an integer multiple of an 80 MHz band.

Optionally, the first data packet is a trigger frame used to schedule the k receive ends to transmit k second data packets to the transmit end, the first bandwidth is bandwidth of a target transmission resource used to transmit the k second data packets, and a first space-time stream quantity corresponding to each receive end is a quantity of space-time streams used by the receive end to transmit the second data packet to the transmit end.

Optionally, the signaling field further includes fourth allocation information of the target transmission resource, and the fourth allocation information of the target transmission resource is used to indicate at least one second RU obtained by dividing the target transmission resource, and a receive end to which each second RU is allocated.

According to a third aspect, a data transmission apparatus is provided, the data transmission apparatus includes a processor, a memory, a communications interface, and a bus, and the processor, the memory, and the communications interface are communicatively connected by using the bus. The memory is configured to store a computer instruction. The processor is configured to invoke, by using the bus, the computer instruction stored in the memory, to perform the data transmission method according to the first aspect.

According to a fourth aspect, a data transmission system is provided, the data transmission system includes a transmit end and k receive ends, and the transmit end includes the data transmission apparatus according to the second aspect or the third aspect, where k≥1.

According to a fifth aspect, a computer-readable storage medium is provided, the computer-readable storage medium stores an instruction, and when the computer-readable storage medium runs on a computer, the computer is enabled to perform the data transmission method according to the first aspect.

According to a sixth aspect, a computer program product including an instruction is provided, and when the computer program product runs on a computer, a computer is enabled to perform the data transmission method according to the first aspect.

Beneficial effects of the technical solutions provided in this application are as follows:

Because the bandwidth information in the signaling field in the first data packet generated by the transmit end is used to indicate the first bandwidth, the space-time stream information is used to indicate the k first space-time stream quantities, the maximum value of the first bandwidth is greater than 160 MHz, and the k first space-time stream quantities meet the preset condition, at least one of the two conditions is valid. When the k first space-time stream quantities meet the preset condition, a maximum value of an accumulated value of the k first space-time stream quantities is greater than 8. Therefore, the first data packet can indicate a target data transmission resource with relatively high bandwidth, and/or the first data packet can indicate a relatively large quantity of space-time streams, and a data transmission rate is relatively high.

BRIEF DESCRIPTION OF DRAWINGS

FIG. 1 is a schematic diagram of an application scenario of a data transmission method according to an embodiment of this application;

FIG. 2 is a flowchart of a data transmission method according to an embodiment of this application;

DESCRIPTION OF EMBODIMENTS

Figure 3:
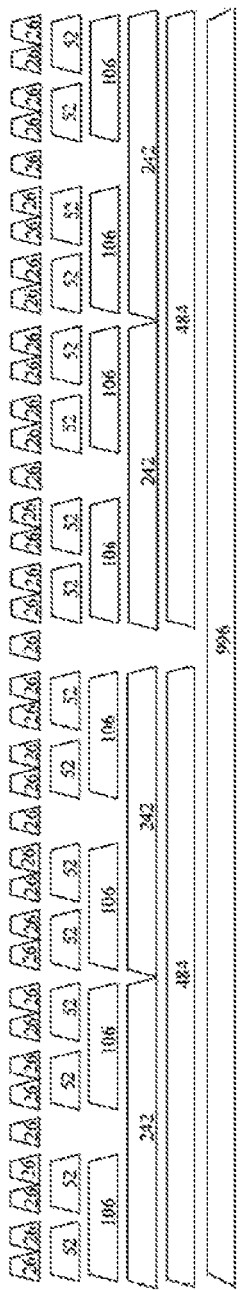
FIG. 3 is a schematic diagram of an RU in an 80 MHz band according to an embodiment of this application.

To make the objectives, technical solutions, and advantages of this application clearer, the following further describes the implementations of this application in detail with reference to the accompanying drawings.

FIG. 1 is a schematic diagram of an application scenario of a data transmission method according to an embodiment of this application. As shown in FIG. 1, the application scenario may include at least one AP and at least one STA. In FIG. 1, for example, the application scenario includes one AP and three STAs.

In this application scenario, each device and at least one other device may transmit a data packet to each other. For example, an AP and at least one STA may transmit a data packet to each other, an AP and at least one other AP may transmit a data packet to each other, and a STA and at least one AP may transmit a data packet to each other, or a STA and at least one other STA may transmit a data packet to each other. In other words, a transmit end may be an AP or a STA, and a receive end may be an AP or a STA. The AP may be a communications server, a router, a switch, or a bridge, and the STA may be a computer or a mobile phone.

It should be noted that the transmit end may send the data packet to the receive end in two manners.

In a first manner, the transmit end may generate a data packet based on to-be-sent data, and send the data packet to the receive end. In this case, the data packet may include a preamble and a data part, the data part carries the to-be-sent data, the preamble includes a signaling field, the signaling field includes bandwidth information and space-time stream information, the bandwidth information is used to indicate bandwidth of a target transmission resource used to transmit the data packet, and the space-time stream information is used to indicate a first space-time stream quantity corresponding to each receive end (in other words, a quantity of space-time streams used by the transmit end to transmit the data packet to each receive end). In a second manner, the transmit end may generate a data packet, and the data packet may be a trigger frame. Then, the transmit end may send the data packet to each receive end, to trigger each receive end to send another data packet to the transmit end based on the data packet. In this case, a signaling field in the data packet sent by the transmit end includes bandwidth information and space-time stream information, the bandwidth information is used to indicate bandwidth of a target transmission resource used by all receive ends to transmit another data packet to the transmit end, and the space-time stream information is used to indicate a first space-time stream quantity corresponding to each receive end (in other words, a quantity of space-time streams used by each receive end to transmit the another data packet to the transmit end). The data packet may also be referred to as a physical layer protocol data unit (PPDU), and a data part in the data packet may be referred to as a physical layer service data unit (PSDU).

There are a plurality of data transmission methods in a related technology, and in data packets sent by using these data transmission methods, maximum bandwidth indicated by bandwidth information is 160 MHz, and a maximum value of a sum of space-time stream quantities indicated by space-time stream information is 8. Therefore, a data packet transmission rate in the related technology is relatively low. This application provides a data transmission method, so that a problem of a relatively low data packet transmission rate can be resolved.

FIG. 2 is a flowchart of a data transmission method according to an embodiment of this application. For example, a first data packet transmitted in FIG. 2 is a data packet including first to-be-transmitted data. As shown in FIG. 2, the data transmission method may include the following steps.

Step 201: A transmit end generates a first data packet, where a signaling field in the first data packet includes bandwidth information and space-time stream information, the bandwidth information is used to indicate first bandwidth, the space-time stream information is used to indicate k first space-time stream quantities corresponding to k receive ends, k≥1, a maximum value of the first bandwidth is greater than 160 MHz, and/or the k first space-time stream quantities meet a preset condition.

In other words, the maximum value of the first bandwidth is greater than 160 MHz, or the k first space-time stream quantities meet the preset condition, or the maximum value of the first bandwidth is greater than 160 MHz and the k first space-time stream quantities meet the preset condition. The preset condition includes: when k=1, a maximum value of the first space-time stream quantity indicated by the space-time stream information is greater than 8, and when k>1, a maximum value of a sum of the k first space-time stream quantities is greater than 8.

Step 202: The transmit end sends the first data packet to the k receive ends.

Step 203: Each receive end demodulates data that is in the first data packet and that needs to be sent to the receive end.

After receiving the signaling field in the first data packet, the receive end may identify, based on the signaling field, a transmission resource on which data transmitted by the transmit end to the receive end is located, to demodulate the data on the transmission resource.

In conclusion, in this embodiment of this application, because the bandwidth information in the signaling field in the first data packet generated by the transmit end is used to indicate the first bandwidth, the space-time stream information is used to indicate the k first space-time stream quantities, the maximum value of the first bandwidth is greater than 160 MHz, and the k first space-time stream quantities meet the preset condition, at least one of the two conditions is valid. When the k first space-time stream quantities meet the preset condition, a maximum value of an accumulated value of the k first space-time stream quantities is greater than 8. Therefore, the first data packet can indicate a target data transmission resource with relatively high bandwidth, and/or the first data packet can indicate a relatively large quantity of space-time streams, and a data transmission rate is relatively high.

It should be noted that in this embodiment of this application, that the first data packet is a data packet including the first to-be-transmitted data is used as an example. In this case, the first bandwidth is bandwidth of the target transmission resource used to transmit the first data packet, and the first space-time stream quantity corresponding to each receive end is a quantity of space-time streams used by the transmit end to send the first data packet to the receive end. Optionally, the first bandwidth may be 240 MHz or 320 MHz. When k=1, the first space-time stream quantity indicated by the space-time stream information may be 16. When k>1, the sum of the k first space-time stream quantities may be 16.

Optionally, the target transmission resource may include m first transmission resources successively arranged in frequency domain, and n second transmission resources successively arranged in the frequency domain. The second transmission resource may include a 26-subcarrier resource unit (resource unit, RU) that is in the target transmission resource and that is located at a center in the frequency domain in an 80 MHz band, m≥1, and n≥1. FIG. 3 is a schematic diagram of an RU that is in a target transmission resource and that is included in an 80 MHz band according to an embodiment of this application. As shown in FIG. 3, RUs on an 80 MHz channel may include a 26-subcarrier RU including 26 subcarrier RUs, a 52-subcarrier RU including 52 subcarrier RUs, a 106-subcarrier RU including 106 subcarrier RUs, a 242-subcarrier RU including 242 subcarrier RUs, a 484-subcarrier RU including 484 subcarrier RUs, and a 996-subcarrier RU including 996 subcarrier RUs. When the first bandwidth is equal to 80 MHz, the target transmission resource may include one 80 MHz band. When the first bandwidth is greater than 80 MHz, the target transmission resource may include a plurality of 80 MHz bands. For example, when the first bandwidth is 160 MHz, the target transmission resource includes two 80 MHz bands. When the first bandwidth is 240 MHz, the target transmission resource includes three 80 MHz bands. When the first bandwidth is 320 MHz, the target transmission resource includes four 80 MHz bands. The first transmission resource may include a 242-subcarrier RU, a 484-subcarrier RU, a 996-subcarrier RU, twice the 996-subcarrier RU, three times the 996-subcarrier RU, or four times the 996-subcarrier RU. In this embodiment of this application, for example, the first transmission resource includes the 242-subcarrier RU.

The signaling field in the first data packet may further include indication information, and the indication information may include first allocation information of each first transmission resource in the target transmission resource and second allocation information of each second transmission resource in the target transmission resource. The first allocation information of each first transmission resource is used to indicate at least one first RU obtained by dividing the first transmission resource, and a receive end to which each first RU is allocated. The second allocation information of each second transmission resource is used to indicate whether the second transmission resource is allocated to any receive end, and indicate a receive end to which the second transmission resource is allocated when the second transmission resource is allocated to any receive end. For example, the indication information may include two parts. One part is common information, and the common information may be used to indicate at least one first RU obtained by dividing the first transmission resource, and whether the second transmission resource is allocated to any receive end. The other part is information corresponding to each of the k receive ends, and information corresponding to each receive end may be used to indicate a resource allocated to the receive end (for example, the first RU in the first transmission resource or the second transmission resource).

It should be noted that an RU on the 80 MHz channel may include a 26-subcarrier RU, a 52-subcarrier RU, a 106-subcarrier RU, a 242-subcarrier RU, a 484-subcarrier RU, and a 996-subcarrier RU, and an RU on a 20 MHz channel may include a 26-subcarrier RU, a 52-subcarrier RU, a 106-subcarrier RU, and a 242-subcarrier RU. In this embodiment of this application, for example, the first transmission resource includes a 242-subcarrier RU, and the first RU in the first transmission resource may include at least one RU in a 26-subcarrier RU, a 52-subcarrier RU, a 106-subcarrier RU, and a 242-subcarrier RU.

Optionally, the indication information may be divided into a plurality of types of sub-information, and in a process of transmitting the first data packet, the plurality of types of sub-information are transmitted on different channels. It should be noted that the first bandwidth is the bandwidth of the target transmission resource, and the target transmission resource may include a plurality of 20 MHz bands. For example, when the first bandwidth is 160 MHz, the target transmission resource may include eight 20 MHz bands. For example, when the first bandwidth is 320 MHz, the target transmission resource may include sixteen 20 MHz channel bands.

In this embodiment of this application, there are a plurality of implementable manners for the indication information in the first data packet. Eight implementable manners are used as an example below for description.

Figure 4:
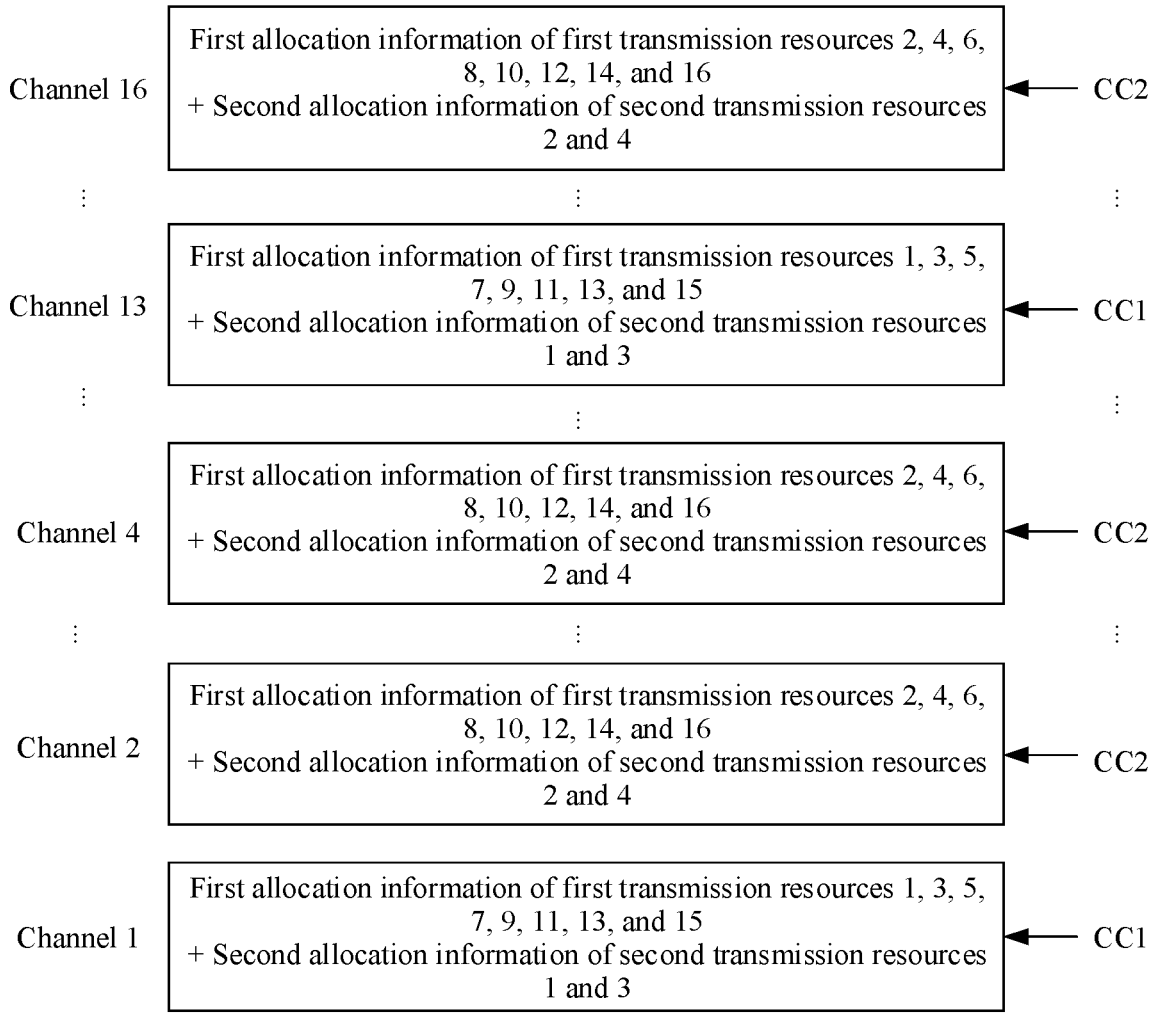
FIG. 4 is a schematic diagram of a first type of sub-information according to an embodiment of this application.

In a first implementable manner of the indication information in the first data packet, as shown in FIG. 4, it is assumed that the first bandwidth is 320 MHz, the target transmission resource includes sixteen first transmission resources and four second transmission resources, and the sixteen first transmission resources form two sets. The two sets may include a first set including a first transmission resource whose ranking is an odd number in the sixteen first transmission resources, and a second set including a first transmission resource whose ranking is an even number in the sixteen first transmission resources. The first set corresponds to a second transmission resource whose ranking is an odd number in the four second transmission resources, and the second set corresponds to a second transmission resource whose ranking is an even number in the four second transmission resources.

It is assumed that a first transmission resource X represents an $X^{th}$ first transmission resource, and a second transmission resource X represents an $X^{th}$ second transmission resource. The first set may include first transmission resources 1, 3, 5, 7, 9, 11, 13, and 15 (in other words, a first transmission resource 1, a first transmission resource 3, a first transmission resource 5, a first transmission resource 7, a first transmission resource 9, a first transmission resource 11, a first transmission resource 13, and a first transmission resource 15 in the sixteen first transmission resources). The second set may include first transmission resources 2, 4, 6, 8, 10, 12, 14, and 16 (in other words, a first transmission resource 2, a first transmission resource 4, a first transmission resource 6, a first transmission resource 8, a first transmission resource 10, a first transmission resource 12, a first transmission resource 14, and a first transmission resource 16 in the sixteen first transmission resources). The first set corresponds to second transmission resources 1 and 3 (in other words, a second transmission resource 1 and a second transmission resource 3 in the four second transmission resources). The second set corresponds to second transmission resources 2 and 4 (in other words, a second transmission resource 2 and a second transmission resource 4 in the four second transmission resources).

The signaling field may include two types of sub-information. The two types of sub-information are in a one-to-one correspondence with the two sets, and each type of sub-information includes first allocation information of each first transmission resource in a set corresponding to the type of sub-information and second allocation information of each second transmission resource corresponding to the set corresponding to the type of sub-information. When the first data packet is being sent, each type of sub-information is separately transmitted on eight channels, in other words, each type of sub-information is transmitted eight times.

For example, one type of sub-information corresponding to the first set may be referred to as first sub-information CC1, and one type of sub-information corresponding to the second set may be referred to as second sub-information CC2. The CC1 may include first allocation information of the first transmission resources 1, 3, 5, 7, 9, 11, 13, and 15, and second allocation information of the second transmission resources 1 and 3. The CC2 may include first allocation information of the first transmission resources 2, 4, 6, 8, 10, 12, 14, and 16, and second allocation information of the second transmission resources 2 and 4.

A 320 MHz channel on which the target transmission resource is located may include sixteen 20 MHz channels successively arranged in the frequency domain. It is assumed that a channel X represents an $X^{th}$ 20 MHz channel. In this case, when the first data packet is being transmitted, one piece of CC1 is transmitted on each of channels 1, 3, 5, 7, 9, 11, 13, and 15, and one piece of CC2 is transmitted on each of channels 2, 4, 6, 8, 10, 12, 14, and 16. The first transmission resource X is transmitted on the channel X.

Optionally, the bandwidth information in the first data packet is further used to indicate a punctured channel and an unpunctured channel that are in the channel on which the target transmission resource is located, and a channel on which at least one piece of sub-information in each type of sub-information is not punctured. It should be noted that the channel on which the target transmission resource is located includes a primary 20 MHz channel (referred to as P20), a secondary 20 MHz channel (referred to as S20), a secondary 40 MHz channel (referred to as S40), a primary 80 MHz channel (referred to as P80), a secondary 80 MHz channel (referred to as S80), and a secondary 160 MHz channel (referred to as S160). The bandwidth information may be used to indicate one or more of 11 cases shown in Table 1, and is not limited to the following cases.

TABLE 1

| | |
|---|---|
| Case 1 | The bandwidth information is used to indicate that the first bandwidth is 20 MHz, and a 20 MHz channel on which a target transmission resource of 20 MHz is located is not punctured. In this case, the indication information in the first data packet includes one type of sub-information. |
| Case 2 | The bandwidth information is used to indicate that the first bandwidth is 40 MHz, and a 40 MHz channel on which a target transmission resource of 40 MHz is located is not punctured. In this case, the indication information in the first data packet includes two types of sub-information. |

TABLE 1-continued

| | |
|---|---|
| Case 3 | The bandwidth information is used to indicate that the first bandwidth is 80 MHz, and an 80 MHz channel on which a target transmission resource of 80 MHz is located is not punctured. In this case, the indication information in the first data packet includes two types of sub-information. |
| Case 4 | The bandwidth information is used to indicate that the first bandwidth is 160 MHz, and a 160 MHz channel on which a target transmission resource of 160 MHz is located is not punctured. The 160 MHz channel includes one 160 MHz channel or two 80 MHz channels. In this case, the indication information in the first data packet includes two types of sub-information. |
| Case 5 | The bandwidth information is used to indicate that the first bandwidth is 320 MHz, and a 320 MHz channel on which a target transmission resource of 320 MHz is located is not punctured. The 320 MHz channel includes one 320 MHz channel, or two 160 MHz channels, or four 80 MHz channels. In this case, the indication information in the first data packet includes two types of sub-information. |
| Case 6 | The bandwidth information is used to indicate that the first bandwidth is 80 MHz, and in an 80 MHz channel on which a target transmission resource of 80 MHz is located, only S20 is punctured. In this case, the indication information in the first data packet includes two types of sub-information. |
| Case 7 | The bandwidth information is used to indicate that the first bandwidth is 80 MHz, and in an 80 MHz channel on which a target transmission resource of 80 MHz is located, only one 20 MHz channel in S40 is punctured. In this case, the indication information in the first data packet includes two types of sub-information. |
| Case 8 | The bandwidth information is used to indicate that the first bandwidth is 160 MHz, and in a 160 MHz channel on which a target transmission resource of 160 MHz is located, only S20 in P80 is punctured, and 20 MHz channels in S80 may be randomly combined. The 160 MHz channel includes one 160 MHz channel or two 80 MHz channels. In this case, the indication information in the first data packet includes two types of sub-information.<br>It should be noted that, that 20 MHz channels in the channel X may be randomly combined means that no 20 MHz channel in the channel X may be punctured, or at least one 20 MHz channel in the channel X is punctured. The channel X may be any channel in the channel on which the target transmission resource is located. |
| Case 9 | The bandwidth information is used to indicate that the first bandwidth is 160 MHz, and in a 160 MHz channel on which a target transmission resource of 160 MHz is located, only a 40 MHz channel on which P20 is located is not punctured, and 20 MHz channels in S80 may be randomly combined. The 160 MHz channel includes one 160 MHz channel or two 80 MHz channels. In this case, the indication information in the first data packet includes two types of sub-information. |
| Case 10 | The bandwidth information is used to indicate that the first bandwidth is 320 MHz, and in a 320 MHz channel on which a target transmission resource of 320 MHz is located, only S20 in P80 is punctured, and 20 MHz channels in another 80 MHz channel except P80 may be randomly combined. The 320 MHz channel includes one 320 MHz channel, or two 160 MHz channels, or four 80 MHz channels. In this case, the indication information in the first data packet includes two types of sub-information. |
| Case 11 | The bandwidth information is used to indicate that the first bandwidth is 320 MHz, and in a 320 MHz channel on which a target transmission resource of 320 MHz is located, only a 40 MHz channel on which P20 is located is not punctured, and 20 MHz channels in other three 80 MHz channels except P80 may be randomly combined. The 320 MHz channel includes one 320 MHz channel, or two 160 MHz channels, or four 80 MHz channels. In this case, the indication information in the first data packet includes two types of sub-information. |

Figure 5:
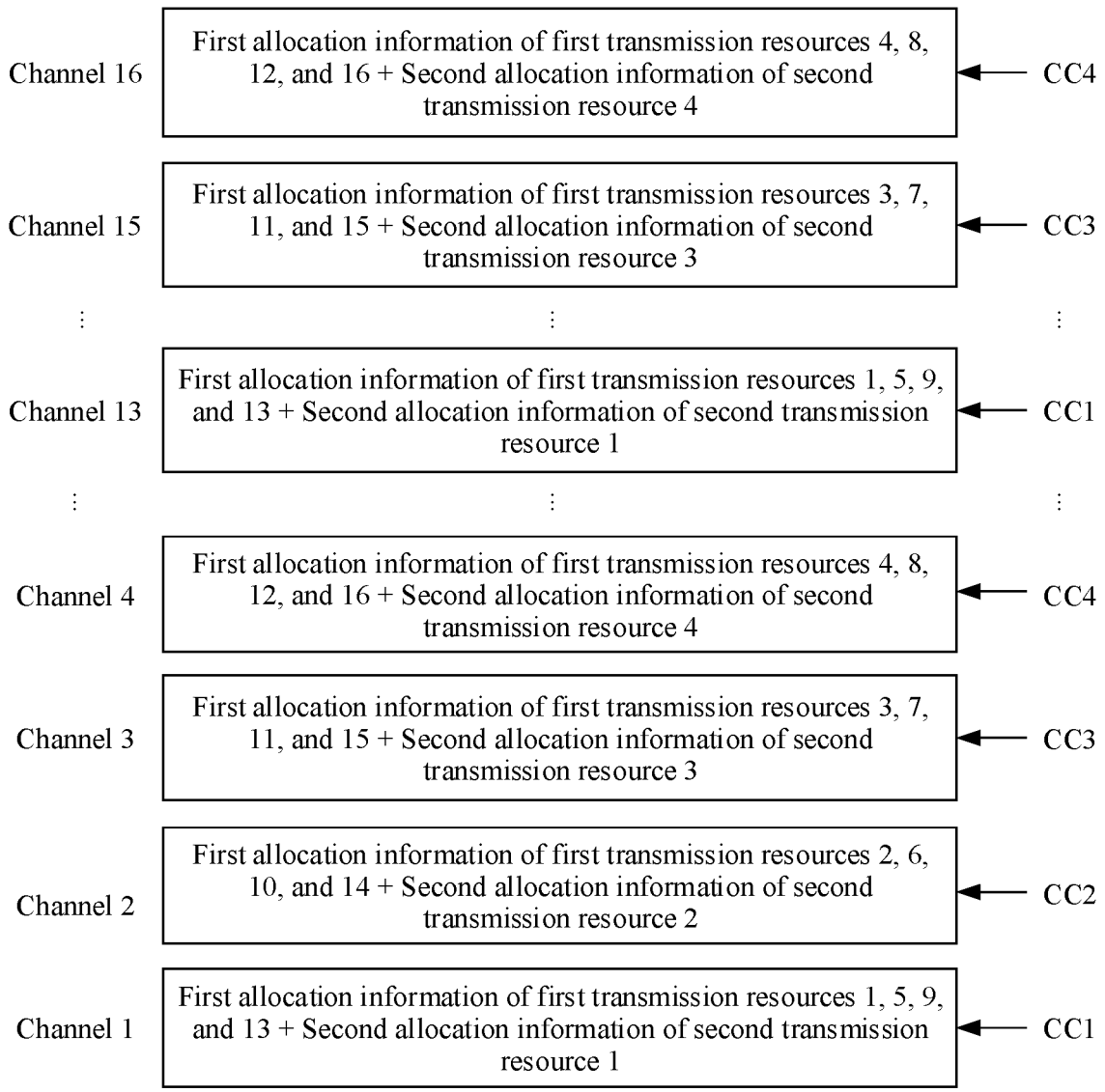
FIG. 5 is a schematic diagram of a second type of sub-information according to an embodiment of this application.

In a second implementable manner of the indication information in the first data packet, as shown in FIG. 5, it is assumed that the first bandwidth is 320 MHz, the target transmission resource includes sixteen first transmission resources and four second transmission resources, and the sixteen first transmission resources form four sets. The four sets include a first set including a first transmission resource whose ranking is 1+4i in the sixteen first transmission resources, a second set including a first transmission resource whose ranking is 2+4i in the sixteen first transmission resources, a third set including a first transmission resource whose ranking is 3+4i in the sixteen first transmission resources, and a fourth set including a first transmission resource whose ranking is 4+4i in the sixteen first transmission resources, where i≥0. The four sets are in a one-to-one correspondence with the four second transmission resources.

For example, it is assumed that a first transmission resource X represents an $X^{th}$ first transmission resource, and a second transmission resource X represents an $X^{th}$ second transmission resource. In this case, the first set may include first transmission resources 1, 5, 9, and 13 in the sixteen first transmission resources, the second set may include first transmission resources 2, 6, 10, and 14 in the sixteen first transmission resources, the third set may include first transmission resources 3, 7, 11, and 15 in the sixteen first transmission resources, and the fourth set may include first transmission resources 4, 8, 12, and 16 in the sixteen first transmission resources. The first set corresponds to a second transmission resource 1 in the four second transmission resources, the second set corresponds to a second transmission resource 2 in the four second transmission resources, the third set corresponds to a second transmission resource 3 in the four second transmission resources, and the fourth set corresponds to a second transmission resource 4 in the four second transmission resources.

The indication information in the first data packet includes four types of sub-information, the four types of sub-information are in a one-to-one correspondence with the four sets, and each type of sub-information includes first allocation information of each first transmission resource in a set corresponding to the type of sub-information, and second allocation information of each second transmission resource corresponding to the set corresponding to the type of sub-information. When the first data packet is being sent, each type of sub-information is separately transmitted on four channels, in other words, each type of sub-information is transmitted four times.

For example, one type of sub-information corresponding to the first set may be referred to as first sub-information CC1, one type of sub-information corresponding to the second set may be referred to as second sub-information CC2, one type of sub-information corresponding to the third set may be referred to as third sub-information CC3, and one type of sub-information corresponding to the fourth set may be referred to as fourth sub-information CC4. The CC1 may include first allocation information of the first transmission resources 1, 5, 9, and 13, and second allocation information of the second transmission resource 1. The CC2 may include first allocation information of the first transmission resources 2, 6, 10, and 14, and second allocation information of the second transmission resource 2. The CC3 may include first allocation information of the first transmission resources 3, 7, 11, and 15, and second allocation information of the second transmission resource 3. The CC4 may include first allocation information of the first transmission resources 4, 8, 12, and 16, and second allocation information of the second transmission resource 4.

A 320 MHz channel on which the target transmission resource is located may include sixteen 20 MHz channels successively arranged in the frequency domain. It is assumed that a channel X represents an $X^{th}$ 20 MHz channel, and the first transmission resource X is transmitted on the channel X. When the first data packet is being transmitted, one piece of CC1 is transmitted on each of channels 1, 5, 9, and 13, one piece of CC2 is transmitted on each of channels 2, 6, 10, and 14, one piece of CC3 is transmitted on each of channels 3, 7, 11 and 15, and one piece of CC4 is transmitted on each of channels 4, 8, 12 and 16.

Optionally, the bandwidth information in the first data packet is further used to indicate a punctured channel and an unpunctured channel that are in the channel on which the target transmission resource is located, and a channel on which at least one piece of sub-information in each type of sub-information is not punctured. It should be noted that the channel on which the target transmission resource is located includes a primary 20 MHz channel (referred to as P20), a secondary 20 MHz channel (referred to as S20), a secondary 40 MHz channel (referred to as S40), a primary 80 MHz channel (referred to as P80), a secondary 80 MHz channel (referred to as S80), and a secondary 160 MHz channel (referred to as S160). The bandwidth information may be used to indicate one or more of 17 cases shown in Table 2, and is not limited to the following cases.

TABLE 2

| | |
|---|---|
| Case 1 | The bandwidth information is used to indicate that the first bandwidth is 20 MHz, and a 20 MHz channel on which a target transmission resource of 20 MHz is located is not punctured. In this case, the indication information in the first data packet includes one type of sub-information. |
| Case 2 | The bandwidth information is used to indicate that the first bandwidth is 40 MHz, and a 40 MHz channel on which a target transmission resource of 40 MHz is located is not punctured. In this case, the indication information in the first data packet includes two types of sub-information. |
| Case 3 | The bandwidth information is used to indicate that the first bandwidth is 80 MHz, and an 80 MHz channel on which a target transmission resource of 80 MHz is located is not punctured. In this case, the indication information in the first data packet includes two or four types of sub-information. |
| Case 4 | The bandwidth information is used to indicate that the first bandwidth is 160 MHz, and a 160 MHz channel on which a target transmission resource of 160 MHz is located is not punctured. The 160 MHz channel includes one 160 MHz channel or two 80 MHz channels. In this case, the indication information in the first data packet includes two or four types of sub-information. |
| Case 5 | The bandwidth information is used to indicate that the first bandwidth is 320 MHz, and a 320 MHz channel on which a target transmission resource of 320 MHz is located is not punctured. The 320 MHz channel includes one 320 MHz channel, or two 160 MHz channels, or four 80 MHz channels. In this case, the indication information in the first data packet includes two or four types of sub-information. |
| Case 6 | The bandwidth information is used to indicate that the first bandwidth is 80 MHz, and in an 80 MHz channel on which a target transmission resource of 80 MHz is located, only S20 is punctured. In this case, the indication information in the first data packet includes two types of sub-information. |

TABLE 2-continued

| | |
|---|---|
| Case 7 | The bandwidth information is used to indicate that the first bandwidth is 80 MHz, and in an 80 MHz channel on which a target transmission resource of 80 MHz is located, only one 20 MHz channel in S40 is punctured. In this case, the indication information in the first data packet includes two types of sub-information. |
| Case 8 | The bandwidth information is used to indicate that the first bandwidth is 160 MHz, and in a 160 MHz channel on which a target transmission resource of 160 MHz is located, only S20 in P80 is punctured, and 20 MHz channels in S80 may be randomly combined. The 160 MHz channel includes one 160 MHz channel or two 80 MHz channels. In this case, the indication information in the first data packet includes two types of sub-information. |
| Case 9 | The bandwidth information is used to indicate that the first bandwidth is 160 MHz, and in a 160 MHz channel on which a target transmission resource of 160 MHz is located, a 40 MHz channel on which P20 is located is not punctured, and 20 MHz channels in S80 may be randomly combined. The 160 MHz channel includes one 160 MHz channel or two 80 MHz channels. In this case, the indication information in the first data packet includes two types of sub-information. |
| Case 10 | The bandwidth information is used to indicate that the first bandwidth is 320 MHz, and in a 320 MHz channel on which a target transmission resource of 320 MHz is located, P80 is not punctured, and 20 MHz channels in other three 80 MHz channels except P80 may be randomly combined. The 320 MHz channel includes one 320 MHz channel, or two 160 MHz channels, or four 80 MHz channels. In this case, the indication information in the first data packet includes four types of sub-information. |
| Case 11 | Four 20 MHz channels in S80 are numbered and are in a one-to-one correspondence with four 20 MHz channels in P80. The bandwidth information is used to indicate that the first bandwidth is 320 MHz, and in a 320 MHz channel on which a target transmission resource of 320 MHz is located, only S20 in P80 is punctured, a 20 MHz channel 2 (a 20 MHz channel numbered 2 and corresponding to S20) in S80 is not punctured, and 20 MHz channels in another 80 MHz channel except P80 and S80 may be randomly combined. The 320 MHz channel includes one 320 MHz channel, or two 160 MHz channels, or four 80 MHz channels. In this case, the indication information in the first data packet includes four types of sub-information. |
| Case 12 | Two 20 MHz channels in S40 in P80 are numbered in advance, and four 20 MHz channels in S80 are numbered and are in a one-to-one correspondence with four 20 MHz channels in P80. The bandwidth information is used to indicate that the first bandwidth is 320 MHz, and in a 320 MHz channel on which a target transmission resource of 320 MHz is located, a 20 MHz channel 1 (a 20 MHz channel numbered 1) in S40 is punctured, a 20 MHz channel 3 (a 20 MHz channel numbered 3 and corresponding to the 20 MHz channel 1 in S40) in S80 is not punctured, and 20 MHz channels in another 80 MHz channel except P80 and S80 may be randomly combined. The 320 MHz channel includes one 320 MHz channel, or two 160 MHz channels, or four 80 MHz channels. In this case, the indication information in the first data packet includes four types of sub-information. |
| Case 13 | Two 20 MHz channels in S40 are numbered in advance, and four 20 MHz channels in S80 are numbered and are in a one-to-one correspondence with four 20 MHz channels in P80. The bandwidth information is used to indicate that the first bandwidth is 320 MHz, and in a 320 MHz channel on which a target transmission resource of 320 MHz is located, a 20 MHz channel 2 (a 20 MHz channel numbered 2) in S40 is punctured, a 20 MHz channel 4 (a 20 MHz channel numbered 4 and corresponding to the 20 MHz channel 2 in S40) in S80 is not punctured, and 20 MHz channels in another 80 MHz channel except P80 and S80 may be randomly combined. The 320 MHz channel includes one 320 MHz channel, or two 160 MHz channels, or four 80 MHz channels. In this case, the indication information in the first data packet includes four types of sub-information. |
| Case 14 | Two 20 MHz channels in S40 are numbered in advance, and four 20 MHz channels in S80 are numbered and are in a one-to-one correspondence with four 20 MHz channels in P80. The bandwidth information is used to indicate that the first bandwidth is 320 MHz, and in a 320 MHz channel on which a target transmission resource of 320 MHz is located, 20 MHz channels 1 in S20 and S40 are punctured, neither a 20 MHz channel 2 (corresponding to S20) nor a 20 MHz channel 3 (corresponding to the 20 MHz channel 1 in S40) in S80 is punctured, and 20 MHz channels in another 80 MHz channel except P80 and S80 may be randomly combined. The 320 MHz channel includes one 320 MHz channel, or two 160 MHz channels, or four 80 MHz channels. In this case, the indication information in the first data packet includes four types of sub-information. |

TABLE 2-continued

Case 15   Two 20 MHz channels in S40 are numbered in advance, and four 20
         MHz channels in S80 are numbered and are in a one-to-one
         correspondence with four 20 MHz channels in P80. The bandwidth
         information is used to indicate that the first bandwidth is 320 MHz, and
         in a 320 MHz channel on which a target transmission resource of 320
         MHz is located, 20 MHz channels 2 in S20 and S40 are punctured,
         neither a 20 MHz channel 2 (corresponding to S20) nor a 20 MHz
         channel 4 (corresponding to the 20 MHz channel 2 in S40) in S80 is
         punctured, and 20 MHz channels in another 80 MHz channel except
         P80 and S80 may be randomly combined. The 320 MHz channel
         includes one 320 MHz channel, or two 160 MHz channels, or four 80
         MHz channels. In this case, the indication information in the first data
         packet includes four types of sub-information.
Case 16   Two 20 MHz channels in S40 are numbered in advance, and four 20
         MHz channels in S80 are numbered and are in a one-to-one
         correspondence with four 20 MHz channels in P80. The bandwidth
         information is used to indicate that the first bandwidth is 320 MHz, and
         in a 320 MHz channel on which a target transmission resource of 320
         MHz is located, only S40 in P80 is punctured, neither a 20 MHz
         channel 3 (corresponding to a 20 MHz channel 1 in S40) nor a 20 MHz
         channel 4 (corresponding to a 20 MHz channel 2 in S40) in S80 is
         punctured, and 20 MHz channels in another 80 MHz channel except
         P80 and S80 may be randomly combined. The 320 MHz channel
         includes one 320 MHz channel, or two 160 MHz channels, or four 80
         MHz channels. In this case, the indication information in the first data
         packet includes four types of sub-information.
Case 17   Two 20 MHz channels in S40 are numbered in advance, and four 20
         MHz channels in S80 are numbered and are in a one-to-one
         correspondence with four 20 MHz channels in P80. The bandwidth
         information is used to indicate that the first bandwidth is 320 MHz, and
         in a 320 MHz channel on which a target transmission resource of 320
         MHz is located, only S40 and S40 in P80 are punctured, a 20 MHz
         channel 2 (corresponding to S20), a 20 MHz channel 3 (corresponding
         to a 20 MHz channel 1 in S40), and a 20 MHz channel 4 (corresponding
         to a 20 MHz channel 2 in S40) in S80 and S20 and S40 in S80 are not
         punctured, and 20 MHz channels in another 80 MHz channel except
         P80 and S80 may be randomly combined. The 320 MHz channel
         includes one 320 MHz channel, or two 160 MHz channels, or four 80
         MHz channels. In this case, the indication information in the first data
         packet includes four types of sub-information.

Figure 6:
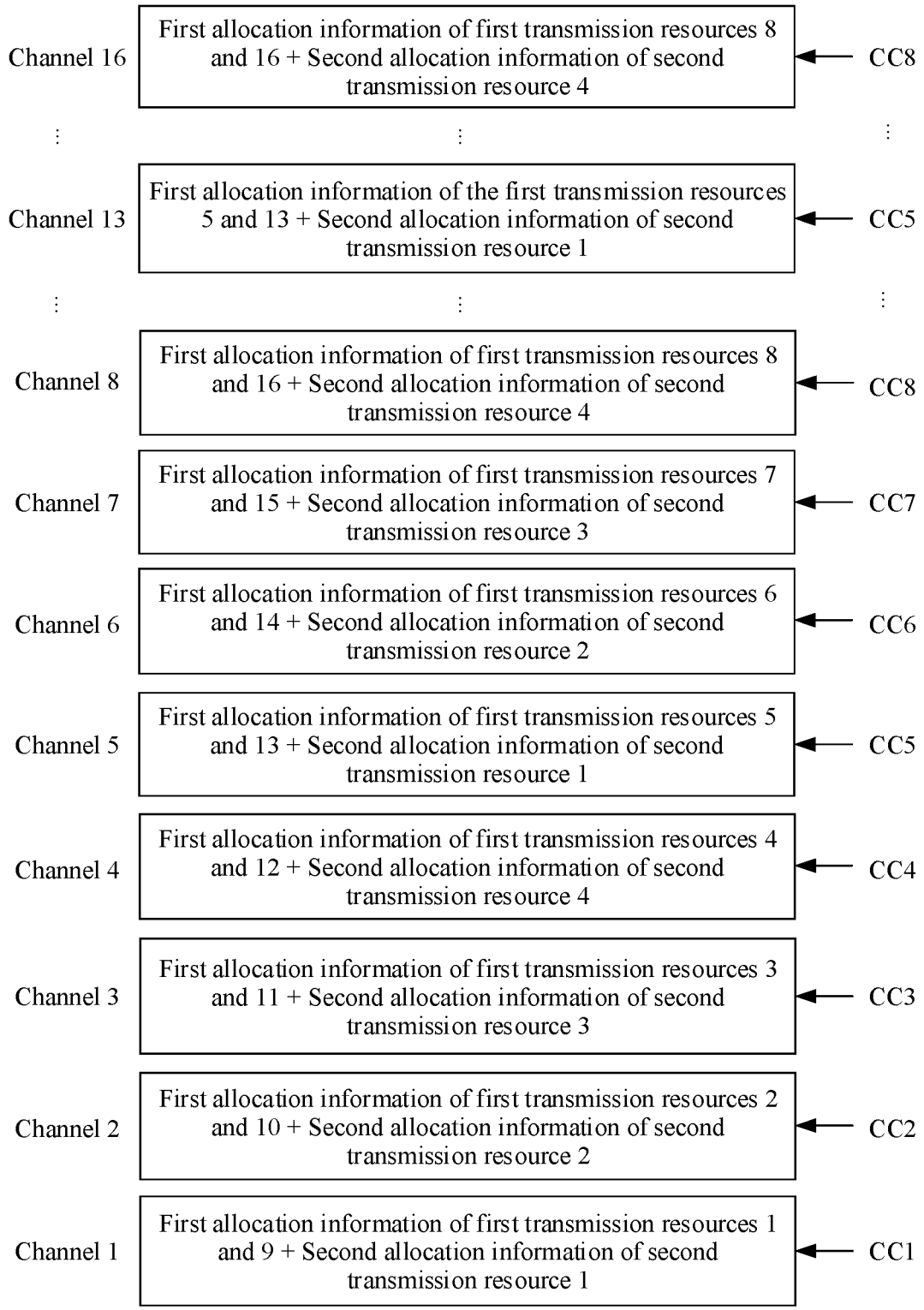
FIG. 6 is a schematic diagram of a third type of sub-information according to an embodiment of this application.

In a third implementable manner of the indication information in the first data packet, as shown in FIG. 6, the first bandwidth is 320 MHz, the target transmission resource includes sixteen first transmission resources and four second transmission resources, and the sixteen first transmission resources form eight sets. The eight sets include a first set including a first transmission resource whose ranking is 1+8i in the sixteen first transmission resources, a second set including a first transmission resource whose ranking is 2+8i in the sixteen first transmission resources, a third set including a first transmission resource whose ranking is 3+8i in the sixteen first transmission resources, a fourth set including a first transmission resource whose ranking is 4+8i in the sixteen first transmission resources, a fifth set including a first transmission resource whose ranking is 5+8i in the sixteen first transmission resources, a sixth set including a first transmission resource whose ranking is 6+8i in the sixteen first transmission resources, a seventh set including a first transmission resource whose ranking is 7+8i in the sixteen first transmission resources, and an eighth set including a first transmission resource whose ranking is 8+8i in the sixteen first transmission resources, where i≥0.

It is assumed that a first transmission resource X represents an $X^{th}$ first transmission resource. In this case, the first set may include first transmission resources 1 and 9 in the sixteen first transmission resources, the second set may include first transmission resources 2 and 10 in the sixteen first transmission resources, the third set may include first transmission resources 3 and 11 in the sixteen first transmission resources, the fourth set may include first transmission resources 4 and 12 in the sixteen first transmission resources, the fifth set may include first transmission resources 5 and 13 in the sixteen first transmission resources, the sixth set may include first transmission resources 6 and 14 in the sixteen first transmission resources, the seventh set may include first transmission resources 7 and 15 in the sixteen first transmission resources, and the eighth set may include first transmission resources 8 and 16 in the sixteen first transmission resources.

The eight sets are classified into four groups, each group includes two sets, and the four sets are in a one-to-one correspondence with the four second transmission resources. For example, the first set and the fifth set form a first group of sets, the second set and the sixth set form a second group of sets, the third set and the seventh set form a third group of sets, and the fourth set and the eighth set form a fourth group of sets. A second transmission resource X represents an $X^{th}$ second transmission resource. In this case, the first group of sets corresponds to a second transmission resource 1 in the four second transmission resources, the second group of sets corresponds to a second transmission resource 2 in the four second transmission resources, the third group of sets corresponds to a second transmission resource 3 in the four second transmission resources, and the fourth group of sets corresponds to a second transmission resource 4 in the four second transmission resources.

The indication information in the first data packet includes eight types of sub-information, the eight types of sub-information are in a one-to-one correspondence with the four sets, and each type of sub-information includes first allocation information of each first transmission resource in a set corresponding to the type of sub-information and second allocation information of each second transmission resource corresponding to a group of sets to which the set corresponding to the type of sub-information belongs. When the first data packet is being sent, each type of sub-information is separately transmitted on two channels, in other words, each type of sub-information is transmitted twice.

For example, one type of sub-information corresponding to the first set may be referred to as first sub-information CC1, one type of sub-information corresponding to the second set may be referred to as second sub-information CC2, one type of sub-information corresponding to the third set may be referred to as third sub-information CC3, one type of sub-information corresponding to the fourth set may be referred to as fourth sub-information CC4, one type of sub-information corresponding to the fifth set may be referred to as fifth sub-information CC5, one type of sub-information corresponding to the sixth set may be referred to as sixth sub-information CC6, one type of sub-information corresponding to the seventh set may be referred to as seventh sub-information CC7, and one type of sub-information corresponding to the eighth set may be referred to as eighth sub-information CC8. The CC1 may include first allocation information of the first transmission resources 1 and 9 and second allocation information of the second transmission resource 1. The CC2 may include first allocation information of the first transmission resources 2 and 10 and second allocation information of the second transmission resource 2. The CC3 may include first allocation information of the first transmission resources 3 and 11 and second allocation information of the second transmission resource 3. The CC4 may include first allocation information of the first transmission resources 4 and 12 and second allocation information of the second transmission resource 4. The CC5 may include first allocation information of the first transmission resources 5 and 13 and the second allocation information of the second transmission resource 1.

The CC6 may include first allocation information of the first transmission resources 6 and 14 and the second allocation information of the second transmission resource 2. The CC7 may include first allocation information of the first transmission resources 7 and 15 and the second allocation information of the second transmission resource 3. The CC8 may include first allocation information of the first transmission resources 8 and 16 and the second allocation information of the second transmission resource 4.

A 320 MHz channel on which the target transmission resource is located may include sixteen 20 MHz channels successively arranged in the frequency domain. It is assumed that a channel X represents an $X^{th}$ 20 MHz channel, and the first transmission resource X is transmitted on the channel X. When the first data packet is being transmitted, one piece of CC1 is transmitted on both channels 1 and 9, one piece of CC2 is transmitted on both channels 2 and 10, one piece of CC3 is transmitted on both channels 3 and 11, one piece of CC4 is transmitted on both channels 4 and 12, one piece of CC5 is transmitted on both channels 5 and 13, one piece of CC6 is transmitted on both channels 6 and 14, one piece of CC7 is transmitted on both channels 7 and 15, and one piece of CC8 is transmitted on both channels 8 and 16.

Optionally, the bandwidth information in the first data packet is further used to indicate a punctured channel and an unpunctured channel that are in the channel on which the target transmission resource is located, and a channel on which at least one piece of sub-information in each type of sub-information is not punctured. It should be noted that the channel on which the target transmission resource is located includes a primary 20 MHz channel (referred to as P20), a secondary 20 MHz channel (referred to as S20), a secondary 40 MHz channel (referred to as S40), a primary 80 MHz channel (referred to as P80), a secondary 80 MHz channel (referred to as S80), and a secondary 160 MHz channel (referred to as S160). The bandwidth information may be used to indicate one or more of 11 cases shown in Table 3, and is not limited to the following cases.

TABLE 3

| | |
|---|---|
| Case 1 | The bandwidth information is used to indicate that the first bandwidth is 20 MHz, and a 20 MHz channel on which a target transmission resource of 20 MHz is located is not punctured. In this case, the indication information in the first data packet includes one type of sub-information. |
| Case 2 | The bandwidth information is used to indicate that the first bandwidth is 40 MHz, and a 40 MHz channel on which a target transmission resource of 40 MHz is located is not punctured. In this case, the indication information in the first data packet includes two types of sub-information. |
| Case 3 | The bandwidth information is used to indicate that the first bandwidth is 80 MHz, and an 80 MHz channel on which a target transmission resource of 80 MHz is located is not punctured. In this case, the indication information in the first data packet includes two, four, or eight types of sub-information. |
| Case 4 | The bandwidth information is used to indicate that the first bandwidth is 160 MHz, and a 160 MHz channel on which a target transmission resource of 160 MHz is located is not punctured. The 160 MHz channel includes one 160 MHz channel or two 80 MHz channels. In this case, the indication information in the first data packet includes two, four, or eight types of sub-information. |
| Case 5 | The bandwidth information is used to indicate that the first bandwidth is 320 MHz, and a 320 MHz channel on which a target transmission resource of 320 MHz is located is not punctured. The 320 MHz channel includes one 320 MHz channel, or two 160 MHz channels, or four 80 MHz channels. In this case, the indication information in the first data packet includes two, four, or eight types of sub-information. |

TABLE 3-continued

| | |
|---|---|
| Case 6 | The bandwidth information is used to indicate that the first bandwidth is 80 MHz, and in an 80 MHz channel on which a target transmission resource of 80 MHz is located, only S20 is punctured. In this case, the indication information in the first data packet includes two types of sub-information. |
| Case 7 | The bandwidth information is used to indicate that the first bandwidth is 80 MHz, and in an 80 MHz channel on which a target transmission resource of 80 MHz is located, only one 20 MHz channel in S40 is punctured. In this case, the indication information in the first data packet includes two types of sub-information. |
| Case 8 | The bandwidth information is used to indicate that the first bandwidth is 160 MHz, and in a 160 MHz channel on which a target transmission resource of 80 MHz is located, only S20 in P80 is punctured, and 20 MHz channels in S80 may be randomly combined. The 160 MHz channel includes one 160 MHz channel or two 80 MHz channels. In this case, the indication information in the first data packet includes two types of sub-information. |
| Case 9 | The bandwidth information is used to indicate that the first bandwidth is 160 MHz, and in a 160 MHz channel on which a target transmission resource of 160 MHz is located, a 40 MHz channel on which P20 is located is not punctured, and 20 MHz channels in S80 may be randomly combined. The 160 MHz channel includes one 160 MHz channel or two 80 MHz channels. In this case, the indication information in the first data packet includes two types of sub-information. |
| Case 10 | The bandwidth information is used to indicate that the first bandwidth is 320 MHz, and in a 320 MHz channel on which a target transmission resource of 320 MHz is located, a 160 MHz channel on which P20 is located is not punctured, and 20 MHz channels in another 80 MHz channel except P80 and S80 may be randomly combined. The 320 MHz channel includes one 320 MHz channel, or two 160 MHz channels, or four 80 MHz channels. In this case, the indication information in the first data packet includes eight types of sub-information. |
| Case 11 | The bandwidth information is used to indicate that the first bandwidth is 320 MHz, and in a 320 MHz channel on which a target transmission resource of 320 MHz is located, other 20 MHz channels except P20 in a 160 MHz channel on which P20 is located may be randomly combined. The 320 MHz channel includes one 320 MHz channel, or two 160 MHz channels, or four 80 MHz channels. The indication information in the first data packet includes eight types of sub-information.<br>In this case, the bandwidth information may further include a bitmap. The bitmap may include seven bits. The bitmap is used to indicate a punctured channel an unpunctured channel in seven 20 MHz channels except P20 in a 160 MHz channel on which P20 is located. |

Figure 7:
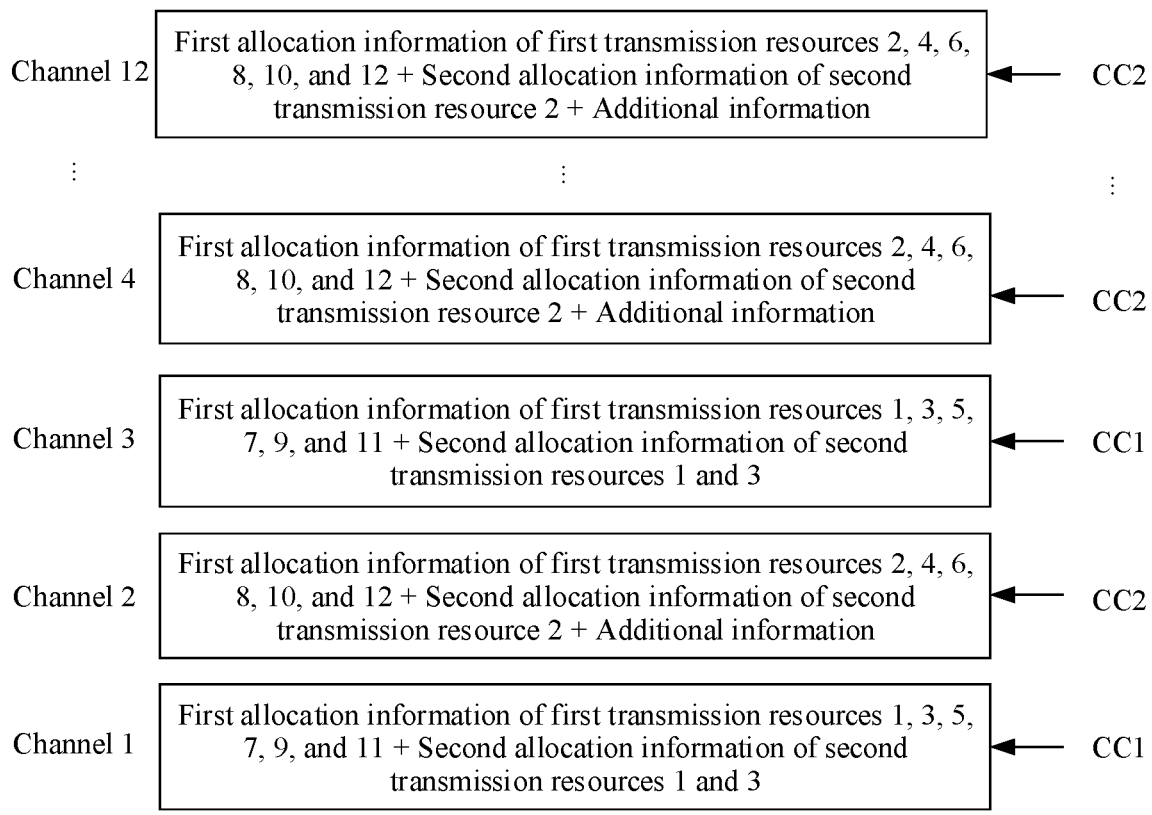
FIG. 7 is a schematic diagram of a fourth type of sub-information according to an embodiment of this application.

In a fourth implementable manner of the indication information in the first data packet, as shown in FIG. 7, the first bandwidth is 240 MHz, the target transmission resource includes twelve first transmission resources and three second transmission resources, and the twelve first transmission resources form two sets. The two sets include a first set including a first transmission resource whose ranking is an odd number in the twelve first transmission resources, and a second set including a first transmission resource whose ranking is an even number in the twelve first transmission resources. The signaling field further includes additional information, and the additional information is the same as second allocation information of any second transmission resource, or the additional information is reserved information. Three pieces of second allocation information of the three second transmission resources and the additional information form two groups of combined information, each group of combined information includes two pieces of information in the additional information and the three pieces of second allocation information, and the two groups of combined information are in a one-to-one correspondence with the two sets.

It is assumed that a first transmission resource X represents an $X^{th}$ first transmission resource, and a second transmission resource X represents an $X^{th}$ second transmission resource. In this case, the first set may include first transmission resources 1, 3, 5, 7, 9, and 11 in the twelve first transmission resources, and the second set may include first transmission resources 2, 4, 6, 8, 10, and 12 in the twelve first transmission resources. Second allocation information of a second transmission resource 1 and second allocation information of a second transmission resource 3 form a first group of combined information, second allocation information of a second transmission resource 2 and the additional information form a second group of combined information, the first set corresponds to the first group of combined information, and the second set corresponds to the second group of combined information.

The signaling field includes two types of sub-information, the two types of sub-information are in a one-to-one correspondence with the two sets, and each type of sub-information includes first allocation information of each first transmission resource in a set corresponding to the type of sub-information and a group of combined information corresponding to the set corresponding to the type of sub-information. When the first data packet is being sent, each type of sub-information is separately transmitted on six channels, in other words, each type of sub-information is transmitted six times.

For example, one type of sub-information corresponding to the first set may be referred to as first sub-information CC1, and one type of sub-information corresponding to the second set may be referred to as second sub-information CC2. The CC1 may include first allocation information of the first transmission resources 1, 3, 5, 7, 9, and 11, and second allocation information of the second transmission resources 1 and 3. The CC2 may include first allocation information of the first transmission resources 2, 4, 6, 8, 10, and 12, second allocation information of the second transmission resource 2, and the additional information.

A 240 MHz channel on which the target transmission resource is located may include twelve 20 MHz channels successively arranged in the frequency domain. It is assumed that a channel X represents an $X^{th}$ 20 MHz channel, and the first transmission resource X is transmitted on the channel X. When the first data packet is being transmitted, one piece of CC1 is transmitted on each of channels 1, 3, 5, 7, 9, and 11, and one piece of CC2 is transmitted on each of channels 2, 4, 6, 8, 10, and 12.

Optionally, the bandwidth information in the first data packet is further used to indicate a punctured channel and an unpunctured channel that are in the channel on which the target transmission resource is located, and a channel on which at least one piece of sub-information in each type of sub-information is not punctured. It should be noted that the channel on which the target transmission resource is located includes a primary 20 MHz channel (referred to as P20), a secondary 20 MHz channel (referred to as S20), a secondary 40 MHz channel (referred to as S40), a primary 80 MHz channel (referred to as P80), and a secondary 80 MHz channel (referred to as S80). The bandwidth information may be used to indicate one or more of 11 cases shown in Table 4, and is not limited to the following cases.

TABLE 4

| | |
|---|---|
| Case 1 | The bandwidth information is used to indicate that the first bandwidth is 20 MHz, and a 20 MHz channel on which a target transmission resource of 20 MHz is located is not punctured. In this case, the indication information in the first data packet includes one type of sub-information. |
| Case 2 | The bandwidth information is used to indicate that the first bandwidth is 40 MHz, and a 40 MHz channel on which a target transmission resource of 40 MHz is located is not punctured. In this case, the indication information in the first data packet includes two types of sub-information. |
| Case 3 | The bandwidth information is used to indicate that the first bandwidth is 80 MHz, and an 80 MHz channel on which a target transmission resource of 80 MHz is located is not punctured. In this case, the indication information in the first data packet includes two types of sub-information. |
| Case 4 | The bandwidth information is used to indicate that the first bandwidth is 160 MHz, and a 160 MHz channel on which a target transmission resource of 160 MHz is located is not punctured. The 160 MHz channel includes one 160 MHz channel or two 80 MHz channels. In this case, the indication information in the first data packet includes two types of sub-information. |
| Case 5 | The bandwidth information is used to indicate that the first bandwidth is 240 MHz, and a 240 MHz channel on which a target transmission resource of 240 MHz is located is not punctured. The 240 MHz channel includes one 240 MHz channel, or includes one 160 MHz channel and two 80 MHz channels, or includes three 80 MHz channels, or includes four 60 MHz channels. In this case, the indication information in the first data packet includes two types of sub-information. |
| Case 6 | The bandwidth information is used to indicate that the first bandwidth is 80 MHz, and in an 80 MHz channel on which a target transmission resource of 80 MHz is located, only S20 is punctured. In this case, the indication information in the first data packet includes two types of sub-information. |
| Case 7 | The bandwidth information is used to indicate that the first bandwidth is 80 MHz, and in an 80 MHz channel on which a target transmission resource of 80 MHz is located, only one 20 MHz channel in S40 is punctured. In this case, the indication information in the first data packet includes two types of sub-information. |
| Case 8 | The bandwidth information is used to indicate that the first bandwidth is 160 MHz, and in a 160 MHz channel on which a target transmission resource of 160 MHz is located, only S20 in P80 is punctured, and 20 MHz channels in S80 may be randomly combined. The 160 MHz channel includes one 160 MHz channel or two 80 MHz channels. In this case, the indication information in the first data packet includes two types of sub-information. |
| Case 9 | The bandwidth information is used to indicate that the first bandwidth is 160 MHz, and in a 160 MHz channel on which a target transmission resource of 160 MHz is located, only a 40 MHz channel on which P20 is located is not punctured, and 20 MHz channels in S80 may be randomly combined. The 160 MHz channel includes one 160 MHz channel or two 80 MHz channels. In this case, the indication information in the first data packet includes two types of sub-information. |
| Case 10 | The bandwidth information is used to indicate that the first bandwidth is 240 MHz, and in a 240 MHz channel on which a target transmission resource of 240 MHz is located, only S20 in P80 is punctured, and 20 MHz channels in another 80 MHz channel except P80 and S80 may be randomly combined. The 240 MHz channel includes one 240 MHz channel, or includes one 160 MHz channel and one 80 MHz channel, or includes three 80 MHz channels, or includes four 60 MHz channels. In this case, the indication information in the first data packet includes two types of sub-information. |

TABLE 4-continued

| Case 11 | The bandwidth information is used to indicate that the first bandwidth is 240 MHz, and in a 240 MHz channel on which a target transmission resource of 240 MHz is located, only a 40 MHz channel on which P20 is located is not punctured, and 20 MHz channels in another 80 MHz channel except P80 and S80 may be randomly combined. The 240 MHz channel includes one 240 MHz channel, or includes one 160 MHz channel and one 80 MHz channel, or includes three 80 MHz channels, or includes four 60 MHz channels. In this case, the indication information in the first data packet includes two types of sub-information. |
|---|---|

Figure 8:
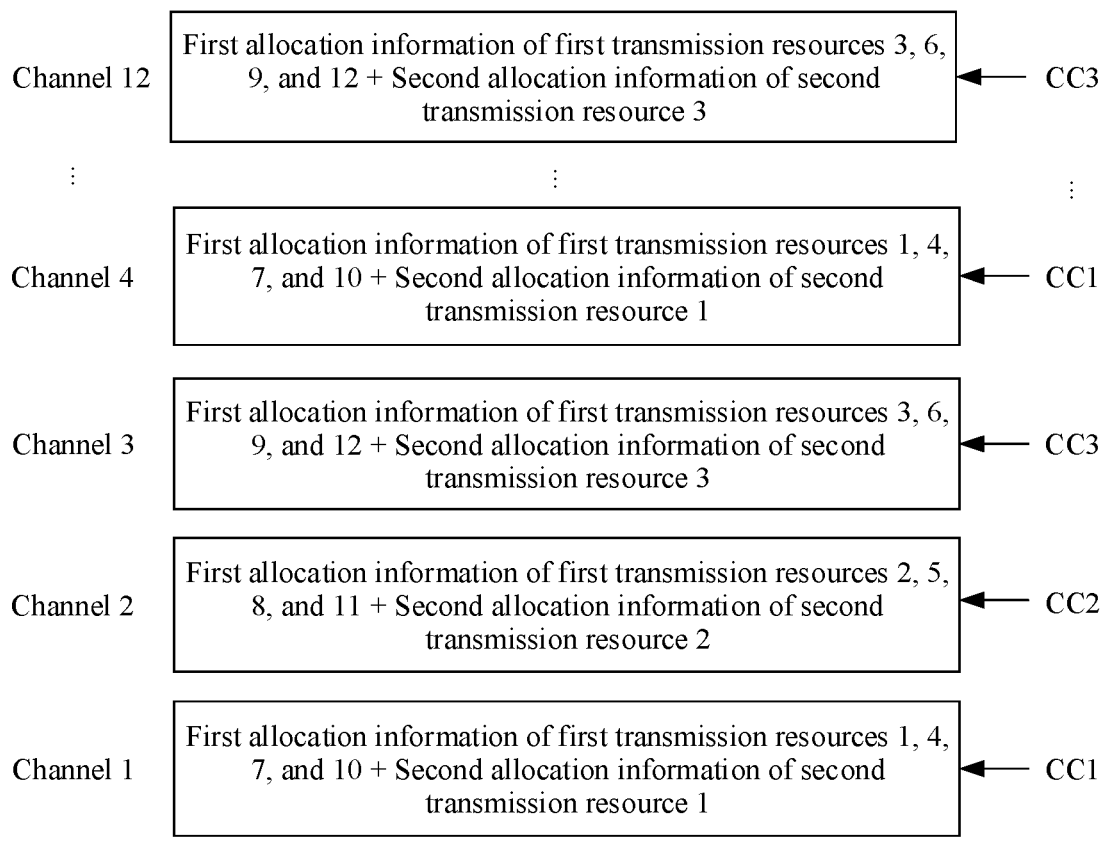
FIG. 8 is a schematic diagram of a fifth type of sub-information according to an embodiment of this application.

In a fifth implementable manner of the indication information in the first data packet, as shown in FIG. 8, the first bandwidth is 240 MHz, the target transmission resource includes twelve first transmission resources and three second transmission resources, and the twelve first transmission resources form three sets. The three sets include a first set including a first transmission resource whose ranking is 1+3i in the twelve first transmission resources, a second set including a first transmission resource whose ranking is 2+3i in the twelve first transmission resources, and a third set including a first transmission resource whose ranking is 3+3i in the twelve first transmission resources, where i≥0. The three sets are in a one-to-one correspondence with the three second transmission resources.

It is assumed that a first transmission resource X represents an $X^{th}$ first transmission resource, and a second transmission resource X represents an $X^{th}$ second transmission resource. In this case, the first set may include first transmission resources 1, 4, 7, and 10 in the twelve first transmission resources, the second set may include first transmission resources 2, 5, 8, and 11 in the twelve first transmission resources, and the third set may include first transmission resources 3, 6, 9, and 12 in the twelve first transmission resources. The first set corresponds to a second transmission resource 1 in the three second transmission resources, the second set corresponds to a second transmission resource 2 in the three second transmission resources, and the third set corresponds to a second transmission resource 3 in the three second transmission resources.

The indication information in the first data packet includes three types of sub-information, the three types of sub-information are in a one-to-one correspondence with the three sets, and each type of sub-information includes first allocation information of each first transmission resource in a set corresponding to the type of sub-information, and second allocation information of each second transmission resource corresponding to the set corresponding to the type of sub-information. When the first data packet is being sent, each type of sub-information is separately transmitted on four channels, in other words, each type of sub-information is transmitted four times.

For example, one type of sub-information corresponding to the first set may be referred to as first sub-information CC1, one type of sub-information corresponding to the second set may be referred to as second sub-information CC2, and one type of sub-information corresponding to the third set may be referred to as third sub-information CC3. The CC1 may include first allocation information of the first transmission resources 1, 4, 7, and the 10, and second allocation information of the second transmission resource 1. The CC2 may include first allocation information of the first transmission resources 2, 5, 8, and 11, and second allocation information of the second transmission resource 2. The CC3 may include first allocation information of the first transmission resources 3, 6, 9, and 12, and second allocation information of the second transmission resource 3.

A 240 MHz channel on which the target transmission resource is located may include twelve 20 MHz channels successively arranged in the frequency domain. It is assumed that a channel X represents an $X^{th}$ 20 MHz channel, and the first transmission resource X is transmitted on the channel X. When the first data packet is being transmitted, one piece of CC1 is transmitted on each of channels 1, 4, 7, and 10, one piece of CC2 is transmitted on each of channels 2, 5, 8, and 11, and one piece of CC3 is transmitted on each of channels 3, 6, 9, and 12.

Optionally, the bandwidth information in the first data packet is further used to indicate a punctured channel and an unpunctured channel that are in the channel on which the target transmission resource is located, and a channel on which at least one piece of sub-information in each type of sub-information is not punctured. It should be noted that the channel on which the target transmission resource is located includes a primary 20 MHz channel (referred to as P20), a secondary 20 MHz channel (referred to as S20), a secondary 40 MHz channel (referred to as S40), a primary 80 MHz channel (referred to as P80), and a secondary 80 MHz channel (referred to as S80). The bandwidth information may be used to indicate one or more of 17 cases shown in Table 5, and is not limited to the following cases.

TABLE 5

| Case 1 | The bandwidth information is used to indicate that the first bandwidth is 20 MHz, and a 20 MHz channel on which a target transmission resource of 20 MHz is located is not punctured. In this case, the indication information in the first data packet includes one type of sub-information. |
|---|---|
| Case 2 | The bandwidth information is used to indicate that the first bandwidth is 40 MHz, and a 40 MHz channel on which a target transmission resource of 40 MHz is located is not punctured. In this case, the indication information in the first data packet includes two types of sub-information. |

TABLE 5-continued

| | |
|---|---|
| Case 3 | The bandwidth information is used to indicate that the first bandwidth is 80 MHz, and an 80 MHz channel on which a target transmission resource of 80 MHz is located is not punctured. In this case, the indication information in the first data packet includes two or three types of sub-information. |
| Case 4 | The bandwidth information is used to indicate that the first bandwidth is 160 MHz, and a 160 MHz channel on which a target transmission resource of 160 MHz is located is not punctured. The 160 MHz channel includes one 160 MHz channel or two 80 MHz channels. In this case, the indication information in the first data packet includes two or three types of sub-information. |
| Case 5 | The bandwidth information is used to indicate that the first bandwidth is 240 MHz, and a 240 MHz channel on which a target transmission resource of 240 MHz is located is not punctured. The 240 MHz channel includes one 240 MHz channel, or includes one 160 MHz channel and two 80 MHz channels, or includes three 80 MHz channels, or includes four 60 MHz channels. In this case, the indication information in the first data packet includes two or three types of sub-information. |
| Case 6 | The bandwidth information is used to indicate that the first bandwidth is 80 MHz, and in an 80 MHz channel on which a target transmission resource of 80 MHz is located, only S20 is punctured. In this case, the indication information in the first data packet includes two types of sub-information. |
| Case 7 | The bandwidth information is used to indicate that the first bandwidth is 80 MHz, and in an 80 MHz channel on which a target transmission resource of 80 MHz is located, only one 20 MHz channel in S40 is punctured. In this case, the indication information in the first data packet includes two types of sub-information. |
| Case 8 | The bandwidth information is used to indicate that the first bandwidth is 160 MHz, and in a 160 MHz channel on which a target transmission resource of 80 MHz is located, only S20 in P80 is punctured, and 20 MHz channels in S80 may be randomly combined. The 160 MHz channel includes one 160 MHz channel or two 80 MHz channels. In this case, the indication information in the first data packet includes two types of sub-information. |
| Case 9 | The bandwidth information is used to indicate that the first bandwidth is 160 MHz, and in a 160 MHz channel on which a target transmission resource of 160 MHz is located, only a 40 MHz channel on which P20 is located is not punctured, and 20 MHz channels in S80 may be randomly combined. The 160 MHz channel includes one 160 MHz channel or two 80 MHz channels. In this case, the indication information in the first data packet includes two types of sub-information. |
| Case 10 | The bandwidth information is used to indicate that the first bandwidth is 240 MHz, and in a 240 MHz channel on which a target transmission resource of 240 MHz is located, at least one channel used to transmit CC1, at least one channel used to transmit CC2, and at least one channel used to transmit CC3 in P80 are not punctured, and 20 MHz channels in another 80 MHz channel except P80 and S80 may be randomly combined. The 240 MHz channel includes one 240 MHz channel, or includes one 160 MHz channel and one 80 MHz channel, or includes three 80 MHz channels, or includes four 60 MHz channels. In this case, the indication information in the first data packet includes three types of sub-information. |
| Case 11 | Three 80 MHz channels in a 240 MHz channel are numbered in advance. The bandwidth information is used to indicate that the first bandwidth is 240 MHz, and in a 240 MHz channel on which a target transmission resource of 240 MHz is located, a channel used to transmit CC1 in P80 is punctured, at least one 20 MHz channel used to transmit the CC1 in an 80 MHz channel 2 (an 80 MHz channel numbered 2) is not punctured, and 20 MHz channels in an 80 MHz channel 3 (an 80 MHz channel numbered 3) may be randomly combined. The 240 MHz channel includes one 240 MHz channel, or includes one 160 MHz channel and one 80 MHz channel, or includes three 80 MHz channels, or includes four 60 MHz channels. In this case, the indication information in the first data packet includes three types of sub-information. |
| Case 12 | Three 80 MHz channels in a 240 MHz channel are numbered in advance. The bandwidth information is used to indicate that the first bandwidth is 240 MHz, and in a 240 MHz channel on which a target transmission resource of 240 MHz is located, a channel used to transmit CC2 in P80 is punctured, at least one 20 MHz channel used to transmit the CC2 in an 80 MHz channel 2 is not punctured, and 20 MHz channels in an 80 MHz channel 3 may be randomly combined. The 240 MHz channel includes one 240 MHz channel, or includes one 160 MHz channel and one 80 MHz channel, or includes three 80 MHz channels, or includes four 60 MHz channels. In this case, the indication information in the first data packet includes three types of sub-information. |

TABLE 5-continued

| | |
|---|---|
| Case 13 | Three 80 MHz channels in a 240 MHz channel are numbered in advance. The bandwidth information is used to indicate that the first bandwidth is 240 MHz, and in a 240 MHz channel on which a target transmission resource of 240 MHz is located, a channel used to transmit CC3 in P80 is punctured, at least one 20 MHz channel used to transmit the CC3 in an 80 MHz channel 2 is not punctured, and 20 MHz channels in an 80 MHz channel 3 may be randomly combined. The 240 MHz channel includes one 240 MHz channel, or includes one 160 MHz channel and one 80 MHz channel, or includes three 80 MHz channels, or includes four 60 MHz channels. In this case, the indication information in the first data packet includes three types of sub-information. |
| Case 14 | Three 80 MHz channels in a 240 MHz channel are numbered in advance. The bandwidth information is used to indicate that the first bandwidth is 240 MHz, and in a 240 MHz channel on which a target transmission resource of 240 MHz is located, channels used to transmit CC1 and CC2 in P80 are punctured, at least one 20 MHz channel used to transmit the CC1 and at least one 20 MHz channel used to transmit the CC2 in an 80 MHz channel 2 are not punctured, and 20 MHz channels in an 80 MHz channel 3 may be randomly combined. The 240 MHz channel includes one 240 MHz channel, or includes one 160 MHz channel and one 80 MHz channel, or includes three 80 MHz channels, or includes four 60 MHz channels. In this case, the indication information in the first data packet includes three types of sub-information. |
| Case 15 | Three 80 MHz channels in a 240 MHz channel are numbered in advance. The bandwidth information is used to indicate that the first bandwidth is 240 MHz, and in a 240 MHz channel on which a target transmission resource of 240 MHz is located, channels used to transmit CC1 and CC3 in P80 are punctured, at least one 20 MHz channel used to transmit the CC1 and at least one 20 MHz channel used to transmit the CC3 in an 80 MHz channel 2 are not punctured, and 20 MHz channels in an 80 MHz channel 3 may be randomly combined. The 240 MHz channel includes one 240 MHz channel, or includes one 160 MHz channel and one 80 MHz channel, or includes three 80 MHz channels, or includes four 60 MHz channels. In this case, the indication information in the first data packet includes three types of sub-information. |
| Case 16 | Three 80 MHz channels in a 240 MHz channel are numbered in advance. The bandwidth information is used to indicate that the first bandwidth is 240 MHz, and in a 240 MHz channel on which a target transmission resource of 240 MHz is located, channels used to transmit CC2 and CC3 in P80 are punctured, at least one 20 MHz channel used to transmit the CC2 and at least one 20 MHz channel used to transmit the CC3 in an 80 MHz channel 2 are not punctured, and 20 MHz channels in an 80 MHz channel 3 may be randomly combined. The 240 MHz channel includes one 240 MHz channel, or includes one 160 MHz channel and one 80 MHz channel, or includes three 80 MHz channels, or includes four 60 MHz channels. In this case, the indication information in the first data packet includes three types of sub-information. |
| Case 17 | Three 80 MHz channels in a 240 MHz channel are numbered in advance. The bandwidth information is used to indicate that the first bandwidth is 240 MHz, and in a 240 MHz channel on which a target transmission resource of 240 MHz is located, channels used to transmit CC1, CC2, and CC3 in P80 are punctured, at least one 20 MHz channel used to transmit the CC1, at least one 20 MHz channel used to transmit the CC2, and at least one 20 MHz channel used to transmit the CC3 in an 80 MHz channel 2 are not punctured, and 20 MHz channels in an 80 MHz channel 3 may be randomly combined. The 240 MHz channel includes one 240 MHz channel, or includes one 160 MHz channel and one 80 MHz channel, or includes three 80 MHz channels, or includes four 60 MHz channels. In this case, the indication information in the first data packet includes three types of sub-information. |

It should be noted that, in a plurality of cases shown in Table 1 to Table 5, the bandwidth information may directly indicate whether a channel is not punctured, or may indicate, in a manner of indicating CC, whether a channel for transmitting the CC is not punctured. In actual application, in each of the foregoing plurality of cases, the bandwidth information may indicate, in any one of the foregoing two manners, whether a channel is not punctured. This is not limited in this embodiment of this application. In addition, when the bandwidth information indicates, in the manner of indicating CC, whether the channel for transmitting the CC is punctured, it may be further specified that P20 in the entire target transmission resource needs to be unpunctured. In this case, in the foregoing plurality of cases, a case in which P20 is punctured needs to be deleted.

Figure 9:
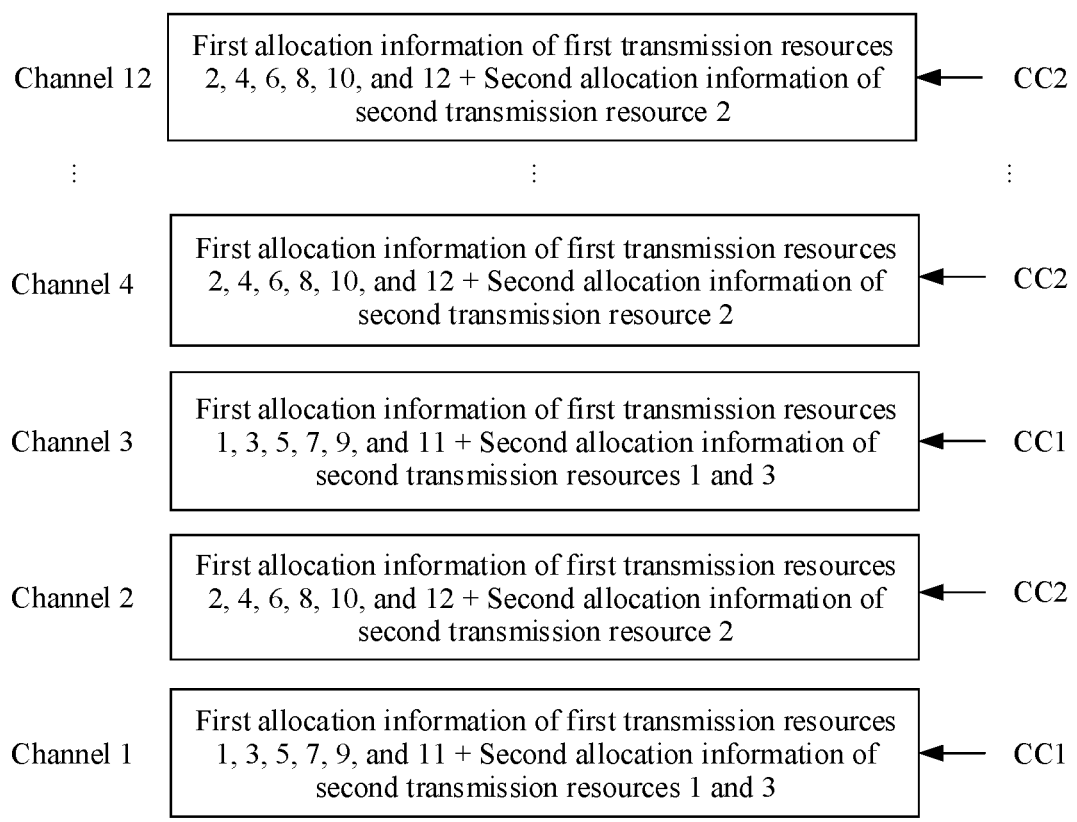
FIG. 9 is a schematic diagram of a sixth type of sub-information according to an embodiment of this application.

In a sixth implementable manner of the indication information in the first data packet, as shown in FIG. 9, based on the fifth implementable manner of the first data packet, the additional information in the indication information may be deleted. In this case, the second allocation information of the three second transmission resources is classified into two groups of second allocation information, one group of second allocation information includes two pieces of sub-information, the other group of second allocation information includes one piece of sub-information, and the two groups of second allocation information are in a one-to-one correspondence with the two sets. It is assumed that a second transmission resource X represents an $X^{th}$ second transmission resource. In this case, second allocation information of the second transmission resources 1 and 3 may form a first group of second allocation information, second allocation information of the second transmission resource 2 forms a second group of second allocation information, the first set corresponds to the first group of second allocation information, and the second set corresponds to the second group of second allocation information.

Figure 10:
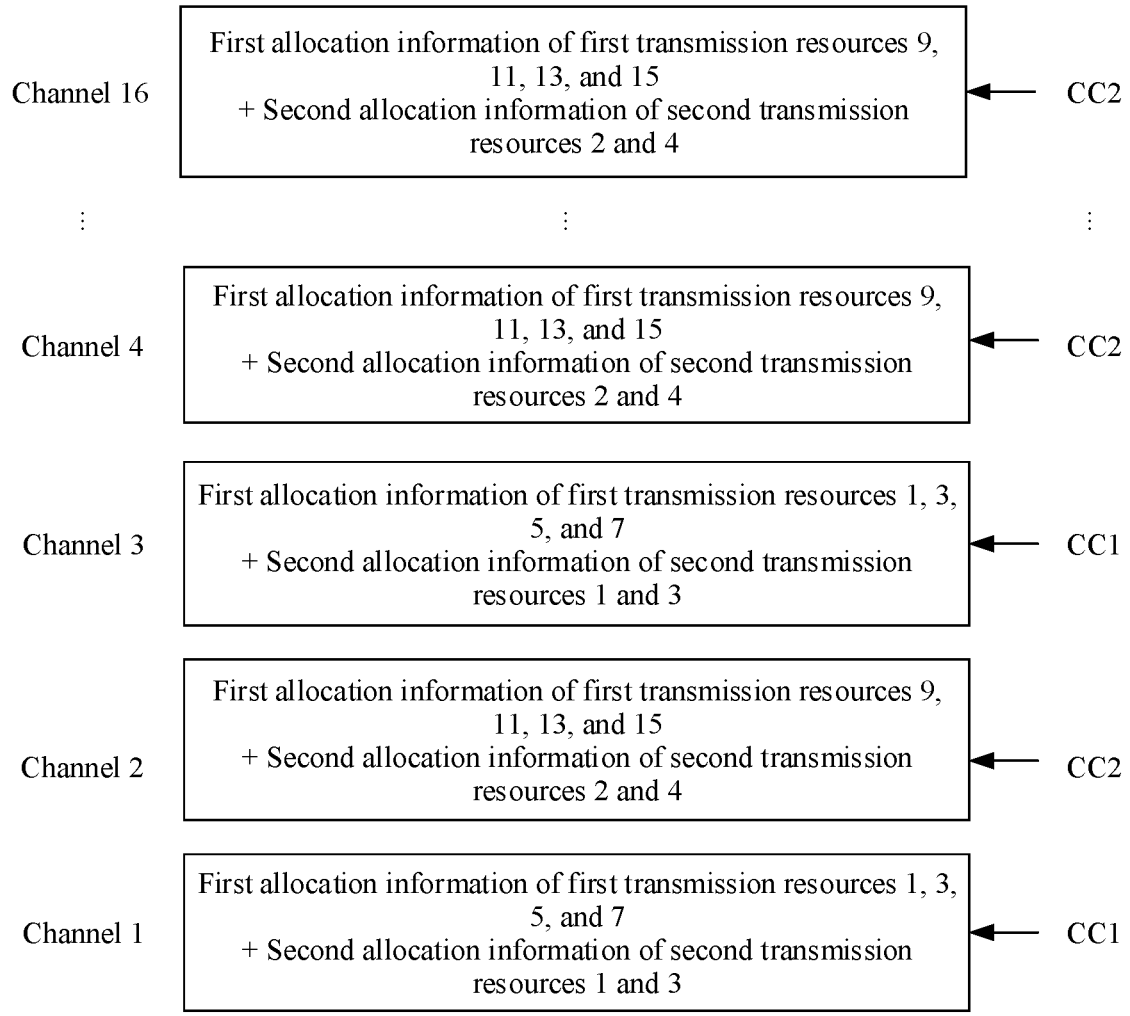
FIG. 10 is a schematic diagram of a seventh type of sub-information according to an embodiment of this application.

In a seventh implementable manner of the indication information in the first data packet, as shown in FIG. 10, the first bandwidth is 320 MHz, the target transmission resource includes sixteen first transmission resources and four second transmission resources, and the sixteen first transmission resources form two sets. The two sets include a first set including first eight first transmission resources in the sixteen first transmission resources, and a second set including last eight first transmission resources in the sixteen first transmission resources. The first set corresponds to a second transmission resource whose ranking is an odd number in the four second transmission resources, and the second set corresponds to a second transmission resource whose ranking is an even number in the four second transmission resources.

It is assumed that a first transmission resource X represents an $X^{th}$ first transmission resource, and a second transmission resource X represents an $X^{th}$ second transmission resource. In this case, the first set may include first transmission resources 1, 2, 3, 4, 5, 6, 7, and 8 in the sixteen first transmission resources, and the second set may include first transmission resources 9, 10, 11, 12, 13, 14, 15, and 16 in the sixteen first transmission resources. The first set corresponds to second transmission resources 1 and 3 in the four second transmission resources, and the second set corresponds to second transmission resources 2 and 4 in the four second transmission resources.

The signaling field includes two types of sub-information, the two types of sub-information are in a one-to-one correspondence with the two sets, and each type of sub-information includes first allocation information of a first transmission resource whose ranking is an odd number (or an even number) in a set corresponding to the type of sub-information, and second allocation information of a second transmission resource corresponding to the set corresponding to the type of sub-information. When the first data packet is being sent, one type of sub-information is transmitted on a first transmission resource whose ranking is an odd number in the sixteen first transmission resources, and the other type of sub-information is transmitted on a first transmission resource whose ranking is an even number in the sixteen first transmission resources. First allocation information of a $(1+2i)^{th}$ first transmission resource in the set corresponding to each type of sub-information is the same as first allocation information of a $(2+2i)^{th}$ first transmission resource, where i≥0. Each type of sub-information includes the first allocation information of the first transmission resource whose ranking is the odd number (or an even number) in the set corresponding to the type of sub-information. Therefore, each type of sub-information includes only first allocation information of half of first transmission resources in the set, so that the sub-information is relatively small, and signaling overheads of the sub-information are relatively small.

For example, one type of sub-information corresponding to the first set may be referred to as first sub-information CC1, and one type of sub-information corresponding to the second set may be referred to as second sub-information CC2. The CC1 may include first allocation information of the first transmission resources 1, 3, 5, and 7, and second allocation information of the second transmission resources 1 and 3. The CC2 may include first allocation information of the first transmission resources 9, 11, 13, and 15, and second allocation information of the second transmission resources 2 and 4. The first allocation information of the first transmission resource 1 is the same first allocation information of the first transmission resource 2, the first allocation information of the first transmission resource 3 is the same first allocation information of the first transmission resource 4, the first allocation information of the first transmission resource 5 is the same first allocation information of the first transmission resource 6, the first allocation information of the first transmission resource 7 is the same first allocation information of the first transmission resource 8, the first allocation information of the first transmission resource 9 is the same first allocation information of the first transmission resource 10, the first allocation information of the first transmission resource 11 is the same first allocation information of the first transmission resource 12, the first allocation information of the first transmission resource 13 is the same first allocation information of the first transmission resource 14, and the first allocation information of the first transmission resource 15 is the same first allocation information of the first transmission resource 16. When the first data packet is being transmitted, one piece of CC1 is transmitted on all channels on which the first transmission resources 1, 3, 5, 7, 9, 11, 13, and 15 are located, and one piece of CC2 is transmitted on all channels on which the first transmission resources 2, 4, 6, 8, 10, 12, 14, and 16 are located.

In an eighth implementable manner of the indication information in the first data packet, the first bandwidth is 320 MHz, the target transmission resource includes sixteen first transmission resources and four second transmission resources, and the sixteen first transmission resources form two sets. The two sets include a first set including first eight first transmission resources in the sixteen first transmission resources, and a second set including last eight first transmission resources in the sixteen first transmission resources. The first set corresponds to a second transmission resource whose ranking is an odd number in the four second transmission resources, and the second set corresponds to a second transmission resource whose ranking is an even number in the four second transmission resources.

It is assumed that a first transmission resource X represents an $X^{th}$ first transmission resource, and a second transmission resource X represents an $X^{th}$ second transmission resource. In this case, the first set may include first transmission resources 1, 2, 3, 4, 5, 6, 7, and 8 in the sixteen first transmission resources, and the second set may include first transmission resources 9, 10, 11, 12, 13, 14, 15, and 16 in the sixteen first transmission resources. The first set corresponds to second transmission resources 1 and 3 in the four second transmission resources, and the second set corresponds to second transmission resources 2 and 4 in the four second transmission resources.

It should be noted that eight first transmission resources in each set may be classified into four groups of first transmission resources successively arranged in the frequency domain, and each group of first transmission resources includes two first transmission resources adjacent to each other in the frequency domain. For example, one set is classified into a first group of first transmission resources (including the first transmission resources 1 and 2), a second group of first transmission resources (including the first transmission resources 3 and 4), a third group of first transmission resources (including the first transmission resources 5 and 6), and a fourth group of first transmission resources (including the first transmission resources 7 and 8); and the other set is classified into a first group of first transmission resources (including the first transmission resources 9 and 10), a second group of first transmission resources (including the first transmission resources 11 and 12), a third group of first transmission resources (including the first transmission resources 13 and 14), and a fourth group of first transmission resources (including the first transmission resources 15 and 16).

Each group of first transmission resources includes a 484-subcarrier RU. It is assumed that first allocation information of two first transmission resources in the group of first transmission resources indicates that the two first transmission resources include eighteen first RUs successively arranged in the frequency domain, each first RU includes a 26-subcarrier RU, the eighteen first RUs are classified into nine groups of RUs, a first group of RUs includes a first first RU and a second first RU, a second group of RUs includes a third first RU and a fourth first RU, a third group of RUs includes a fifth first RU and a fourteenth first RU, a fourth group of RUs includes a sixth first RU and a seventh first RU, a fifth group of RUs includes an eighth first RU and a ninth first RU, a sixth group of RUs includes a tenth first RU and an eleventh first RU, a seventh group of RUs includes a twelfth first RU and a thirteenth first RU, an eighth group of RUs includes a fifteenth first RU and a sixteenth first RU, and a ninth group of RUs includes a seventeenth first RU and an eighteenth first RU. Two first RUs in each group of RUs are allocated to a same receive end.

First allocation information corresponding to each group of first transmission resources may include first allocation information corresponding to each group of first RUs in the group of first transmission resources, and the first allocation information corresponding to each group of first RUs may include information used to indicate a receive end to which any RU in the group of first RUs is allocated. In other words, the first allocation information corresponding to each group of first RUs is one-half of the first allocation information of each group of first transmission resources. The signaling field includes two types of sub-information, the two types of sub-information are in a one-to-one correspondence with the two sets, and each type of sub-information includes first allocation information corresponding to each group of first transmission resources in a set corresponding to the type of sub-information and second allocation information of a second transmission resource corresponding to the set corresponding to the type of sub-information. When the first data packet is being sent, one type of sub-information is transmitted on a channel whose ranking is an odd number, and the other type of sub-information is transmitted on a channel whose ranking is an even number. In this implementation, an amount of first allocation information included in each type of sub-information is relatively small. Therefore, a data amount of each type of sub-information is relatively small, so that signaling overheads of the type of sub-information are greatly reduced.

It should be noted that, in both the seventh implementable manner and the eighth implementable manner of the indication information, that the first bandwidth is 320 MHz is used as an example. In actual application, in the seventh implementable manner and the eighth implementable manner, the first bandwidth may be alternatively 240 MHz. When the first bandwidth is 240 MHz, for a structure of the indication information, refer to a structure of the indication information in the seventh implementable manner and the eighth implementable manner, so that when the first bandwidth is 240 MHz, a data amount of the indication information is also relatively small, and therefore, signaling overheads of the indication information can also be reduced.

Optionally, during generation of the first data packet, each type of transmission resources in the target transmission resource (the first transmission resource and the second transmission resource are two types of transmission resources) may be further limited. For example, when the first bandwidth is relatively high (for example, the first bandwidth is greater than 160 MHz), it may be forbidden to set the first RU in the first transmission resource to at least one RU in a 26-subcarrier RU, a 52-subcarrier RU, and a 106-subcarrier RU, and it may also be set that the target transmission resource does not include the second transmission resource. In this way, each transmission resource in the target transmission resource is relatively large, a quantity of transmission resources in the target transmission resource is relatively small, the indication information in the first data packet is relatively simple, and signaling overheads of the signaling field are relatively small. It should be noted that a 26-subcarrier RU located at a center in each first transmission resource may be selectively allowed to be set to the first transmission resource in the target transmission resource, and the target transmission resource may also selectively include the second transmission resource. This is not limited in this embodiment of this application.

Optionally, signaling overheads of the indication information are reduced if the seventh implementable manner or the eighth implementable manner is used for the indication information during generation of the first data packet, or if a manner of limiting each type of transmission resources in the target transmission resource is used during generation of the first data packet. The signaling field may further include manner information, and the manner information is used to indicate whether a manner of reducing the signaling overheads of the indication information is used during generation of the first data packet.

Optionally, in the foregoing embodiment, an implementation manner of the indication information in the signaling field when the target transmission resource includes m first transmission resources successively arranged in the frequency domain and n second transmission resources successively arranged in the frequency domain and the first transmission resource includes a 242-subcarrier RU is described as an example. In actual application, the signaling field may further not include the indication information in the foregoing embodiment. For example, the signaling field may include third allocation information of the target transmission resource, the third allocation information is used to indicate at least one third transmission resource obtained by dividing the target transmission resource and a PSDU transmitted on each third transmission resource, and each third transmission resource is an integer multiple of an 80 MHz band.

For example, when the first bandwidth indicated by the bandwidth information in the first data packet is 320 MHz, the third allocation information may be used to indicate one or more of five cases shown in Table 6, and is not limited to the following cases.

TABLE 6

| Case | |
|---|---|
| Case 1 | The third allocation information is used to indicate one third transmission resource obtained by dividing the target transmission resource, and the third transmission resource is used to transmit one PSDU. |
| Case 2 | The third allocation information is used to indicate two third transmission resources obtained by dividing the target transmission resource, each third transmission resource includes a 160 MHz band in the target transmission resource, and the two third transmission resources are respectively used to transmit two PSDUs. |
| Case 3 | The third allocation information is used to indicate two third transmission resources obtained by dividing the target transmission resource, one third transmission resource includes an 80 MHz band including P20 in the target transmission resource, the other third transmission resource includes a remaining 240 MHz channel in the target transmission resource, and the two third transmission resources are respectively used to transmit two PSDUs. |
| Case 4 | The third allocation information is used to indicate two third transmission resources obtained by dividing the target transmission resource, one third transmission resource includes a 240 MHz band including P20 in the target transmission resource, the other third transmission resource includes a remaining 80 MHz band in the target transmission resource, and the two third transmission resources are respectively used to transmit two PSDUs. |
| Case 5 | The third allocation information is used to indicate four third transmission resources obtained by dividing the target transmission resource, each third transmission resource includes an 80 MHz band in the target transmission resource, and the four third transmission resources are respectively used to transmit four PSDUs. |

For another example, when the first bandwidth indicated by the bandwidth information in the first data packet is 240 MHz, the third allocation information may be used to indicate one or more of six cases shown in Table 7, and is not limited to the following cases.

TABLE 7

| Case | |
|---|---|
| Case 1 | The third allocation information is used to indicate one third transmission resource obtained by dividing the target transmission resource, and the third transmission resource is used to transmit one PSDU. |
| Case 2 | The third allocation information is used to indicate two third transmission resources obtained by dividing the target transmission resource, one third transmission resource includes a 160 MHz band including P20 in the target transmission resource, the other third transmission resource includes a remaining 80 MHz band in the target transmission resource, and the two third transmission resources are respectively used to transmit two PSDUs. |
| Case 3 | The third allocation information is used to indicate two third transmission resources obtained by dividing the target transmission resource, one third transmission resource includes an 80 MHz band including P20 in the target transmission resource, the other third transmission resource includes a remaining 160 MHz band in the target transmission resource, and the two third transmission resources are respectively used to transmit two PSDUs. |
| Case 5 | The third allocation information is used to indicate three third transmission resources obtained by dividing the target transmission resource, each third transmission resource includes an 80 MHz band in the target transmission resource, and the three third transmission resources are respectively used to transmit three PSDUs. |
| Case 6 | The third allocation information is used to indicate four third transmission resources obtained by dividing the target transmission resource, each third transmission resource includes a 60 MHz band in the target transmission resource, and the four third transmission resources are respectively used to transmit four PSDUs. |

In other words, the third allocation information can indicate the PSDU transmitted on each third transmission resource in the target transmission resource, so that the transmit end can more flexibly send data by using the target transmission resource. In particular, for single-point-to-single-point communication, the transmit end may divide the target transmission resource into several third transmission resources, and send PSDUs of different services by using different third transmission resources. In addition, because each third transmission resource is an integer multiple of the 80 MHz band, the third allocation information is relatively simple, so that signaling overheads can be reduced, and the third allocation information is applicable to the single-point-to-single-point communication.

The space-time stream information in this embodiment of this application is used to indicate the k first space-time stream quantities corresponding to the k receive ends, where k≥1. A maximum value of a sum of the k first space-time stream quantities is greater than 8. For example, the maximum value of the sum of the k first space-time stream quantities may be 16, k may be less than or equal to 8, and a first space-time stream quantity corresponding to each receive end is less than or equal to 4. In this case, the first space-time stream quantity corresponding to each receive end may be shown in Table 8.

For example, as shown in Table 8, when a quantity of receive ends is 2, space-time stream information 0000 may indicate that a first space-time stream quantity corresponding to a receive end 1 is 1, a first space-time stream quantity corresponding to a receive end 2 is 1, and the sum of the k first space-time stream quantities is 2; space-time stream information 0001 may indicate that the first space-time stream quantity corresponding to the receive end 1 is 2, the first space-time stream quantity corresponding to the receive end 2 is 1, and the sum of the k first space-time stream quantities is 3; space-time stream information 0010 may indicate that the first space-time stream quantity corresponding to the receive end 1 is 3, the first space-time stream quantity corresponding to the receive end 2 is 1, and the sum of the k first space-time stream quantities is 4; and space-time stream information 0011 may indicate that the first space-time stream quantity corresponding to the receive end 1 is 4, the first space-time stream quantity corresponding to the receive end 2 is 1, and the sum of the k first space-time stream quantities is 5. In addition, when the quantity of receive ends is 2, 0000 to 1001 include a total of 10 types of space-time stream information: 0000, 0001, 0010, 0011, 0100, 0101, 0110, 0111, 1000, and 1001. It should be noted that when the quantity of receive ends is 2, none of 1010 to 111111 is valid space-time stream information, and a meaning indicated by the information is reserved.

TABLE 8

| Quantity of receive ends | Space-time stream information | Receive end 1 | Receive end 2 | Receive end 3 | Receive end 4 | Receive end 5 | Receive end 6 | Receive end 7 | Receive end 8 | Sum of k first space-time stream quantities | Quantity of space-time stream information types |
|---|---|---|---|---|---|---|---|---|---|---|---|
| 2 | 0000 to 0011 | 1 to 4 | 1 | | | | | | | 2 to 5 | 10 |
|   | 0100 to 0110 | 2 to 4 | 2 | | | | | | | 4 to 6 | |
|   | 0111 to 1000 | 3 to 4 | 3 | | | | | | | 6 to 7 | |
|   | 1001 | 4 | 4 | | | | | | | 8 | |
|   | 1010 to 111111 | | | | | Reserved | | | | | 54 |
| 3 | 0000 to 0011 | 1 to 4 | 1 | 1 | | | | | | 3 to 6 | 20 |
|   | 0100 to 0110 | 2 to 4 | 2 | 1 | | | | | | 5 to 7 | |
|   | 0111 to 1000 | 3 to 4 | 3 | 1 | | | | | | 7 to 8 | |
|   | 1001 | 4 | 4 | 1 | | | | | | 9 | |
|   | 1010 to 1100 | 2 to 4 | 2 | 2 | | | | | | 1 | |
|   | 1101 to 1110 | 3 to 4 | 3 | 2 | | | | | | 8 to 9 | |
|   | 1111 | 4 | 4 | 2 | | | | | | 10 | |
|   | 10000 to 10001 | 3 to 4 | 3 | 3 | | | | | | 9 to 10 | |
|   | 10010 | 4 | 4 | 3 | | | | | | 11 | |
|   | 10011 | 4 | 4 | 4 | | | | | | 12 | |
|   | 10100 to 111111 | | | | | Reserved | | | | | 44 |
| 4 | 0000 to 0011 | 1 to 4 | 1 | 1 | 1 | | | | | 4 to 7 | 33 |
|   | 0100 to 0110 | 2 to 4 | 2 | 1 | 1 | | | | | 6 to 8 | |
|   | 0111 to 1000 | 3 to 4 | 3 | 1 | 1 | | | | | 8 to 9 | |
|   | 1001 | 4 | 4 | 1 | 1 | | | | | 10 | |
|   | 1010 to 1100 | 2 to 4 | 2 | 2 | 1 | | | | | 7 to 9 | |
|   | 1101 to 1110 | 3 to 4 | 3 | 2 | 1 | | | | | 9 to 10 | |
|   | 1111 | 4 | 4 | 2 | 1 | | | | | 11 | |
|   | 10000 to 10001 | 3 to 4 | 3 | 3 | 1 | | | | | 10 to 14 | |
|   | 10010 | 4 | 4 | 3 | 1 | | | | | 12 | |
|   | 10011 to 10101 | 2 to 4 | 2 | 2 | 2 | | | | | 8 to 10 | |
|   | 10110 to 10111 | 3 to 4 | 3 | 2 | 2 | | | | | 10 to 11 | |
|   | 11000 | 4 | 4 | 2 | 2 | | | | | 12 | |
|   | 11001 to 11010 | 3 to 4 | 3 | 3 | 2 | | | | | 11 to 12 | |
|   | 11011 | 4 | 4 | 3 | 2 | | | | | 13 | |
|   | 11100 to 11101 | 3 to 4 | 3 | 3 | 3 | | | | | 12 to 13 | |
|   | 11110 | 4 | 4 | 3 | 3 | | | | | 14 | |
|   | 11111 | 4 | 4 | 4 | 3 | | | | | 15 | |
|   | 100000 | 4 | 4 | 4 | 4 | | | | | 16 | |
|   | 100001 to 111111 | | | | | Reserved | | | | | 31 |
| 5 | 0000 to 0011 | 1 to 4 | 1 | 1 | 1 | 1 | | | | 5 to 8 | 49 |
|   | 0100 to 0110 | 2 to 4 | 2 | 1 | 1 | 1 | | | | 7 to 9 | |
|   | 0111 to 1000 | 3 to 4 | 3 | 1 | 1 | 1 | | | | 9 to 10 | |
|   | 1001 | 4 | 4 | 1 | 1 | 1 | | | | 11 | |
|   | 1010 to 1100 | 2 to 4 | 2 | 2 | 1 | 1 | | | | 8 to 10 | |
|   | 1101 to 1110 | 3 to 4 | 3 | 2 | 1 | 1 | | | | 10 to 11 | |
|   | 1111 | 4 | 4 | 2 | 1 | 1 | | | | 12 | |
|   | 10000 to 10001 | 3 to 4 | 3 | 3 | 1 | 1 | | | | 11 to 12 | |
|   | 10010 | 4 | 4 | 3 | 1 | 1 | | | | 13 | |
|   | 10011 | 4 | 4 | 4 | 1 | 1 | | | | 14 | |
|   | 10100 to 10110 | 2 to 4 | 2 | 2 | 2 | 1 | | | | 9 to 11 | |
|   | 10111 to 11000 | 3 to 4 | 3 | 2 | 2 | 1 | | | | 11 to 12 | |
|   | 11001 | 4 | 4 | 2 | 2 | 1 | | | | 13 | |
|   | 11010 to 11011 | 3 to 4 | 3 | 3 | 2 | 1 | | | | 11 to 12 | |
|   | 11100 | 4 | 4 | 3 | 2 | 1 | | | | 14 | |
|   | 11101 | 4 | 4 | 4 | 2 | 1 | | | | 15 | |
|   | 11110 to 11111 | 3 to 4 | 3 | 3 | 3 | 1 | | | | 13 to 14 | |
|   | 100000 | 4 | 4 | 3 | 3 | 1 | | | | 15 | |

TABLE 8-continued

| Quantity of receive ends | Space-time stream information | Receive end 1 | Receive end 2 | Receive end 3 | Receive end 4 | Receive end 5 | Receive end 6 | Receive end 7 | Receive end 8 | Sum of k first space-time stream quantities | Quantity of space-time stream information types |
|---|---|---|---|---|---|---|---|---|---|---|---|
| | 100001 | 4 | 4 | 4 | 3 | 1 | | | | 16 | |
| | 100010 to 100100 | 2 to 4 | 2 | 2 | 2 | 2 | | | | 12 to 14 | |
| | 100101 to 100110 | 3 to 4 | 3 | 2 | 2 | 2 | | | | 12 to 13 | |
| | 100111 | 4 | 4 | 2 | 2 | 2 | | | | 14 | |
| | 101000 to 101001 | 3 to 4 | 3 | 3 | 2 | 2 | | | | 13 to 14 | |
| | 101010 | 4 | 4 | 3 | 2 | 2 | | | | 15 | |
| | 101011 | 4 | 4 | 4 | 2 | 2 | | | | 12 | |
| | 101100 to 101101 | 3 to 4 | 3 | 3 | 3 | 2 | | | | 14 to 15 | |
| | 101110 | 4 | 4 | 3 | 3 | 2 | | | | 16 | |
| | 101111 to 110000 | 3 to 4 | 3 | 3 | 3 | 3 | | | | 15 to 16 | |
| | 110001 to 111111 | | | | | Reserved | | | | | 15 |
| 6 | 0000 to 0100 | 1 to 4 | 1 | 1 | 1 | 1 | 1 | | | 6 to 9 | 54 |
| | 0101 to 0111 | 2 to 4 | 2 | 1 | 1 | 1 | 1 | | | 8 to 10 | |
| | 1000 to 1001 | 3 to 4 | 3 | 1 | 1 | 1 | 1 | | | 10 to 11 | |
| | 1010 | 4 | 4 | 1 | 1 | 1 | 1 | | | 12 | |
| | 1011 to 1100 | 2 to 4 | 2 | 2 | 1 | 1 | 1 | | | 9 to 11 | |
| | 1101 to 1110 | 3 to 4 | 3 | 2 | 1 | 1 | 1 | | | 11 to 12 | |
| | 1111 | 4 | 4 | 2 | 1 | 1 | 1 | | | 13 | |
| | 10000 to 10001 | 3 to 4 | 3 | 3 | 1 | 1 | 1 | | | 12 to 13 | |
| | 10010 | 4 | 4 | 3 | 1 | 1 | 1 | | | 14 | |
| | 10011 | 4 | 4 | 4 | 1 | 1 | 1 | | | 15 | |
| | 10100 to 10110 | 2 to 4 | 2 | 2 | 2 | 1 | 1 | | | 10 to 12 | |
| | 10111 to 11000 | 3 to 4 | 3 | 2 | 2 | 1 | 1 | | | 12 to 13 | |
| | 11001 | 4 | 4 | 2 | 2 | 1 | 1 | | | 14 | |
| | 11010 to 11011 | 3 to 4 | 3 | 3 | 2 | 1 | 1 | | | 13 to 14 | |
| | 11100 | 4 | 4 | 3 | 2 | 1 | 1 | | | 15 | |
| | 11101 | 4 | 4 | 4 | 2 | 1 | 1 | | | 16 | |
| | 11110 to 11111 | 3 to 4 | 3 | 3 | 3 | 1 | 1 | | | 14 to 15 | |
| | 100000 | 4 | 4 | 3 | 3 | 1 | 1 | | | 16 | |
| | 100001 to 100011 | 2 to 4 | 2 | 2 | 2 | 2 | 1 | | | 11 to 13 | |
| | 100100 to 100101 | 3 to 4 | 3 | 2 | 2 | 2 | 1 | | | 13 to 14 | |
| | 100110 | 4 | 4 | 2 | 2 | 2 | 1 | | | 15 | |
| | 100111 to 101000 | 3 to 4 | 3 | 3 | 2 | 2 | 1 | | | 14 to 15 | |
| | 101001 | 4 | 4 | 3 | 2 | 2 | 1 | | | 16 | |
| | 101010 to 101011 | 3 to 4 | 3 | 3 | 3 | 2 | 1 | | | 15 to 16 | |
| | 101100 | 3 | 3 | 3 | 3 | 3 | 1 | | | 16 | |
| | 101101 to 101111 | 2 to 4 | 2 | 2 | 2 | 2 | 2 | | | 12 to 14 | |
| | 110000 to 110001 | 3 to 4 | 3 | 2 | 2 | 2 | 2 | | | 14 to 15 | |
| | 110010 | 4 | 4 | 2 | 2 | 2 | 2 | | | 16 | |
| | 110011 to 110100 | 3 to 4 | 3 | 3 | 2 | 2 | 2 | | | 15 to 16 | |
| | 110101 | 3 | 3 | 3 | 3 | 2 | 2 | | | 16 | |
| | 110110 to 111111 | | | | | Reserved | | | | | 10 |
| 7 | 0000 to 0011 | 1 to 4 | 1 | 1 | 1 | 1 | 1 | 1 | | 7 to 10 | 48 |
| | 0100 to 0110 | 2 to 4 | 2 | 1 | 1 | 1 | 1 | 1 | | 9 to 11 | |
| | 0111 to 1000 | 3 to 4 | 3 | 1 | 1 | 1 | 1 | 1 | | 11 to 12 | |
| | 1001 | 4 | 4 | 1 | 1 | 1 | 1 | 1 | | 13 | |
| | 1010 to 1100 | 2 to 4 | 2 | 2 | 1 | 1 | 1 | 1 | | 10 to 12 | |
| | 1101 to 1110 | 3 to 4 | 3 | 2 | 1 | 1 | 1 | 1 | | 12 to 13 | |
| | 1111 | 4 | 4 | 2 | 1 | 1 | 1 | 1 | | 14 | |
| | 10000 to 10001 | 3 to 4 | 3 | 3 | 1 | 1 | 1 | 1 | | 13 to 14 | |
| | 10010 | 4 | 4 | 3 | 1 | 1 | 1 | 1 | | 15 | |
| | 10011 | 4 | 4 | 4 | 1 | 1 | 1 | 1 | | 16 | |
| | 10100 to 10110 | 2 to 4 | 2 | 2 | 2 | 1 | 1 | 1 | | 11 to 13 | |
| | 10111 to 11000 | 3 to 4 | 3 | 2 | 2 | 1 | 1 | 1 | | 13 to 14 | |
| | 11001 | 4 | 4 | 2 | 2 | 1 | 1 | 1 | | 15 | |
| | 11010 to 11011 | 3 to 4 | 3 | 3 | 2 | 1 | 1 | 1 | | 14 to 15 | |
| | 11100 | 4 | 4 | 3 | 2 | 1 | 1 | 1 | | 16 | |
| | 11101 to 11111 | 2 to 4 | 2 | 2 | 2 | 2 | 1 | 1 | | 12 to 14 | |
| | 100000 to 100001 | 3 to 4 | 3 | 2 | 2 | 2 | 1 | 1 | | 14 to 15 | |
| | 100010 | 4 | 4 | 2 | 2 | 2 | 1 | 1 | | 16 | |
| | 100011 to 100100 | 3 to 4 | 3 | 3 | 2 | 2 | 1 | 1 | | 15 to 16 | |
| | 100101 | 3 | 3 | 3 | 3 | 2 | 1 | 1 | | 16 | |
| | 100110 to 101000 | 2 to 4 | 2 | 2 | 2 | 2 | 2 | 1 | | 13 to 15 | |
| | 101001 to 101010 | 3 to 4 | 3 | 2 | 2 | 2 | 2 | 1 | | 15 to 16 | |
| | 101011 | 3 | 3 | 3 | 2 | 2 | 2 | 1 | | 16 | |
| | 101100 to 101110 | 4 to 2 | 2 | 2 | 2 | 2 | 2 | 2 | | 14 to 16 | |
| | 101111 | 3 | 3 | 2 | 2 | 2 | 2 | 2 | | 16 | |
| | 110000 to 111111 | | | | | Reserved | | | | | 16 |
| 8 | 0000 to 0011 | 1 to 4 | 1 | 1 | 1 | 1 | 1 | 1 | 1 | 8 to 11 | 41 |
| | 0100 to 0110 | 2 to 4 | 2 | 1 | 1 | 1 | 1 | 1 | 1 | 10 to 12 | |
| | 0111 to 1000 | 3 to 4 | 3 | 1 | 1 | 1 | 1 | 1 | 1 | 12 to 13 | |
| | 1001 | 4 | 4 | 1 | 1 | 1 | 1 | 1 | 1 | 14 | |
| | 1010 to 1100 | 2 to 4 | 2 | 2 | 1 | 1 | 1 | 1 | 1 | 11 to 13 | |
| | 1101 to 1110 | 3 to 4 | 3 | 2 | 1 | 1 | 1 | 1 | 1 | 13 to 14 | |

TABLE 8-continued

| Quantity of receive ends | Space-time stream information | Receive end 1 | Receive end 2 | Receive end 3 | Receive end 4 | Receive end 5 | Receive end 6 | Receive end 7 | Receive end 8 | Sum of k first space-time stream quantities | Quantity of space-time stream information types |
|---|---|---|---|---|---|---|---|---|---|---|---|
| | 1111 | 4 | 4 | 2 | 1 | 1 | 1 | 1 | 1 | 15 | |
| | 10000 to 10001 | 3 to 4 | 3 | 3 | 1 | 1 | 1 | 1 | 1 | 14 to 15 | |
| | 10010 | 4 | 4 | 3 | 1 | 1 | 1 | 1 | 1 | 16 | |
| | 10011 to 10101 | 2 to 4 | 2 | 2 | 2 | 1 | 1 | 1 | 1 | 12 to 14 | |
| | 10110 to 10111 | 3 to 4 | 3 | 2 | 2 | 1 | 1 | 1 | 1 | 15 to 16 | |
| | 11000 | 4 | 4 | 2 | 2 | 1 | 1 | 1 | 1 | 16 | |
| | 11001 to 11010 | 3 to 4 | 3 | 3 | 2 | 1 | 1 | 1 | 1 | 15 to 16 | |
| | 11011 | 3 | 3 | 3 | 3 | 1 | 1 | 1 | 1 | 16 | |
| | 11100 to 11110 | 2 to 4 | 2 | 2 | 2 | 2 | 1 | 1 | 1 | 13 to 15 | |
| | 11111 to 100000 | 3 to 4 | 3 | 2 | 2 | 2 | 1 | 1 | 1 | 15 to 16 | |
| | 100001 | 3 | 3 | 3 | 2 | 2 | 1 | 1 | 1 | 16 | |
| | 100010 to 100100 | 2 to 4 | 2 | 2 | 2 | 2 | 2 | 1 | 1 | 14 to 16 | |
| | 100101 | 3 | 3 | 2 | 2 | 2 | 2 | 1 | 1 | 16 | |
| | 100110 to 100111 | 2 to 3 | 2 | 2 | 2 | 2 | 2 | 2 | 1 | 15 to 16 | |
| | 101000 | 2 | 2 | 2 | 2 | 2 | 2 | 2 | 2 | 16 | |
| | 101001 to 111111 | | | | | Reserved | | | | | 23 |

For another example, the maximum value of the sum of the k first space-time stream quantities may be 16, a maximum value of k may be 8, and a first space-time stream quantity corresponding to each receive end is less than or equal to 8. In this case, the first space-time stream quantity corresponding to each receive end may be shown in Table 9.

As shown in Table 9, when a quantity of receive ends is 2, space-time stream information 0000 may indicate that a first space-time stream quantity corresponding to a receive end 1 is 1, a first space-time stream quantity corresponding to a receive end 2 is 1, and the sum of the k first space-time stream quantities is 2; space-time stream information 0001 may indicate that the first space-time stream quantity corresponding to the receive end 1 is 2, the first space-time stream quantity corresponding to the receive end 2 is 1, and the sum of the k first space-time stream quantities is 3; space-time stream information 0010 may indicate that the first space-time stream quantity corresponding to the receive end 1 is 3, the first space-time stream quantity corresponding to the receive end 2 is 1, and the sum of the k first space-time stream quantities is 4; space-time stream information 0011 may indicate that the first space-time stream quantity corresponding to the receive end 1 is 4, the first space-time stream quantity corresponding to the receive end 2 is 1, and the sum of the k first space-time stream quantities is 5; space-time stream information 0100 may indicate that the first space-time stream quantity corresponding to the receive end 1 is 5, the first space-time stream quantity corresponding to the receive end 2 is 1, and the sum of the k first space-time stream quantities is 6; space-time stream information 0101 may indicate that the first space-time stream quantity corresponding to the receive end 1 is 6, the first space-time stream quantity corresponding to the receive end 2 is 1, and the sum of the k first space-time stream quantities is 7; space-time stream information 0110 may indicate that the first space-time stream quantity corresponding to the receive end 1 is 7, the first space-time stream quantity corresponding to the receive end 2 is 1, and the sum of the k first space-time stream quantities is 8; and space-time stream information 0111 may indicate that the first space-time stream quantity corresponding to the receive end 1 is 8, the first space-time stream quantity corresponding to the receive end 2 is 1, and the sum of the k first space-time stream quantities is 9. In addition, when the quantity of receive ends is 2, 0000 to 1000011 include a total of 36 types of space-time stream information. It should be noted that, space-time stream information whose indicated meaning is reserved is not shown in Table 9.

TABLE 9

| Quantity of receive ends | Space-time stream information | Receive end 1 | Receive end 2 | Receive end 3 | Receive end 4 | Receive end 5 | Receive end 6 | Receive end 7 | Receive end 8 | First space-time stream quantity | Quantity of space-time stream information types |
|---|---|---|---|---|---|---|---|---|---|---|---|
| 2 | 0000 to 0111 | 1 to 8 | 1 | | | | | | | 2 to 9 | 36 |
| | 1000 to 1110 | 2 to 8 | 2 | | | | | | | 4 to 10 | |
| | 1111 to 10100 | 3 to 8 | 3 | | | | | | | 6 to 11 | |
| | 10101 to 11001 | 4 to 8 | 4 | | | | | | | 8 to 12 | |
| | 11010 to 11101 | 5 to 8 | 5 | | | | | | | 10 to 13 | |
| | 11110 to 100000 | 6 to 8 | 6 | | | | | | | 12 to 14 | |
| | 100001 to 100010 | 7 to 8 | 7 | | | | | | | 14 to 15 | |
| | 1000011 | 8 | 8 | | | | | | | 16 | |
| | . . . | | | | | Reserved | | | | | 220 |
| 3 | 0000 to 0111 | 1 to 8 | 1 | 1 | | | | | | 3 to 11 | 89 |
| | 1000 to 1110 | 2 to 8 | 2 | 1 | | | | | | 5 to 11 | |
| | 1111 to 10100 | 3 to 8 | 3 | 1 | | | | | | 7 to 12 | |
| | 10101 to 11001 | 4 to 8 | 4 | 1 | | | | | | 9 to 13 | |
| | 11010 to 11101 | 5 to 8 | 5 | 1 | | | | | | 11 to 14 | |
| | 11110 to 100000 | 6 to 8 | 6 | 1 | | | | | | 13 to 15 | |
| | 100001 to 100010 | 7 to 8 | 7 | 1 | | | | | | 15 to 16 | |

TABLE 9-continued

| Quantity of receive ends | Space-time stream information | Receive end 1 | Receive end 2 | Receive end 3 | Receive end 4 | Receive end 5 | Receive end 6 | Receive end 7 | Receive end 8 | First space-time stream quantity | Quantity of space-time stream information types |
|---|---|---|---|---|---|---|---|---|---|---|---|
| | 100011 to 101001 | 2 to 8 | 2 | 2 | | | | | | 6 to 12 | |
| | 101010 to 101111 | 3 to 8 | 3 | 2 | | | | | | 8 to 13 | |
| | 110000 to 110100 | 4 to 8 | 4 | 2 | | | | | | 10 to 14 | |
| | 110101 to 111000 | 5 to 8 | 5 | 2 | | | | | | 12 to 15 | |
| | 111001 to 111011 | 6 to 8 | 6 | 2 | | | | | | 14 to 16 | |
| | 111100 | 7 | 7 | 2 | | | | | | 16 | |
| | 111101 to 1000010 | 3 to 8 | 3 | 3 | | | | | | 9 to 14 | |
| | 1000011 to 1000111 | 4 to 8 | 4 | 3 | | | | | | 11 to 15 | |
| | 1001000 to 1001011 | 5 to 8 | 5 | 3 | | | | | | 13 to 16 | |
| | 1001100 to 1001101 | 6 to 7 | 6 | 3 | | | | | | 15 to 16 | |
| | 1001110 to 1010010 | 4 to 8 | 4 | 4 | | | | | | 12 to 16 | |
| | 1010011 to 1010101 | 5 to 7 | 5 | 4 | | | | | | 14 to 16 | |
| | 1010110 | 6 | 6 | 4 | | | | | | 16 | |
| | 1010111 to 1011000 | 5 to 6 | 5 | 5 | | | | | | 15 to 16 | |
| | . . . | | | | | Reserved | | | | | 197 |
| 4 | 0000 to 0111 | 1 to 8 | 1 | 1 | 1 | | | | | 4 to 11 | 130 |
| | 1000 to 1110 | 2 to 8 | 2 | 1 | 1 | | | | | 6 to 12 | |
| | 1111 to 10100 | 3 to 8 | 3 | 1 | 1 | | | | | 8 to 13 | |
| | 10101 to 11001 | 4 to 8 | 4 | 1 | 1 | | | | | 10 to 14 | |
| | 11010 to 11101 | 5 to 8 | 5 | 1 | 1 | | | | | 12 to 15 | |
| | 11110 to 100000 | 6 to 8 | 6 | 1 | 1 | | | | | 14 to 16 | |
| | 100001 | 7 | 7 | 1 | 1 | | | | | 16 | |
| | 100010 to 101000 | 2 to 8 | 2 | 2 | 1 | | | | | 7 to 13 | |
| | 101001 to 101110 | 3 to 8 | 3 | 2 | 1 | | | | | 9 to 14 | |
| | 101111 to 110011 | 4 to 8 | 4 | 2 | 1 | | | | | 11 to 15 | |
| | 110100 to 110111 | 5 to 8 | 5 | 2 | 1 | | | | | 13 to 16 | |
| | 111000 to 111001 | 6 to 7 | 6 | 2 | 1 | | | | | 15 to 16 | |
| | 111010 to 111111 | 3 to 8 | 3 | 3 | 1 | | | | | 10 to 15 | |
| | 1000000 to 1000100 | 4 to 8 | 4 | 3 | 1 | | | | | 12 to 16 | |
| | 1000101 to 1000111 | 5 to 7 | 5 | 3 | 1 | | | | | 14 to 16 | |
| | 1001000 | 6 | 6 | 3 | 1 | | | | | 16 | |
| | 1001001 to 1001100 | 4 to 7 | 4 | 4 | 1 | | | | | 13 to 16 | |
| | 1001101 to 1001110 | 5 to 6 | 5 | 4 | 1 | | | | | 15 to 16 | |
| | 1001111 | 5 | 5 | 5 | 1 | | | | | 16 | |
| | 1010000 to 1010110 | 2 to 8 | 2 | 2 | 2 | | | | | 8 to 14 | |
| | 1010111 to 1011100 | 3 to 8 | 3 | 2 | 2 | | | | | 10 to 15 | |
| | 1011101 to 1100001 | 4 to 8 | 4 | 2 | 2 | | | | | 12 to 16 | |
| | 1100010 to 1100100 | 5 to 7 | 5 | 2 | 2 | | | | | 14 to 16 | |
| | 1100101 | 6 | 6 | 2 | 2 | | | | | 16 | |
| | 1100110 to 1101011 | 3 to 8 | 3 | 3 | 2 | | | | | 11 to 16 | |
| | 1101100 to 1101111 | 4 to 7 | 4 | 3 | 2 | | | | | 13 to 16 | |
| | 1110000 to 1110001 | 5 to 6 | 5 | 3 | 2 | | | | | 15 to 16 | |
| | 1110010 to 1110100 | 4 to 6 | 4 | 4 | 2 | | | | | 14 to 16 | |
| | 1110101 | 5 | 5 | 4 | 2 | | | | | 16 | |
| | 1110110 to 1111010 | 3 to 7 | 3 | 3 | 3 | | | | | 12 to 16 | |
| | 1111011 to 1111101 | 4 to 6 | 4 | 3 | 3 | | | | | 14 to 16 | |
| | 1111110 | 5 | 5 | 3 | 3 | | | | | 16 | |
| | 1111111 to 10000000 | 4 to 5 | 4 | 4 | 3 | | | | | 15 to 16 | |
| | 10000001 | 4 | 4 | 4 | 4 | | | | | 16 | |
| | . . . | | | | | Reserved | | | | | 126 |
| 5 | 0000 to 0111 | 1 to 8 | 1 | 1 | 1 | 1 | | | | 5 to 12 | 136 |
| | 1000 to 1110 | 2 to 8 | 2 | 1 | 1 | 1 | | | | 7 to 13 | |
| | 1111 to 10100 | 3 to 8 | 3 | 1 | 1 | 1 | | | | 9 to 14 | |
| | 10101 to 11001 | 4 to 8 | 4 | 1 | 1 | 1 | | | | 11 to 15 | |
| | 11010 to 11101 | 5 to 8 | 5 | 1 | 1 | 1 | | | | 13 to 16 | |
| | 11110 to 11111 | 6 to 7 | 6 | 1 | 1 | 1 | | | | 15 to 16 | |
| | 100000 to 100110 | 2 to 8 | 2 | 2 | 1 | 1 | | | | 8 to 14 | |
| | 100111 to 101100 | 3 to 8 | 3 | 2 | 1 | 1 | | | | 10 to 15 | |
| | 101101 to 110001 | 4 to 8 | 4 | 2 | 1 | 1 | | | | 12 to 16 | |
| | 110010 to 110100 | 5 to 7 | 5 | 2 | 1 | 1 | | | | 14 to 16 | |
| | 110101 | 6 | 6 | 2 | 1 | 1 | | | | 16 | |
| | 110110 to 111011 | 3 to 8 | 3 | 3 | 1 | 1 | | | | 11 to 16 | |
| | 111100 to 111111 | 4 to 7 | 4 | 3 | 1 | 1 | | | | 13 to 16 | |
| | 1000000 to 1000001 | 5 to 6 | 5 | 3 | 1 | 1 | | | | 15 to 16 | |
| | 1000010 to 1000100 | 4 to 6 | 4 | 4 | 1 | 1 | | | | 14 to 16 | |
| | 1000101 | 5 | 5 | 4 | 1 | 1 | | | | 16 | |
| | 1000110 to 1001100 | 2 to 8 | 2 | 2 | 2 | 1 | | | | 9 to 15 | |
| | 1001101 to 1010010 | 3 to 8 | 3 | 2 | 2 | 1 | | | | 11 to 16 | |
| | 1010011 to 1010110 | 4 to 7 | 4 | 2 | 2 | 1 | | | | 13 to 16 | |
| | 1010111 to 1011000 | 5 to 6 | 5 | 2 | 2 | 1 | | | | 15 to 16 | |
| | 1011001 to 1011101 | 3 to 7 | 3 | 3 | 2 | 1 | | | | 12 to 16 | |
| | 1011110 to 1100000 | 4 to 6 | 4 | 3 | 2 | 1 | | | | 14 to 16 | |
| | 1100001 | 5 | 5 | 3 | 2 | 1 | | | | 16 | |
| | 1100010 to 1100011 | 4 to 5 | 4 | 4 | 2 | 1 | | | | 15 to 16 | |

TABLE 9-continued

| Quantity of receive ends | Space-time stream information | Receive end 1 | Receive end 2 | Receive end 3 | Receive end 4 | Receive end 5 | Receive end 6 | Receive end 7 | Receive end 8 | First space-time stream quantity | Quantity of space-time stream information types |
|---|---|---|---|---|---|---|---|---|---|---|---|
| | 1100100 to 1100111 | 3 to 6 | 3 | 3 | 3 | 1 | | | | 13 to 16 | |
| | 1101000 to 1101001 | 4 to 5 | 4 | 3 | 3 | 1 | | | | 15 to 16 | |
| | 1101010 | 4 | 4 | 4 | 3 | 1 | | | | 16 | |
| | 1101011 to 1110001 | 2 to 8 | 2 | 2 | 2 | 2 | | | | 10 to 16 | |
| | 1110010 to 1110110 | 3 to 7 | 3 | 2 | 2 | 2 | | | | 12 to 16 | |
| | 1110111 to 1111001 | 4 to 6 | 4 | 2 | 2 | 2 | | | | 14 to 16 | |
| | 1111010 | 5 | 5 | 2 | 2 | 2 | | | | 16 | |
| | 1111011 to 1111110 | 3 to 6 | 3 | 3 | 2 | 2 | | | | 13 to 16 | |
| | 1111111 to 10000000 | 4 to 5 | 4 | 3 | 2 | 2 | | | | 15 to 16 | |
| | 10000001 | 4 | 4 | 4 | 2 | 2 | | | | 16 | |
| | 10000010 to 10000100 | 3 to 5 | 3 | 3 | 3 | 2 | | | | 14 to 16 | |
| | 10000101 | 4 | 4 | 3 | 3 | 2 | | | | 16 | |
| | 10000110 to 10000111 | 3 to 4 | 3 | 3 | 3 | 3 | | | | 15 to 16 | |
| | . . . | | | | | Reserved | | | | | 120 |
| 6 | 0000 to 0111 | 1 to 8 | 1 | 1 | 1 | 1 | 1 | | | 6 to 13 | 118 |
| | 1000 to 1110 | 2 to 8 | 2 | 1 | 1 | 1 | 1 | | | 8 to 14 | |
| | 1111 to 10100 | 3 to 8 | 3 | 1 | 1 | 1 | 1 | | | 10 to 15 | |
| | 10101 to 11001 | 4 to 8 | 4 | 1 | 1 | 1 | 1 | | | 12 to 16 | |
| | 11010 to 11100 | 5 to 7 | 5 | 1 | 1 | 1 | 1 | | | 14 to 16 | |
| | 11101 | 6 | 6 | 1 | 1 | 1 | 1 | | | 16 | |
| | 11110 to 100100 | 2 to 8 | 2 | 2 | 1 | 1 | 1 | | | 9 to 15 | |
| | 100101 to 101010 | 3 to 8 | 3 | 2 | 1 | 1 | 1 | | | 11 to 16 | |
| | 101011 to 101110 | 4 to 7 | 4 | 2 | 1 | 1 | 1 | | | 13 to 16 | |
| | 101111 to 110000 | 5 to 6 | 5 | 2 | 1 | 1 | 1 | | | 15 to 16 | |
| | 110001 to 110101 | 3 to 7 | 3 | 3 | 1 | 1 | 1 | | | 12 to 16 | |
| | 110110 to 111000 | 4 to 6 | 4 | 3 | 1 | 1 | 1 | | | 14 to 16 | |
| | 111001 | 5 | 5 | 3 | 1 | 1 | 1 | | | 16 | |
| | 111010 to 111011 | 4 to 5 | 4 | 4 | 1 | 1 | 1 | | | 15 to 16 | |
| | 111100 to 1000010 | 2 to 8 | 2 | 2 | 2 | 1 | 1 | | | 10 to 16 | |
| | 1000011 to 1000111 | 3 to 7 | 3 | 2 | 2 | 1 | 1 | | | 12 to 16 | |
| | 1001000 to 1001010 | 4 to 6 | 4 | 2 | 2 | 1 | 1 | | | 14 to 16 | |
| | 1001011 | 5 | 5 | 2 | 2 | 1 | 1 | | | 16 | |
| | 1001100 to 1001111 | 3 to 6 | 3 | 3 | 2 | 1 | 1 | | | 13 to 16 | |
| | 1010000 to 1010001 | 4 to 5 | 4 | 3 | 2 | 1 | 1 | | | 15 to 16 | |
| | 1010010 | 4 | 4 | 4 | 2 | 1 | 1 | | | 16 | |
| | 1010011 to 1010101 | 3 to 5 | 3 | 3 | 3 | 1 | 1 | | | 14 to 16 | |
| | 1010110 | 4 | 4 | 3 | 3 | 1 | 1 | | | 16 | |
| | 1010111 to 1011100 | 2 to 7 | 2 | 2 | 2 | 2 | 1 | | | 11 to 16 | |
| | 1011101 to 1100000 | 3 to 6 | 3 | 2 | 2 | 2 | 1 | | | 13 to 16 | |
| | 1100001 to 1100010 | 4 to 5 | 4 | 2 | 2 | 2 | 1 | | | 15 to 16 | |
| | 1100011 to 1100101 | 3 to 5 | 3 | 3 | 2 | 2 | 1 | | | 14 to 16 | |
| | 1100110 | 4 | 4 | 3 | 2 | 2 | 1 | | | 16 | |
| | 1100111 to 1101000 | 3 to 4 | 3 | 3 | 3 | 2 | 1 | | | 15 to 16 | |
| | 1101001 | 3 | 3 | 3 | 3 | 3 | 1 | | | 16 | |
| | 1101010 to 1101110 | 2 to 6 | 2 | 2 | 2 | 2 | 2 | | | 12 to 16 | |
| | 1101111 to 1110001 | 3 to 5 | 3 | 2 | 2 | 2 | 2 | | | 14 to 16 | |
| | 1110010 | 4 | 4 | 2 | 2 | 2 | 2 | | | 16 | |
| | 1110011 to 1110100 | 3 to 4 | 3 | 3 | 2 | 2 | 2 | | | 15 to 16 | |
| | 1110101 | 3 | 3 | 3 | 3 | 2 | 2 | | | 16 | |
| | . . . | | | | | Reserved | | | | | 138 |
| 7 | 0000 to 0111 | 1 to 8 | 1 | 1 | 1 | 1 | 1 | 1 | | 7 to 14 | 91 |
| | 1000 to 1110 | 2 to 8 | 2 | 1 | 1 | 1 | 1 | 1 | | 9 to 15 | |
| | 1111 to 10100 | 3 to 8 | 3 | 1 | 1 | 1 | 1 | 1 | | 11 to 16 | |
| | 10101 to 11000 | 4 to 7 | 4 | 1 | 1 | 1 | 1 | 1 | | 13 to 16 | |
| | 11001 to 11010 | 5 to 6 | 5 | 1 | 1 | 1 | 1 | 1 | | 15 to 16 | |
| | 11011 to 100001 | 2 to 8 | 2 | 2 | 1 | 1 | 1 | 1 | | 10 to 16 | |
| | 100010 to 100110 | 3 to 7 | 3 | 2 | 1 | 1 | 1 | 1 | | 12 to 16 | |
| | 100111 to 101001 | 4 to 6 | 4 | 2 | 1 | 1 | 1 | 1 | | 14 to 16 | |
| | 101010 | 5 | 5 | 2 | 1 | 1 | 1 | 1 | | 16 | |
| | 101011 to 101110 | 3 to 6 | 3 | 3 | 1 | 1 | 1 | 1 | | 13 to 16 | |
| | 101111 to 110000 | 4 to 5 | 4 | 3 | 1 | 1 | 1 | 1 | | 15 to 16 | |
| | 110001 | 4 | 4 | 4 | 1 | 1 | 1 | 1 | | 16 | |
| | 110010 to 110111 | 2 to 7 | 2 | 2 | 2 | 1 | 1 | 1 | | 11 to 16 | |
| | 111000 to 111011 | 3 to 6 | 3 | 2 | 2 | 1 | 1 | 1 | | 13 to 16 | |
| | 111100 to 111101 | 4 to 5 | 4 | 2 | 2 | 1 | 1 | 1 | | 15 to 16 | |
| | 111110 to 1000000 | 3 to 5 | 3 | 3 | 2 | 1 | 1 | 1 | | 14 to 16 | |
| | 1000001 | 4 | 4 | 3 | 2 | 1 | 1 | 1 | | 16 | |
| | 1000010 to 1000011 | 3 to 4 | 3 | 3 | 3 | 1 | 1 | 1 | | 15 to 16 | |
| | 1000100 to 1001000 | 2 to 6 | 2 | 2 | 2 | 2 | 1 | 1 | | 12 to 16 | |
| | 1001001 to 1001011 | 3 to 5 | 3 | 2 | 2 | 2 | 1 | 1 | | 14 to 16 | |
| | 1001100 | 4 | 4 | 2 | 2 | 2 | 1 | 1 | | 16 | |
| | 1001101 to 1001110 | 3 to 4 | 3 | 3 | 2 | 2 | 1 | 1 | | 15 to 16 | |
| | 1001111 | 3 | 3 | 3 | 3 | 2 | 1 | 1 | | 16 | |
| | 1010000 to 1010011 | 2 to 5 | 2 | 2 | 2 | 2 | 2 | 1 | | 13 to 16 | |

TABLE 9-continued

| Quantity of receive ends | Space-time stream information | Receive end 1 | Receive end 2 | Receive end 3 | Receive end 4 | Receive end 5 | Receive end 6 | Receive end 7 | Receive end 8 | First space-time stream quantity | Quantity of space-time stream information types |
|---|---|---|---|---|---|---|---|---|---|---|---|
| | 1010100 to 1010101 | 3 to 4 | 3 | 2 | 2 | 2 | 2 | 1 | | 15 to 16 | |
| | 1010110 | 3 | 3 | 3 | 2 | 2 | 2 | 1 | | 16 | |
| | 1010111 to 1011001 | 2 to 4 | 2 | 2 | 2 | 2 | 2 | 2 | | 14 to 16 | |
| | 1011010 | 3 | 3 | 2 | 2 | 2 | 2 | 2 | | 16 | |
| | ... | | | | | Reserved | | | | | 165 |
| 8 | 0000 to 0111 | 1 to 8 | 1 | 1 | 1 | 1 | 1 | 1 | 1 | 8 to 15 | 66 |
| | 1000 to 1110 | 2 to 8 | 2 | 1 | 1 | 1 | 1 | 1 | 1 | 10 to 16 | |
| | 1111 to 10011 | 3 to 7 | 3 | 1 | 1 | 1 | 1 | 1 | 1 | 12 to 16 | |
| | 10100 to 10110 | 4 to 6 | 4 | 1 | 1 | 1 | 1 | 1 | 1 | 14 to 16 | |
| | 10111 | 5 | 5 | 1 | 1 | 1 | 1 | 1 | 1 | 16 | |
| | 11000 to 11101 | 2 to 7 | 2 | 2 | 1 | 1 | 1 | 1 | 1 | 11 to 16 | |
| | 11110 to 100001 | 3 to 6 | 3 | 2 | 1 | 1 | 1 | 1 | 1 | 13 to 16 | |
| | 100010 to 100011 | 4 to 5 | 4 | 2 | 1 | 1 | 1 | 1 | 1 | 15 to 16 | |
| | 100100 to 100110 | 3 to 5 | 3 | 3 | 1 | 1 | 1 | 1 | 1 | 14 to 16 | |
| | 100111 | 4 | 4 | 3 | 1 | 1 | 1 | 1 | 1 | 16 | |
| | 101000 to 101100 | 2 to 6 | 2 | 2 | 2 | 1 | 1 | 1 | 1 | 12 to 16 | |
| | 101101 to 101111 | 3 to 5 | 3 | 2 | 2 | 1 | 1 | 1 | 1 | 14 to 16 | |
| | 110000 | 4 | 4 | 2 | 2 | 1 | 1 | 1 | 1 | 16 | |
| | 110001 to 110010 | 3 to 4 | 3 | 3 | 2 | 1 | 1 | 1 | 1 | 15 to 16 | |
| | 110011 | 3 | 3 | 3 | 3 | 1 | 1 | 1 | 1 | 16 | |
| | 110100 to 110111 | 2 to 5 | 2 | 2 | 2 | 2 | 1 | 1 | 1 | 13 to 16 | |
| | 111000 to 111001 | 3 to 4 | 3 | 2 | 2 | 2 | 1 | 1 | 1 | 15 to 16 | |
| | 111010 | 3 | 3 | 3 | 2 | 2 | 1 | 1 | 1 | 16 | |
| | 111011 to 111101 | 2 to 4 | 2 | 2 | 2 | 2 | 2 | 1 | 1 | 14 to 16 | |
| | 111110 | 3 | 3 | 2 | 2 | 2 | 2 | 1 | 1 | 16 | |
| | 111111 to 1000000 | 2 to 3 | 2 | 2 | 2 | 2 | 2 | 2 | 1 | 15 to 16 | |
| | 1000001 | 2 | 2 | 2 | 2 | 2 | 2 | 2 | 2 | 16 | |
| | ... | | | | | Reserved | | | | | 190 |

Figure 11:
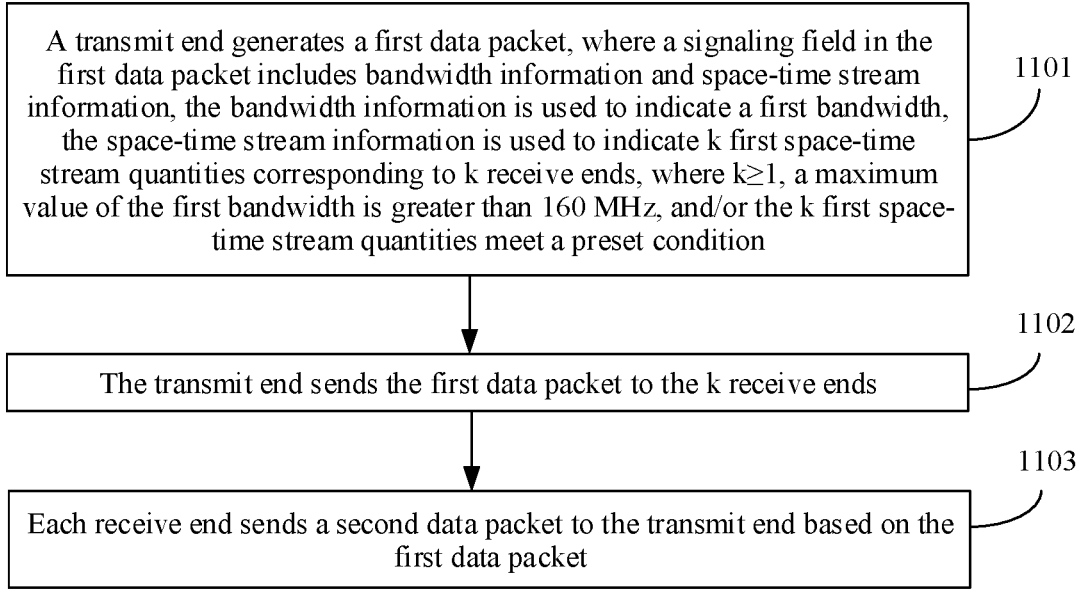
FIG. 11 is a flowchart of another data transmission method according to an embodiment of this application.

FIG. 11 is a flowchart of another data transmission method according to an embodiment of this application. For example, a first data packet transmitted in FIG. 11 is a trigger frame used to schedule a second data packet, and the second data packet includes second to-be-transmitted data. As shown in FIG. 11, the data transmission method may include the following steps.

Step 1101: A transmit end generates a first data packet, where a signaling field in the first data packet includes bandwidth information and space-time stream information, the bandwidth information is used to indicate first bandwidth, the space-time stream information is used to indicate k first space-time stream quantities corresponding to k receive ends, k≥1, a maximum value of the first bandwidth is greater than 160 MHz, and/or the k first space-time stream quantities meet a preset condition.

In other words, the maximum value of the first bandwidth is greater than 160 MHz, or the k first space-time stream quantities meet the preset condition, or the maximum value of the first bandwidth is greater than 160 MHz and the k first space-time stream quantities meet the preset condition. The preset condition includes: when k=1, a maximum value of the first space-time stream quantity indicated by the space-time stream information is greater than 8, and when k>1, a maximum value of a sum of the k first space-time stream quantities is greater than 8.

Step 1102: The transmit end sends the first data packet to the k receive ends.

Step 1103: Each receive end sends a second data packet to the transmit end based on the first data packet.

Each receive end determines, based on the signaling field in the first data packet, a transmission resource allocated to the receive end and a first space-time stream quantity corresponding to the receive end, and sends the second data packet to the transmit end by using a space-time stream of the first space-time stream quantity and by using the transmission resource. The k receive ends can send a total of k second data packets to the transmit end.

In conclusion, in this embodiment of this application, because the bandwidth information in the signaling field in the first data packet generated by the transmit end is used to indicate the first bandwidth, the space-time stream information is used to indicate the k first space-time stream quantities, the maximum value of the first bandwidth is greater than 160 MHz, and the k first space-time stream quantities meet the preset condition, at least one of the two conditions is valid. When the k first space-time stream quantities meet the preset condition, a maximum value of an accumulated value of the k first space-time stream quantities is greater than 8. Therefore, the first data packet can indicate a target data transmission resource with relatively high bandwidth, and/or the first data packet can indicate a relatively large quantity of space-time streams, and a data transmission rate is relatively high.

In this embodiment of this application, that the first data packet is a trigger frame used to schedule the second data packet is used as an example. Therefore, the first bandwidth is bandwidth of a target transmission resource used to transmit the k second data packets, and the first space-time stream quantity corresponding to each receive end is a quantity of space-time streams used by each receive end to transmit the second data packet to the transmit end.

Optionally, when the first data packet is the trigger frame, the signaling field further includes fourth allocation information of the target transmission resource, and the fourth allocation information of the target transmission resource is used to indicate at least one second RU obtained by dividing the target transmission resource, and a receive end to which each second RU is allocated.

For example, the fourth allocation information of the target transmission resource may include a part corresponding to each receive end. When the first bandwidth is 160 MHz, 240 MHz, or 320 MHz, if a second RU allocated to a receive end includes at least one RU in a 26-subcarrier RU, a 52-subcarrier RU, a 106-subcarrier RU, a 242-subcarrier RU, a 484-subcarrier RU, and a 996-subcarrier RU, the second RU may be indicated by using first information and second information that are in a part corresponding to the receive end in the first allocation information. The first information is used to indicate an 80 MHz band that is of the target transmission resource and on which the second RU is located, and the second information is used to indicate a subcarrier RU that is in the 80 MHz band and that is included by the second RU. If the second RU includes an RU of the entire target transmission resource (in other words, when the first bandwidth is 160 MHz, the second RU includes twice the 996-subcarrier RU; when the first bandwidth is 240 MHz, the second RU includes three times the 996-subcarrier RU; when the first bandwidth is 320 MHz, the second RU includes four times the 996-subcarrier RU), the second RU may be indicated by using second information in a part corresponding to the receive end in the first allocation information, in other words, the second information is used to indicate that the second RU includes a subcarrier RU in the entire target transmission resource. In this case, the part corresponding to the receive end in the first allocation information may further include first information, the first information may be any value, and the first information is not used to indicate any meaning.

As shown in Table 10, the first information may be represented by using two bits. When the first bandwidth is less than or equal to 80 MHz, and the second RU includes at least one RU in a 26-subcarrier RU, a 52-subcarrier RU, a 106-subcarrier RU, a 242-subcarrier RU, a 484-subcarrier RU, and a 996-subcarrier RU, in the first information and the second information that indicate the second RU, the first information may be 00, and is used to indicate that the second RU is located in a first 80 MHz band in the target transmission resource.

When the first bandwidth is 160 MHz, and the second RU includes at least one RU in a 26-subcarrier RU, a 52-subcarrier RU, a 106-subcarrier RU, a 242-subcarrier RU, a 484-subcarrier RU, and a 996-subcarrier RU, the first information may be 00 or 01, where 00 is used to indicate that the second RU is located in a first 80 MHz band in the target transmission resource, and 01 is used to indicate that the second RU is located in a second 80 MHz band in the target transmission resource.

When the first bandwidth is 320 MHz, and the second RU includes at least one RU in a 26-subcarrier RU, a 52-subcarrier RU, a 106-subcarrier RU, a 242-subcarrier RU, a 484-subcarrier RU, and a 996-subcarrier RU, the first information may be 00, 01, 10, or 11, where 00 is used to indicate that the second RU is located in a first 80 MHz band in the target transmission resource, 01 is used to indicate that the second RU is located in a second 80 MHz band in the target transmission resource, 10 is used to indicate that the second RU is located in a third 80 MHz band in the target transmission resource, and 11 is used to indicate that the RU is located in a fourth 80 MHz band in the target transmission resource.

It should be noted that the two bits indicating the first information have four states (respectively 00, 01, 10, and 11). When first information corresponding to each type of bandwidth in Table 10 includes some states in the four states, all remaining states except the some states in the four states may be reserved states.

TABLE 10

| First bandwidth | First information |
| --- | --- |
| 20 MHz, 40 MHz, or 80 MHz | 00 |
| 160 MHz | 00 or 01 |
| 320 MHz | 00, 01, 10, or 11 |
| 240 MHz | 00, 01, or 10 |

The second information is represented by seven bits. A correspondence between the second information and the second RU may be shown in Table 11. When a value of the second information is greater than or equal to 0 and is less than or equal to 36, the second information is used to indicate that the second RU is a 26-subcarrier RU in 37 26-subcarrier RUs in the 80 MHz band. When the first bandwidth is 160 MHz and the value of the second information is 68, the second information is used to indicate that the second RU includes all the RUs in the entire target transmission resource. When the first bandwidth is 240 MHz or 320 MHz and the value of the second information is 69, the second information is used to indicate that the second RU includes all the RUs in the entire target transmission resource.

TABLE 11

| Value of second information | RU indicated by the second information | Quantity of types of the second information |
| --- | --- | --- |
| 0 to 36 | Including a 26-subcarrier RU in an 80 MHz band | 37 |
| 37 to 52 | Including a 52-subcarrier RU in the 80 MHz band | 16 |
| 53 to 60 | Including a 106-subcarrier RU in the 80 MHz band | 8 |
| 61 to 64 | Including a 242-subcarrier RU in the 80 MHz band | 4 |
| 65 to 66 | Including a 484-subcarrier RU in the 80 MHz band | 2 |
| 67 | Including a 996-subcarrier RU in the 80 MHz band | 1 |
| 68 | Including twice the 996-subcarrier RU | 1 |
| 69 | Including three times or four times the 996-subcarrier RU | 1 |
| 70 to 127 | Reserved | 58 |

Optionally, during generation of the first data packet, each second RU in the target transmission resource may be further limited. For example, when the first bandwidth is relatively high (for example, the first bandwidth is greater than 160 MHz), it may be forbidden to set the second RU to at least one RU in a 26-subcarrier RU, a 52-subcarrier RU, and a 106-subcarrier RU. In this way, each second RU in the target transmission resource is relatively large, a quantity of second RUs in the target transmission resource is relatively small, the indication information in the first data packet is relatively simple, and signaling overheads of the signaling field are relatively small. It should be noted that a 26-subcarrier RU located at a center in each 20 MHz band and a 26-subcarrier RU located at a center in an 80 MHz band may be selectively allowed to be set to the second RU in the target transmission resource. This is not limited in this embodiment of this application.

Optionally, signaling overheads of the indication information are reduced if the foregoing manner of limiting the second RU in the target transmission resource is used during generation of the first data packet. The signaling field may further include manner information, and the manner information is used to indicate whether a manner of reducing the signaling overheads of the indication information is used during generation of the first data packet.

It should be noted that, an arrangement sequence of the foregoing cases is not limited in this application, and an arrangement sequence of the possible implementable manners is not limited either.

Figure 12:
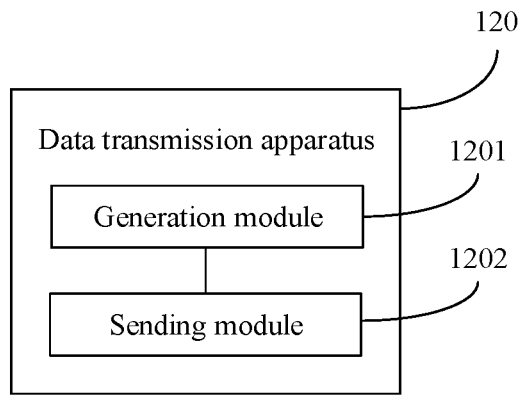
FIG. 12 is a schematic structural diagram of a data transmission apparatus according to an embodiment of this application.

As shown in FIG. 12, an embodiment of this application provides a data transmission apparatus 120, which may be used on a transmit end. The data transmission apparatus 120 may include:
- a generation module 1201, configured to generate a first data packet, where a signaling field in the first data packet includes bandwidth information and space-time stream information, the bandwidth information is used to indicate a first bandwidth, and the space-time stream information is used to indicate k first space-time stream quantities corresponding to k receive ends, where k≥1; and
- a sending module 1202, configured to send the first data packet to the k receive ends, where
- a maximum value of the first bandwidth is greater than 160 MHz, and/or the k first space-time stream quantities meet a preset condition, where the preset condition includes: when k=1, a maximum value of the first space-time stream quantity indicated by the space-time stream information is greater than 8; and when k>1, a maximum value of a sum of the k first space-time stream quantities is greater than 8.

In conclusion, in this embodiment of this application, because the bandwidth information in the signaling field in the first data packet generated by the generation module is used to indicate the first bandwidth, the space-time stream information is used to indicate the k first space-time stream quantities, the maximum value of the first bandwidth is greater than 160 MHz, and the k first space-time stream quantities meet the preset condition, at least one of the two conditions is valid. When the k first space-time stream quantities meet the preset condition, a maximum value of an accumulated value of the k first space-time stream quantities is greater than 8. Therefore, the first data packet can indicate a target data transmission resource with relatively high bandwidth, and/or the first data packet can indicate a relatively large quantity of space-time streams, and a data transmission rate is relatively high.

Optionally, the first data packet carries first to-be-transmitted data, the first bandwidth is bandwidth of the target transmission resource used to transmit the first data packet, and the first space-time stream quantity corresponding to each receive end is a quantity of space-time streams used to send the first data packet to the receive end.

Optionally, the target transmission resource includes m first transmission resources successively arranged in frequency domain, and n second transmission resources successively arranged in the frequency domain, where the second transmission resource includes a 26-subcarrier resource unit RU located at a center in the frequency domain in an 80 MHz band, where m≥1, and n≥1. The signaling field further includes indication information, and the indication information includes first allocation information of each first transmission resource in the target transmission resource and second allocation information of each second transmission resource in the target transmission resource. The first allocation information of each first transmission resource is used to indicate at least one first RU obtained by dividing the first transmission resource, and a receive end to which each first RU is allocated. The second allocation information of each second transmission resource is used to indicate whether the second transmission resource is allocated to any one of the k receive ends, and indicate a receive end to which the second transmission resource is allocated when the second transmission resource is allocated to any receive end.

Optionally, the indication information is divided into a plurality of types of sub-information, and in a process of transmitting the first data packet, the plurality of types of sub-information are transmitted on different channels.

Optionally, the first bandwidth is 320 MHz, and the target transmission resource includes sixteen first transmission resources and four second transmission resources. The sixteen first transmission resources form two sets, and the two sets include a first set including a first transmission resource whose ranking is an odd number in the sixteen first transmission resources, and a second set including a first transmission resource whose ranking is an even number in the sixteen first transmission resources. The first set corresponds to a second transmission resource whose ranking is an odd number in the four second transmission resources, and the second set corresponds to a second transmission resource whose ranking is an even number in the four second transmission resources. The indication information includes two types of sub-information, and the two types of sub-information are in a one-to-one correspondence with the two sets. Each type of sub-information includes first allocation information of each first transmission resource in a set corresponding to the type of sub-information and second allocation information of each second transmission resource corresponding to the set corresponding to the type of sub-information.

Optionally, the first bandwidth is 320 MHz, and the target transmission resource includes sixteen first transmission resources and four second transmission resources. The sixteen first transmission resources form four sets, and the four sets include a first set including a first transmission resource whose ranking is 1+4i, a second set including a first transmission resource whose ranking is 2+4i in the sixteen first transmission resources, a third set including a first transmission resource whose ranking is 3+4i in the sixteen first transmission resources, and a fourth set including a first transmission resource whose ranking is 4+4i in the sixteen first transmission resources, where i≥0. The indication information includes four types of sub-information, the four types of sub-information are in a one-to-one correspondence with the four sets, and the four sets are in a one-to-one correspondence with the four second transmission resources. Each type of sub-information includes first allocation information of each first transmission resource in a set corresponding to the type of sub-information and second allocation information of each second transmission resource corresponding to the set corresponding to the type of sub-information.

Optionally, the first bandwidth is 320 MHz, and the target transmission resource includes sixteen first transmission resources and four second transmission resources. The sixteen first transmission resources form eight sets, and the eight sets include a first set including a first transmission resource whose ranking is 1+8i in the sixteen first transmission resources, a second set including a first transmission resource whose ranking is 2+8i in the sixteen first transmission resources, a third set including a first transmission resource whose ranking is 3+8i in the sixteen first transmission resources, a fourth set including a first transmission resource whose ranking is 4+8i in the sixteen first transmission resources, a fifth set including a first transmission resource whose ranking is 5+8i in the sixteen first transmission resources, a sixth set including a first transmission resource whose ranking is 6+8i in the sixteen first transmission resources, a seventh set including a first transmission resource whose ranking is 7+8i in the sixteen first transmission resources, and an eighth set including a first transmission resource whose ranking is 8+8i in the sixteen first transmission resources, where i≥0. The indication information includes eight types of sub-information, and the eight types of sub-information are in a one-to-one correspondence with the eight sets. The eight sets are classified into four groups of sets, and each group of sets includes two sets. The four groups of sets are in a one-to-one correspondence with the four second transmission resources, and each type of sub-information includes first allocation information of each first transmission resource in a set corresponding to the type of sub-information and second allocation information of each second transmission resource corresponding to a group of sets to which the set corresponding to the type of sub-information belongs.

Optionally, the first bandwidth is 240 MHz, and the target transmission resource includes twelve first transmission resources and three second transmission resources. The twelve first transmission resources form three sets, and the three sets include a first set including a first transmission resource whose ranking is 1+3i in the twelve first transmission resources, a second set including a first transmission resource whose ranking is 2+3i in the twelve first transmission resources, and a third set including a first transmission resource whose ranking is 3+3i in the twelve first transmission resources, where i≥0. The indication information includes three types of sub-information, the three types of sub-information are in a one-to-one correspondence with the three sets, and the three sets are in a one-to-one correspondence with the three second transmission resources. Each type of sub-information includes first allocation information of each first transmission resource in a set corresponding to the type of sub-information and second allocation information of each second transmission resource corresponding to the set corresponding to the type of sub-information.

Optionally, the first bandwidth is 240 MHz, and the target transmission resource includes twelve first transmission resources and three second transmission resources. The twelve first transmission resources form two sets, and the two sets include a first set including a first transmission resource whose ranking is an odd number in the twelve first transmission resources, and a second set including a first transmission resource whose ranking is an even number in the twelve first transmission resources. The indication information includes two types of sub-information, and the two types of sub-information are in a one-to-one correspondence with the two sets. The signaling field further includes additional information. Three pieces of second allocation information of the three second transmission resources and the additional information form a total of two groups of combined information, and each group of combined information includes two pieces of information in the additional information and the three pieces of second allocation information. The two groups of combined information are in a one-to-one correspondence with the two sets. The additional information is the same as second allocation information of any one of the three second transmission resources, or the additional information is reserved information. Each type of sub-information includes first allocation information of each first transmission resource in a set corresponding to the type of sub-information and a group of combined information corresponding to the set corresponding to the type of sub-information.

Optionally, the first bandwidth is 240 MHz, and the target transmission resource includes twelve first transmission resources and three second transmission resources. The twelve first transmission resources form two sets, and the two sets include a first set including a first transmission resource whose ranking is an odd number in the twelve first transmission resources, and a second set including a first transmission resource whose ranking is an even number in the twelve first transmission resources. The indication information includes two types of sub-information, and the two types of sub-information are in a one-to-one correspondence with the two sets. Three pieces of second allocation information of the three second transmission resources form a total of two groups of second allocation information, one group of second allocation information includes two pieces of second allocation information, and the other group of second allocation information includes one piece of second allocation information. The two groups of second allocation information are in a one-to-one correspondence with the two sets. Each type of sub-information includes first allocation information of each first transmission resource in a set corresponding to the type of sub-information and a group of combined information corresponding to the set corresponding to the type of sub-information.

Optionally, the bandwidth information is further used to indicate a punctured channel and an unpunctured channel that are in a channel on which the target transmission resource is located, and a channel on which at least one piece of sub-information in each type of sub-information is not punctured.

Optionally, the signaling field further includes third allocation information of the target transmission resource. The third allocation information is used to indicate at least one third transmission resource obtained by dividing the target transmission resource and a physical layer service data unit PSDU transmitted on each third transmission resource. Each third transmission resource is an integer multiple of an 80 MHz band.

Optionally, the first data packet is a trigger frame used to schedule the k receive ends to transmit k second data packets to the transmit end, the first bandwidth is bandwidth of a target transmission resource used to transmit the k second data packets, and a first space-time stream quantity corresponding to each receive end is a quantity of space-time streams used by the receive end to transmit the second data packet to the transmit end.

Optionally, the signaling field further includes fourth allocation information of the target transmission resource, and the fourth allocation information of the target transmission resource is used to indicate at least one second RU obtained by dividing the target transmission resource, and a receive end to which each second RU is allocated.

Figure 13:
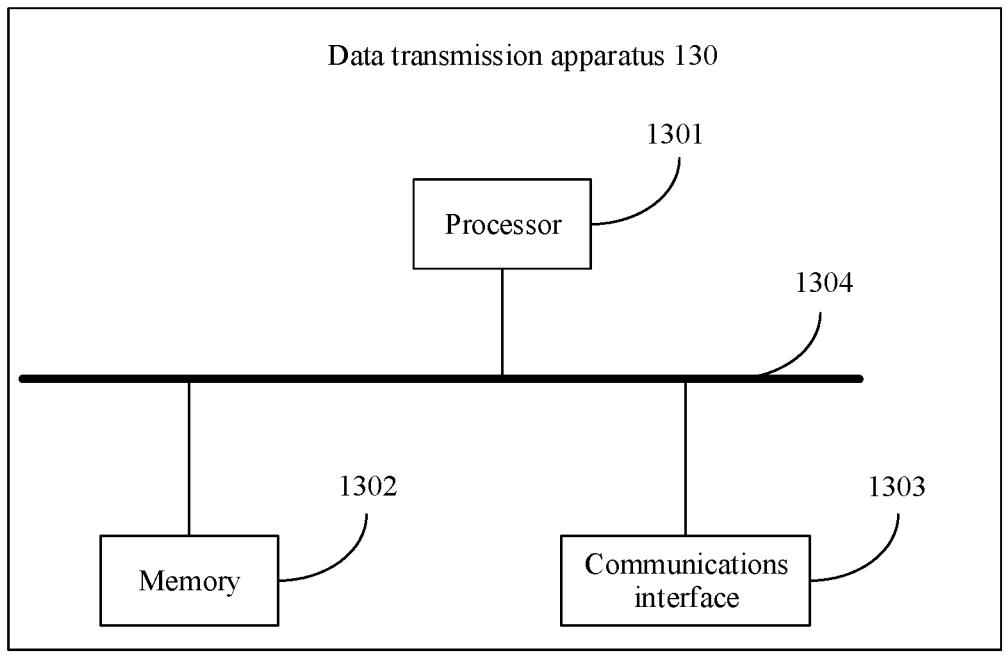
FIG. 13 is a schematic structural diagram of another data transmission apparatus according to an embodiment of this application.

FIG. 13 is a schematic structural diagram of another data transmission apparatus according to an embodiment of this application. The data transmission apparatus may be used on a transmit end. As shown in FIG. 13, the data transmission apparatus 1300 may include a processor 1301, a memory 1302, a communications interface 1303, and a bus 1304. The processor 1301, the memory 1302, the communications interface 1303 are connected to each other through the bus 1304. There is a plurality of communications interfaces 1303, configured to communicate with another device under control of the processor 1301. The memory 1302 is configured to store a computer instruction. The processor 1301 invokes, through the bus 1304, the computer instruction stored in the memory 1302, to perform the data transmission method shown in FIG. 2 or FIG. 11.

Figure 14:
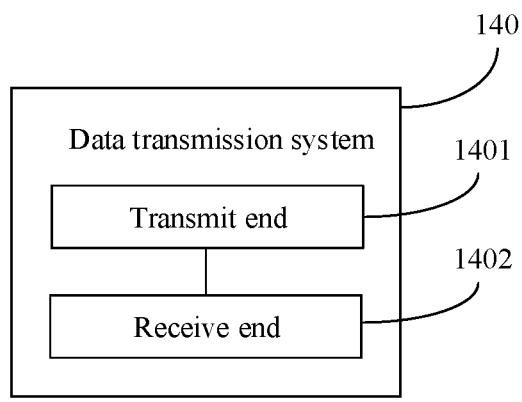
FIG. 14 is a schematic structural diagram of a data transmission system according to an embodiment of this application.

FIG. 14 is a schematic structural diagram of a data transmission system according to an embodiment of this application. As shown in FIG. 14, the data transmission system 140 may include a transmit end 1401 and k receive ends 1402. The transmit end 1401 may include the data transmission apparatus shown in FIG. 12 or FIG. 13. It should be noted that k may be an integer greater than or equal to 1. In FIG. 14, only an example in which k is equal to 1 is used.

All or some of the foregoing embodiments may be implemented by using software, hardware, firmware, or any combination thereof. When software is used for implementation, all or some of the embodiments may be implemented in a form of a computer program product, where the computer program product includes one or more computer instructions. When the computer program instructions are loaded and executed on a computer, the procedure or functions according to the embodiments of this application are all or partially generated. The computer may be a general-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium, a semiconductor medium (for example, a solid-state drive), or the like.

It should be noted that mutual reference can be made between the method embodiments provided in the embodiments of this application and corresponding apparatus embodiments. This is not limited in the embodiments of this application. A sequence of the steps of the method embodiments provided in the embodiments of this application can be properly adjusted, and the steps can be correspondingly added or deleted based on a situation. Any method that can be easily figured out by a person skilled in the art without departing from a technical scope disclosed in the present invention shall fall within the protection scope of this application, and therefore details are not described again.

The foregoing descriptions are merely optional embodiments of this application, but are not intended to limit this application. Any modification, equivalent replacement, or improvement made without departing from the spirit and principle of this application should fall within the protection scope of this application.

What is claimed is:

1. A data transmission method, wherein the method is used on a transmit end and comprises:
   generating a first data packet, wherein a signaling field in the first data packet comprises bandwidth information and space-time stream information, the bandwidth information indicating a first bandwidth, and the space-time stream information indicating k first space-time stream quantities corresponding to k receive ends, wherein k is larger than 1; and
   sending the first data packet to the k receive ends, wherein a maximum value of the first bandwidth is greater than 160 MHz, and the k first space-time stream quantities meet a preset condition, wherein the preset condition comprises a maximum value of a sum of the k first space-time stream quantities is greater than 8;
   wherein a target transmission resource comprises m first transmission resources successively arranged in a frequency domain, and n second transmission resources successively arranged in the frequency domain, and m>1, and n>1;
   wherein the signaling field further comprises indication information, the indication information comprising first allocation information of each first transmission resource in the target transmission resource and second allocation information of each second transmission resource in the target transmission resource;
   wherein the first allocation information of each first transmission resource indicates at least one first resource unit (RU) obtained by dividing the first transmission resource, and a receive end to which each first RU is allocated; and
   wherein the second allocation information of each second transmission resource indicates whether the second transmission resource is allocated to any one of the k receive ends, and indicates a receive end to which the second transmission resource is allocated when the second transmission resource is allocated to any receive end.

2. The method according to claim 1, wherein
   the first data packet carries first to-be-transmitted data, the first bandwidth is a bandwidth of the target transmission resource transmitting the first data packet, and a first space-time stream quantity corresponding to each receive end is a quantity of space-time streams used to send the first data packet to the receive end.

3. The method according to claim 2, wherein the second transmission resource comprises a 26-subcarrier resource unit (RU) located at a center in the frequency domain in an 80 MHz band.

4. The method according to claim 3, wherein
   the indication information is divided into a plurality of types of sub-information, and in a process of transmitting the first data packet, the plurality of types of sub-information are transmitted on different channels.

5. The method according to claim 4, wherein the first bandwidth is 320 MHz, the target transmission resource comprises sixteen first transmission resources and four second transmission resources, and the sixteen first transmission resources form two sets, wherein
   the two sets comprise a first set comprising a first transmission resource whose ranking is an odd number in the sixteen first transmission resources, and a second set comprising a first transmission resource whose ranking is an even number in the sixteen first transmission resources, wherein the first set corresponds to a second transmission resource whose ranking is an odd number in the four second transmission resources, and the second set corresponds to a second transmission resource whose ranking is an even number in the four second transmission resources; and
   the indication information comprises two types of sub-information, the two types of sub-information are in a one-to-one correspondence with the two sets, and each type of sub-information comprises first allocation information of each first transmission resource in a set corresponding to the type of sub-information and second allocation information of each second transmission resource corresponding to the set corresponding to the type of sub-information.

6. A data transmission apparatus, wherein the data transmission apparatus is used on a transmit end and comprises:
at least one processor, configured to generate a first data packet, wherein a signaling field in the first data packet comprises bandwidth information and space-time stream information, the bandwidth information indicating a first bandwidth, and the space-time stream information indicating k first space-time stream quantities corresponding to k receive ends, wherein k is larger than 1; and
a transmitter, configured to send the first data packet to the k receive ends, wherein
a maximum value of the first bandwidth is greater than 160 MHz, and the k first space-time stream quantities meet a preset condition, wherein the preset condition comprises a maximum value of a sum of the k first space-time stream quantities is greater than 8;
wherein a target transmission resource comprises m first transmission resources successively arranged in a frequency domain, and n second transmission resources successively arranged in the frequency domain, and m≥1, and n>1;
wherein the signaling field further comprises indication information, the indication information comprising first allocation information of each first transmission resource in the target transmission resource and second allocation information of each second transmission resource in the target transmission resource;
wherein the first allocation information of each first transmission resource indicates at least one first resource unit (RU) obtained by dividing the first transmission resource, and a receive end to which each first RU is allocated; and
wherein the second allocation information of each second transmission resource indicates whether the second transmission resource is allocated to any one of the k receive ends, and indicates a receive end to which the second transmission resource is allocated when the second transmission resource is allocated to any receive end.

7. The data transmission apparatus according to claim 6, wherein the first data packet carries first transmitted data, the first bandwidth is a bandwidth of the target transmission resource for transmitting the first data packet, and a first space-time stream quantity corresponding to each receive end is a quantity of space-time streams used to send the first data packet to the receive end.

8. The data transmission apparatus according to claim 7, wherein the second transmission resource comprises a 26-subcarrier resource unit (RU) located at a center in the frequency domain in an 80 MHz band.

9. The data transmission apparatus according to claim 8, wherein the indication information is divided into a plurality of types of sub-information, and in a process of transmitting the first data packet, the plurality of types of sub-information are transmitted on different channels.

10. The data transmission apparatus according to claim 9, wherein the first bandwidth is 320 MHz, the target transmission resource comprises sixteen first transmission resources and four second transmission resources, the sixteen first transmission resources form two sets, wherein
the two sets comprise a first set comprising a first transmission resource whose ranking is an odd number in the sixteen first transmission resources, and a second set comprising a first transmission resource whose ranking is an even number in the sixteen first transmission resources, wherein the first set corresponds to a second transmission resource whose ranking is an odd number in the four second transmission resources, and the second set corresponds to a second transmission resource whose ranking is an even number in the four second transmission resources; and
the indication information comprises two types of sub-information, the two types of sub-information are in a one-to-one correspondence with the two sets, and each type of sub-information comprises first allocation information of each first transmission resource in a set corresponding to the type of sub-information and second allocation information of each second transmission resource corresponding to the set corresponding to the type of sub-information.

11. The data transmission apparatus according to claim 9, wherein the first bandwidth is 320 MHz, the target transmission resource comprises sixteen first transmission resources and four second transmission resources, and the sixteen first transmission resources form four sets, wherein
the four sets comprise a first set comprising a first transmission resource whose ranking is 1+4i, a second set comprising a first transmission resource whose ranking is 2+4i in the sixteen first transmission resources, a third set comprising a first transmission resource whose ranking is 3+4i in the sixteen first transmission resources, and a fourth set comprising a first transmission resource whose ranking is 4+4i in the sixteen first transmission resources, wherein i≥0;
the indication information comprises four types of sub-information, the four types of sub-information being in a one-to-one correspondence with the four sets, and the four sets being in a one-to-one correspondence with the four second transmission resources; and
each type of sub-information comprises first allocation information of each first transmission resource in a set corresponding to the type of sub-information and second allocation information of each second transmission resource corresponding to the set corresponding to the type of sub-information.

12. The data transmission apparatus according to claim 9, wherein the first bandwidth is 320 MHz, the target transmission resource comprises sixteen first transmission resources and four second transmission resources, and the sixteen first transmission resources form eight sets, wherein
the eight sets comprise a first set comprising a first transmission resource whose ranking is 1+8i in the sixteen first transmission resources, a second set comprising a first transmission resource whose ranking is 2+8i in the sixteen first transmission resources, a third set comprising a first transmission resource whose ranking is 3+8i in the sixteen first transmission resources, a fourth set comprising a first transmission resource whose ranking is 4+8i in the sixteen first transmission resources, a fifth set comprising a first transmission resource whose ranking is 5+8i in the sixteen first transmission resources, a sixth set comprising a first transmission resource whose ranking is 6+8i in the sixteen first transmission resources, a seventh set comprising a first transmission resource whose ranking is 7+8i in the sixteen first transmission resources, and an eighth set comprising a first transmission resource whose ranking is 8+8i in the sixteen first transmission resources, wherein i≥0; and the indication information comprises eight types of sub-information, the eight types of sub-information being in a one-to-one correspondence with the eight sets, the eight sets being classified into four groups of sets, each group of sets comprising two sets, the four groups of sets being in a one-to-one correspondence with the four second transmission resources, and each type of sub-information comprising first allocation information of each first transmission resource in a set corresponding to the type of sub-information and second allocation information of each second transmission resource corresponding to a group of sets to which the set corresponding to the type of sub-information belongs.

13. The data transmission apparatus according to claim 9, wherein the first bandwidth is 240 MHz, the target transmission resource comprises twelve first transmission resources and three second transmission resources, and the twelve first transmission resources form three sets, wherein
the three sets comprise a first set comprising a first transmission resource whose ranking is 1+3i in the twelve first transmission resources, a second set comprising a first transmission resource whose ranking is 2+3i in the twelve first transmission resources, and a third set comprising a first transmission resource whose ranking is 3+3i in the twelve first transmission resources, wherein i≥0; and
the indication information comprises three types of sub-information, the three types of sub-information being in a one-to-one correspondence with the three sets, the three sets being in a one-to-one correspondence with the three second transmission resources, and each type of sub-information comprises first allocation information of each first transmission resource in a set corresponding to the type of sub-information and second allocation information of each second transmission resource corresponding to the set corresponding to the type of sub-information.

14. The data transmission apparatus according to claim 9, wherein the first bandwidth is 240 MHz, the target transmission resource comprises twelve first transmission resources and three second transmission resources, and the twelve first transmission resources form two sets, wherein
the two sets comprise a first set comprising a first transmission resource whose ranking is an odd number in the twelve first transmission resources, and a second set comprising a first transmission resource whose ranking is an even number in the twelve first transmission resources;
the indication information comprises two types of sub-information, the two types of sub-information are in a one-to-one correspondence with the two sets, the signaling field further comprises additional information, three pieces of second allocation information of the three second transmission resources and the additional information form a total of two groups of combined information, each group of combined information comprises two pieces of information in the additional information and the three pieces of second allocation information, and the two groups of combined information are in a one-to-one correspondence with the two sets, the additional information is the same as second allocation information of any one of the three second transmission resources, or the additional information is reserved information; and
each type of sub-information comprises first allocation information of each first transmission resource in a set corresponding to the type of sub-information and a group of combined information corresponding to the set corresponding to the type of sub-information.

15. The data transmission apparatus according to claim 9, wherein the first bandwidth is 240 MHz, the target transmission resource comprises twelve first transmission resources and three second transmission resources, the twelve first transmission resources comprising two sets, wherein
the two sets comprise a first set comprising a first transmission resource whose ranking is an odd number in the twelve first transmission resources, and a second set comprising a first transmission resource whose ranking is an even number in the twelve first transmission resources;
the indication information comprises two types of sub-information, the two types of sub-information being in a one-to-one correspondence with the two sets, three pieces of second allocation information of the three second transmission resources form a total of two groups of second allocation information, wherein one group of second allocation information comprises two pieces of second allocation information and the other group of second allocation information comprises one piece of second allocation information, and the two groups of second allocation information are in a one-to-one correspondence with the two sets; and
each type of sub-information comprises first allocation information of each first transmission resource in a set corresponding to the type of sub-information and a group of combined information corresponding to the set corresponding to the type of sub-information.

16. The data transmission apparatus according to claim 9, wherein
the bandwidth information further indicates a punctured channel and an unpunctured channel that are in a channel on which the target transmission resource is located, and a channel on which at least one piece of sub-information in each type of sub-information is transmitted is not punctured.

17. The data transmission apparatus according to claim 8, wherein the signaling field further comprises third allocation information of the target transmission resource, wherein
the third allocation information indicates at least one third transmission resource obtained by dividing the target transmission resource and a physical layer service data unit (PSDU) transmitted on each third transmission resource, and each third transmission resource is an integer multiple of an 80 MHz band.

18. The data transmission apparatus according to claim 6, wherein the first data packet is a trigger frame scheduling the k receive ends to transmit k second data packets to the transmit end, the first bandwidth is a bandwidth of a target transmission resource used to transmit the k second data packets, and a first space-time stream quantity corresponding to each receive end is a quantity of space-time streams used by the receive end to transmit the second data packet to the transmit end.

19. The data transmission apparatus according to claim 18, wherein the signaling field further comprises fourth allocation information of the target transmission resource, and the fourth allocation information of the target transmission resource is used to indicate at least one second resource unit (RU) obtained by dividing the target transmission resource, and a receive end to which each second RU is allocated.

20. A non-transitory computer-readable storage medium, wherein the computer-readable storage medium stores an instruction, and when the computer-readable storage medium is run on a computer, the computer is enabled to perform the data transmission method according to claim 1.

\* \* \* \* \*